(12) United States Patent
Matena et al.

(10) Patent No.: US 7,302,609 B2
(45) Date of Patent: Nov. 27, 2007

(54) METHOD AND APPARATUS FOR EXECUTING APPLICATIONS ON A DISTRIBUTED COMPUTER SYSTEM

(75) Inventors: Vladimir Matena, 1322 Kentfield Ave., Redwood City, CA (US) 94061; Magnus Eriksson, Sjödalstorget 9, 15th Floor, S-14147 Huddinge (SE); Jens Jensen, Stenvagen 73 A, S-64731 Mariefred (SE)

(73) Assignees: Vladimir Matena, Redwood City, CA (US); Jens Jensen, Mariefred (SE); Magnus Eriksson, Huddinge (SE)

( * ) Notice: Subject to any disclaimer, the term of this patent is extended or adjusted under 35 U.S.C. 154(b) by 587 days.

(21) Appl. No.: 10/800,307

(22) Filed: Mar. 12, 2004

(65) Prior Publication Data

US 2005/0005200 A1    Jan. 6, 2005

Related U.S. Application Data

(60) Provisional application No. 60/519,904, filed on Nov. 14, 2003, provisional application No. 60/508,150, filed on Sep. 30, 2003, provisional application No. 60/454,510, filed on Mar. 12, 2003.

(51) Int. Cl.
    *G06F 11/00* (2006.01)
(52) U.S. Cl. ...................................................... 714/15
(58) Field of Classification Search ...................... None
    See application file for complete search history.

(56) References Cited

U.S. PATENT DOCUMENTS

| | | | |
|---|---|---|---|
| 6,330,689 B1 * | 12/2001 | Jin et al. ....................... | 714/15 |
| 6,594,779 B1 * | 7/2003 | Chandra et al. ............... | 714/15 |
| 6,898,733 B2 * | 5/2005 | Parks et al. .................... | 714/15 |
| 6,983,395 B2 * | 1/2006 | Chen et al. ..................... | 714/4 |
| 7,047,441 B1 * | 5/2006 | Lomet et al. .................. | 714/13 |
| 7,185,046 B2 * | 2/2007 | Ferstl et al. .................. | 709/201 |
| 2002/0143848 A1 | 10/2002 | Matena et al. | |
| 2002/0144002 A1 | 10/2002 | Matena et al. | |
| 2003/0050972 A1 * | 3/2003 | Felt et al. ..................... | 709/203 |

OTHER PUBLICATIONS

Sun S3L3.1 Programming and Reference Guide (Mar. 2000).
Sun Microsystems Prism 6.1 User's Guide (Mar. 2000).
Open Telecom Platform by Seved Torstendahl (Ericsson Review No. 1, 1997).
The NDB Cluster—A Parallel Data Server for Telecommunications Applications by Mikael Ronstrom (Ericsson Review No. 4, 1997).
Cello—An ATM Transport and Control Platform by Jonas Reinius (Ericsson Review No. 2, 1999).
TelORB—The Distributed Communications Operating System by Lars Hennert and Alexander Larruy (Ericsson Review No. 3, 1999).
Ronja—A Java Application Platform by Magnus Karlson (Ericsson Review No. 4, 2000).

(Continued)

*Primary Examiner*—Yolanda L Wilson

(57) ABSTRACT

The present invention provides a flexible and extensible execution control system for distributed computer systems including multiple nodes interconnected through a network. Distributed computer systems that include an execution control system consistent with the present invention can be used for more types of applications than systems using prior art. The applications running on a distributed computer system that includes an execution control system consistent with the present invention can achieve better protection from hardware and software failures than systems using prior art systems and methods.

31 Claims, 61 Drawing Sheets

OTHER PUBLICATIONS

Ericsson's Family of Carrier-Class Technologies by Goran Ahlforn and Erik Omulf (Ericsson Review No. 4, 2001).
Sun HPC ClusterTools 3.1 User's Guide (Mar. 2000).
Sun MPI 4.1 Programming and Reference Guide (Mar. 2000).
Sun Microsystems Prism 6.1 Reference Manual (Mar. 2000).
Paxos Made Simple by Leslie Lamport (Nov. 1, 2001).
Leases: An Efficient Fault-Tolerant Mechanism for Distributed File Cache Consistency by Cary G.
Java 2 Platform Enterprise Edition Specification, v1.4 (Nov. 24, 2003).
Sun MicroSystems Enterprise JavaBeans Specification, Version 2.1 (Nov. 12, 2003).
Server Clusters: Architecture Overview (Mar. 2003).
Failover and Replication in a Cluster.
AXD 301—A new generation ATM switching system by Staffan Blau and Jan Rooth (Ericsson Review No. 1, 1998).
Managing Server Availability with Node Manager.
Chapter 3 Key Concepts—Administration and Application Development.
Microsoft Windows Server 2003—Introducing the ".NET" in the Windows Server 2003 Family (Jul. 2002).
WebLogic Server Deployment.
Chapter 1 Resource Management API Overview.
Beowulf Software.
Sun Microsystems Enterprise JavaBeans Specification, Version 2.1 (Aug. 2, 2002).
Java 2 Platform Enterprise Edition Specification, v1.4 (Nov. 8, 2002).
BEA WebLogic Server and WebLogic Express Administration Guide (Sep. 6, 2002).
BEA WebLogic Server Creating and Configuring WebLogic Server Domains (Sep. 4, 2002).

* cited by examiner

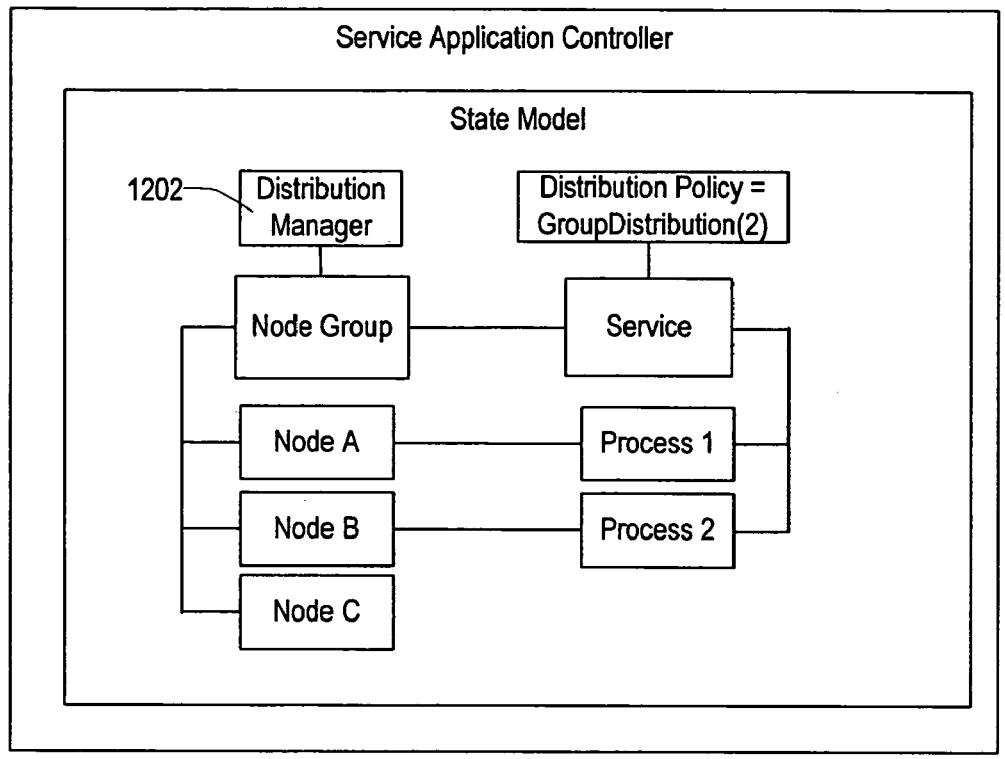
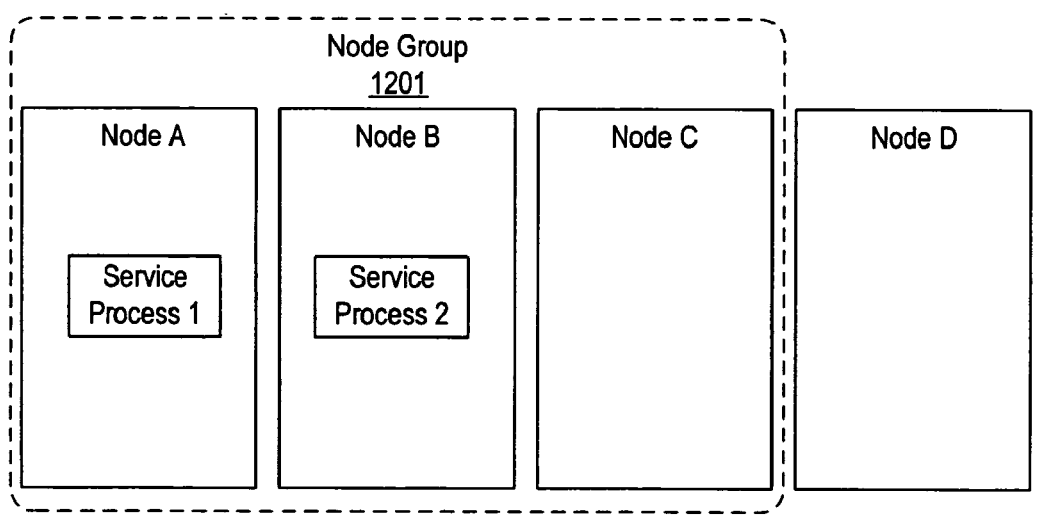
Fig 12

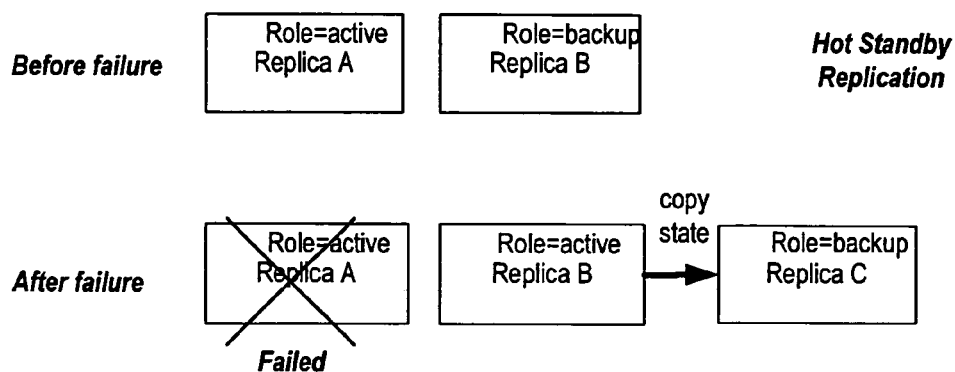
Fig 34-A
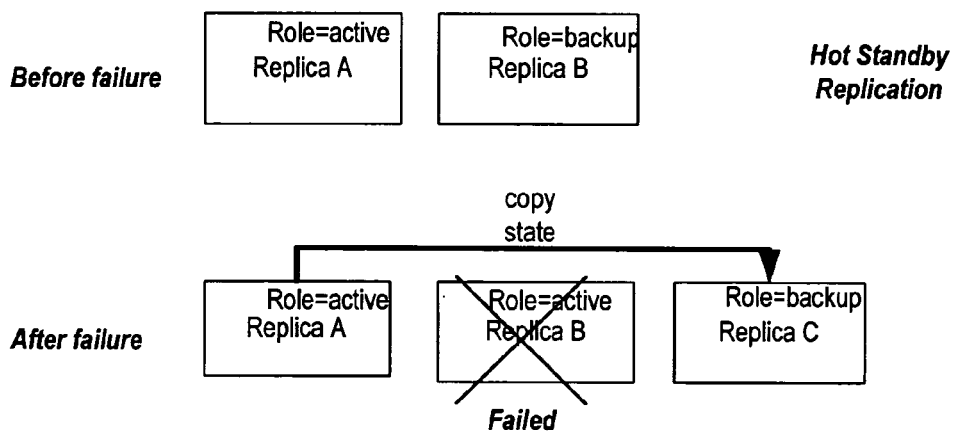
Fig 34-B

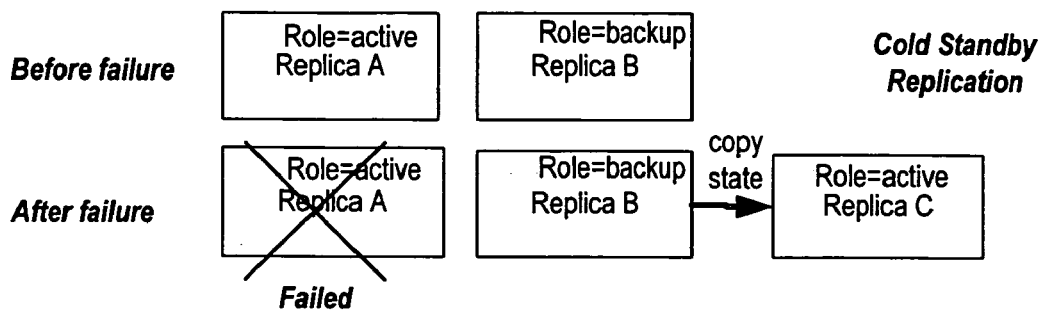
Fig 35-A
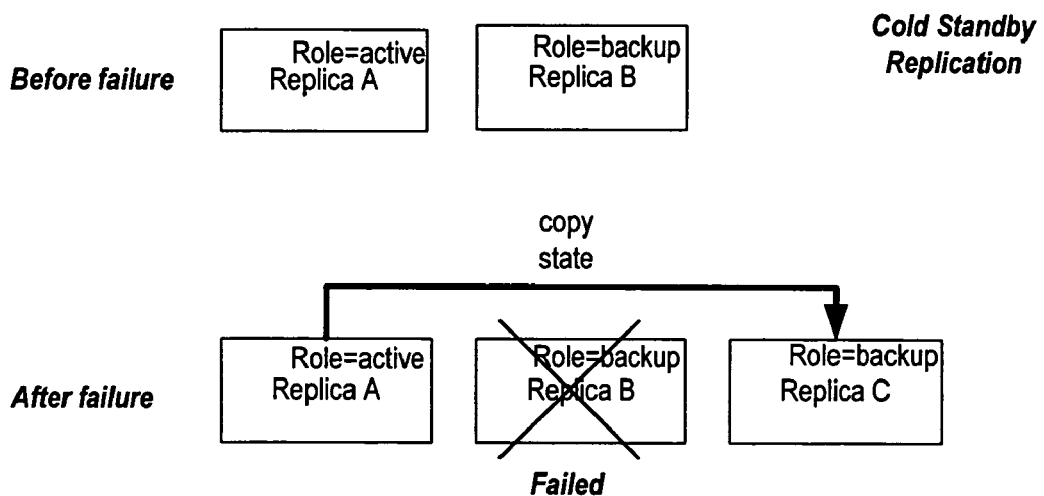
Fig 35-B

NG1 = (Node A, Node B, Node C)
NG2 = (Node D, Node E, Node F)
RG1 = (NG1, NG2)
RC = (HotStandby : RG1)
Associate RC with Auction EM Definition
Associate RC with Catalog EM Definition Distribution Manager "distribute" method
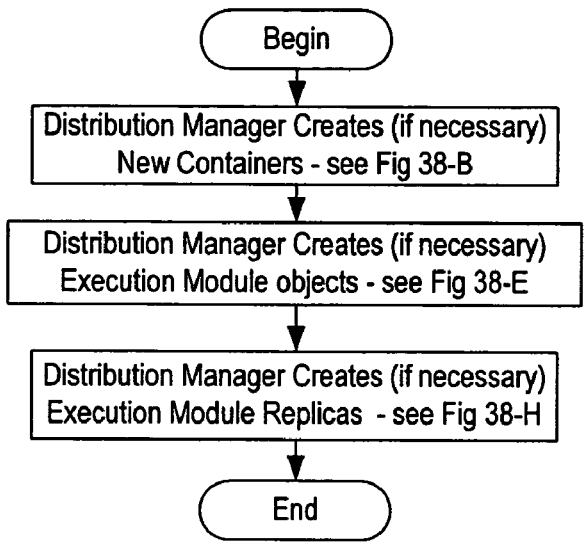
Fig 38-A
Distribution Manager "distributeContainers" method
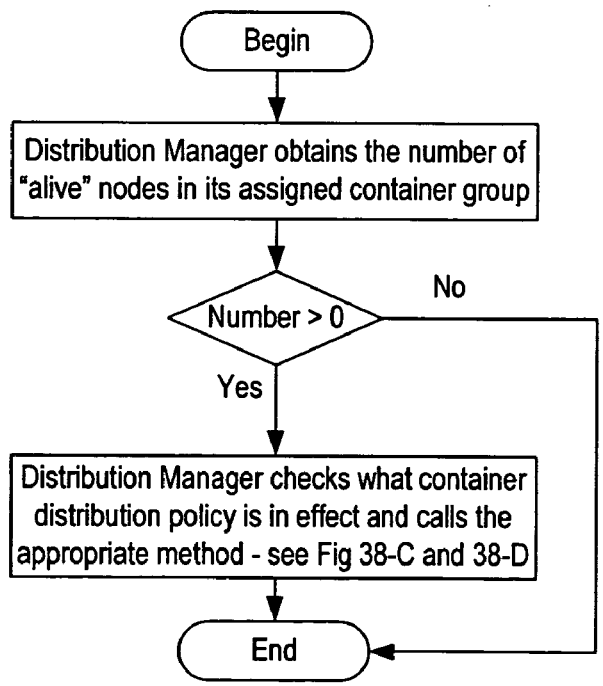
Fig 38-B Distribution Manager "distributeContainersPerNode" method
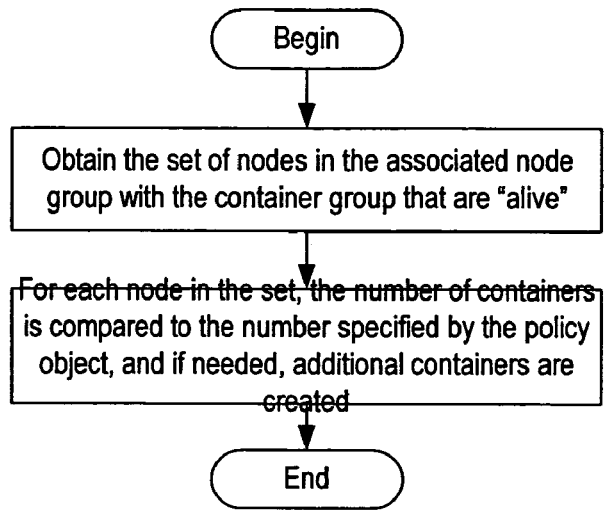
Fig 38-C
Distribution Manager "distributeContainersPerGroup" method
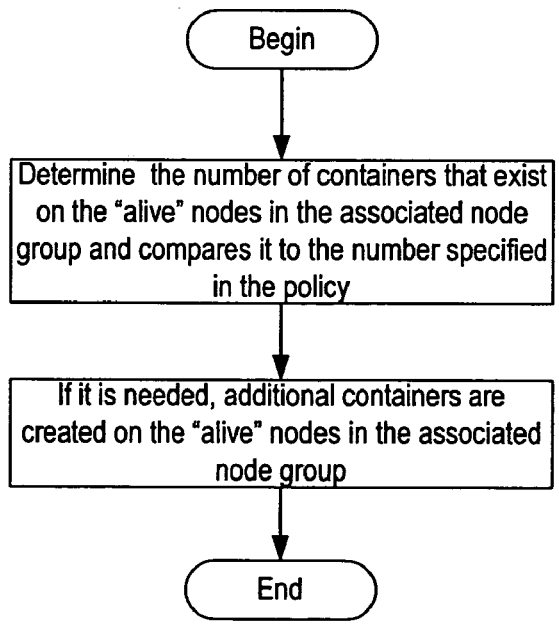
Fig 38-D

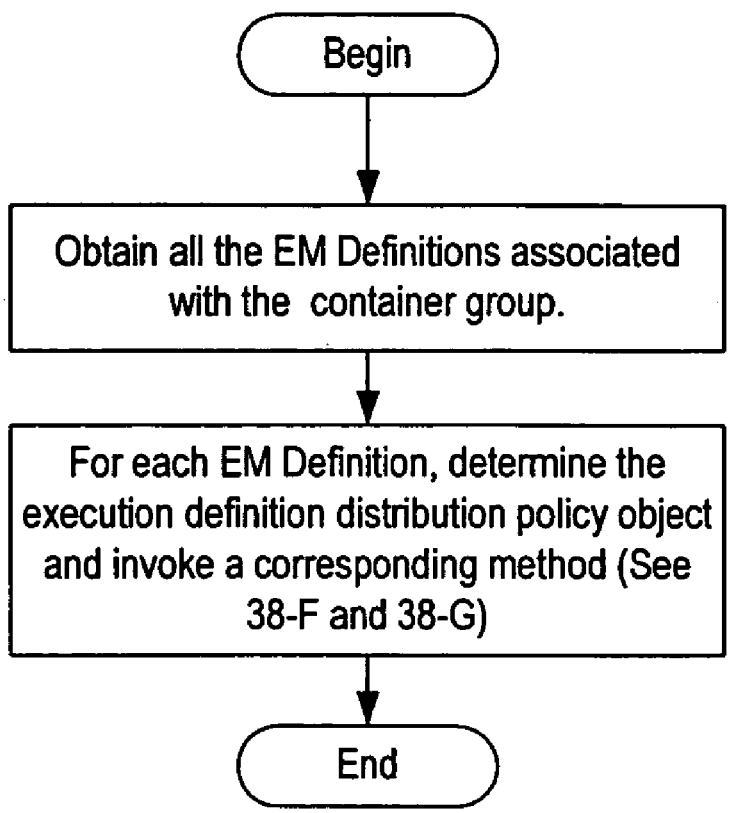
Fig 38-E

Distribution Manager "distributeEMsPerContainer"
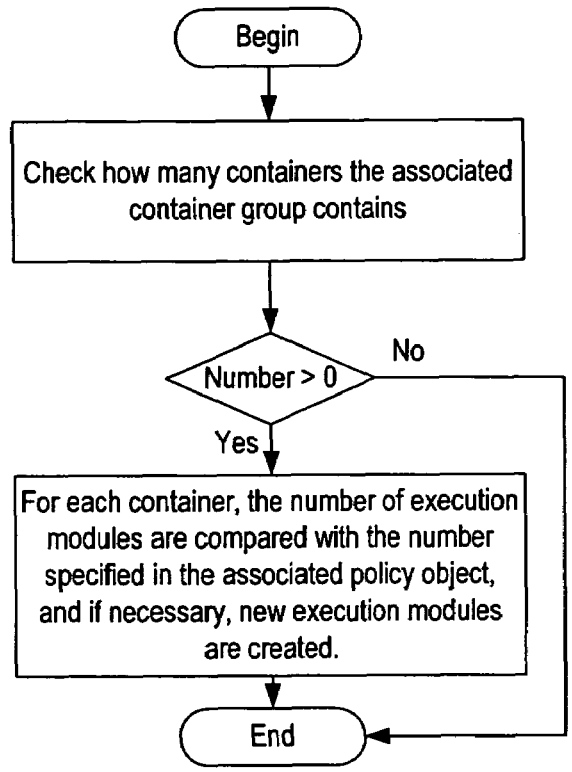
Fig 38-F
Distribution Manager "distributeEMsPerGroup" method
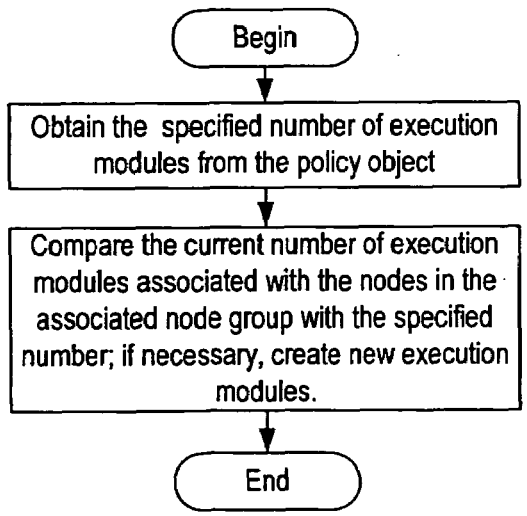
Fig 38-G Distribution Manager "distributeEMReplicas" method
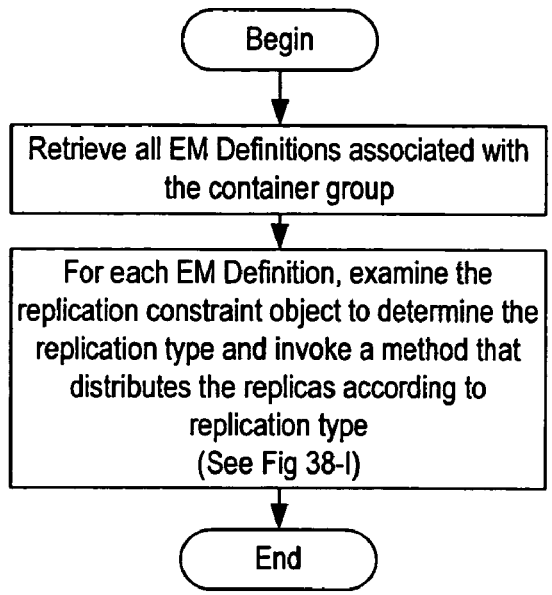
Fig 38-H
Distribution Manager "hotStandbyReplicationDistributeEMReplicas" method
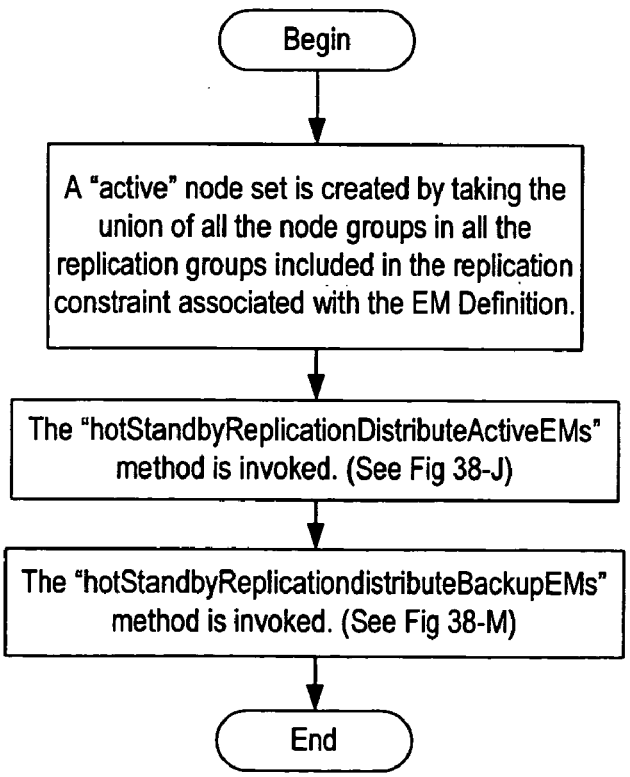
Fig 38-I

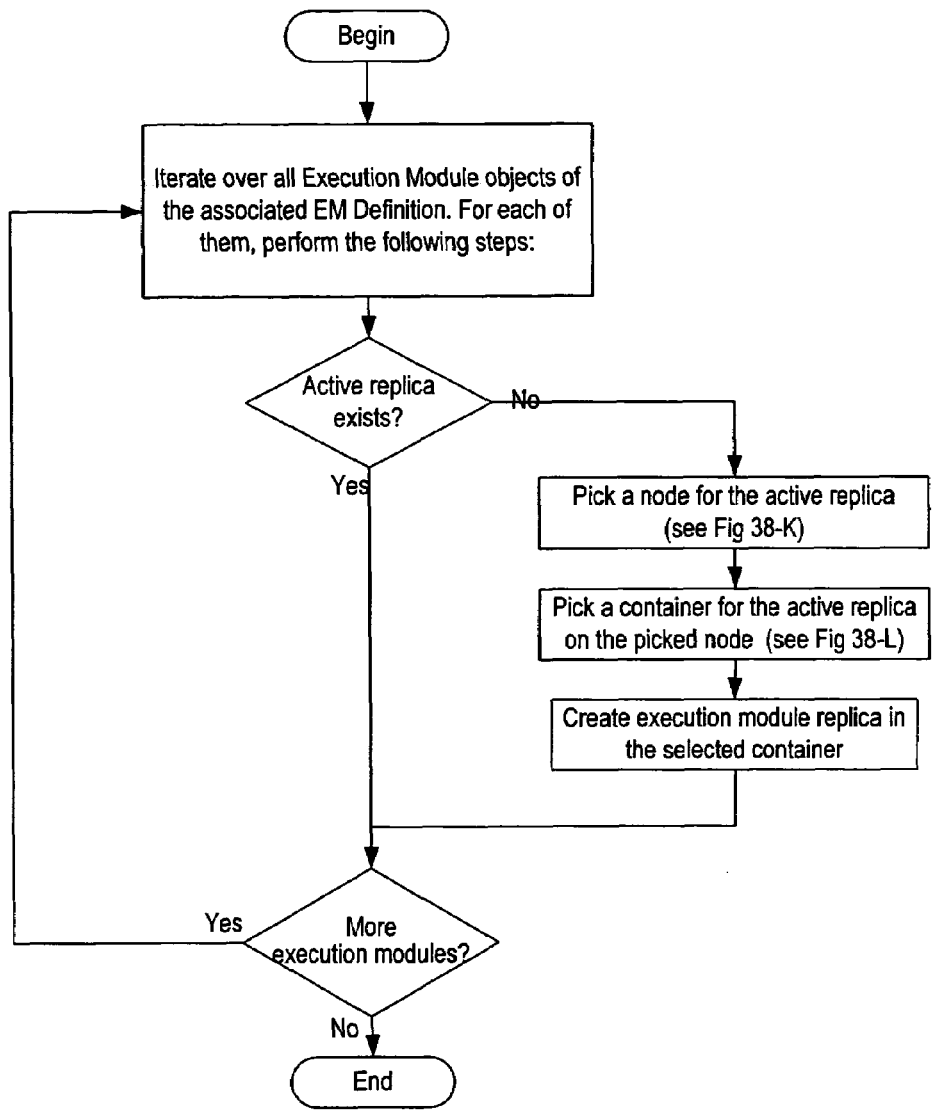
Fig 38-J

Distribution Manager "hotStandbyReplicationPickNodeForActive" method
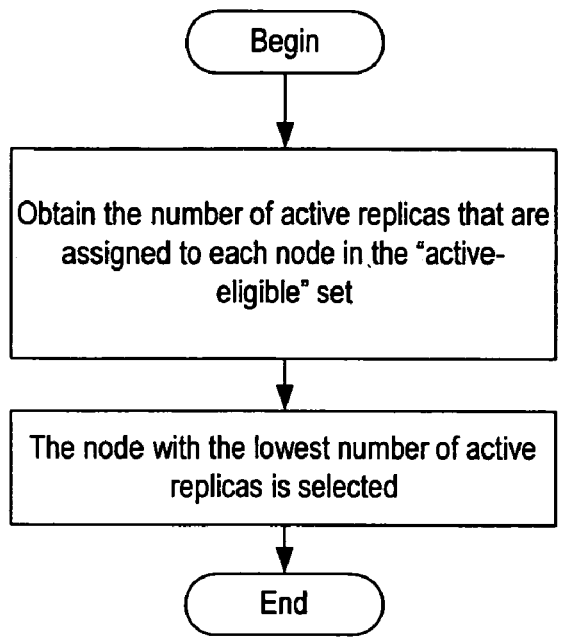
Fig 38-K
Distribution Manager "hotStandbyReplicationPickContainerForActive" method
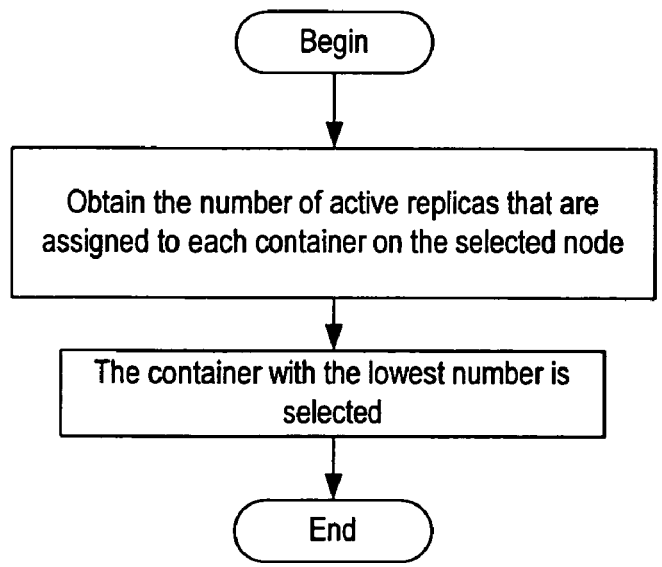
Fig 38-L

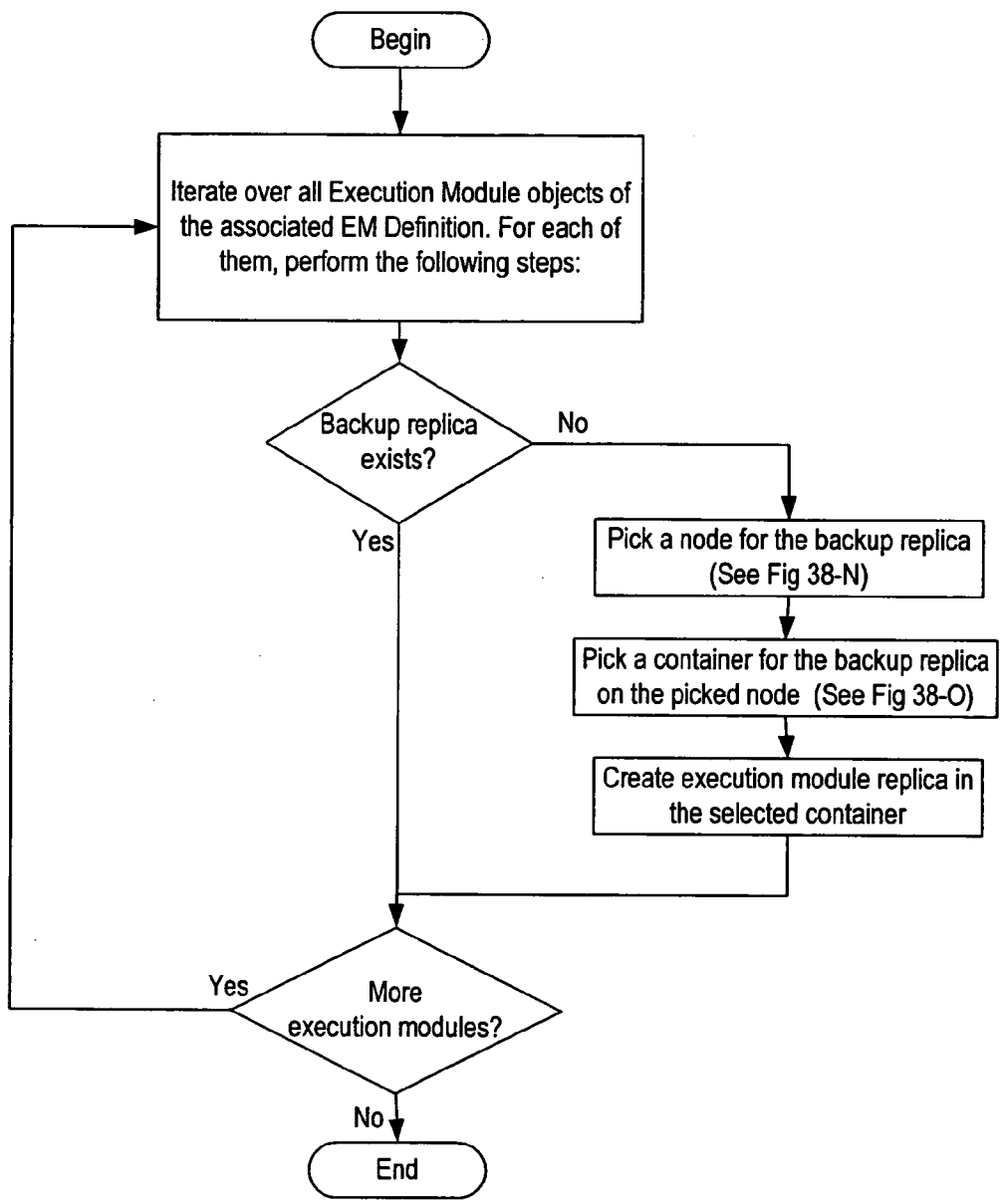
Fig 38-M

Distribution Manager "hotStandbyReplicationPickNodeForBackup" method
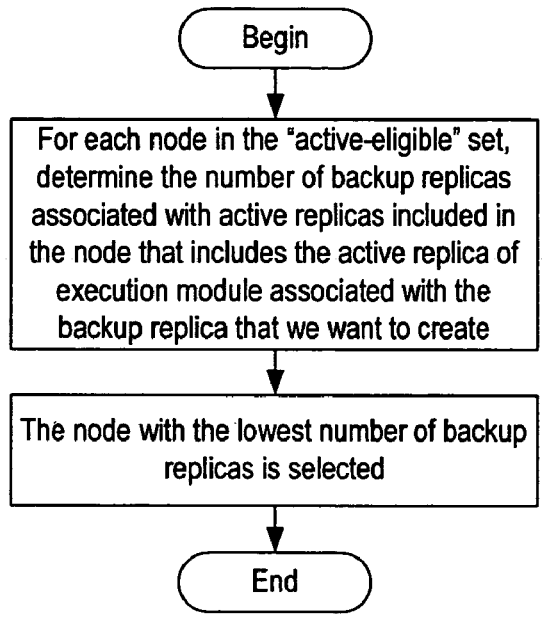
Fig 38-N
Distribution Manager "hotStandbyReplicationPickContainerForBackup" method
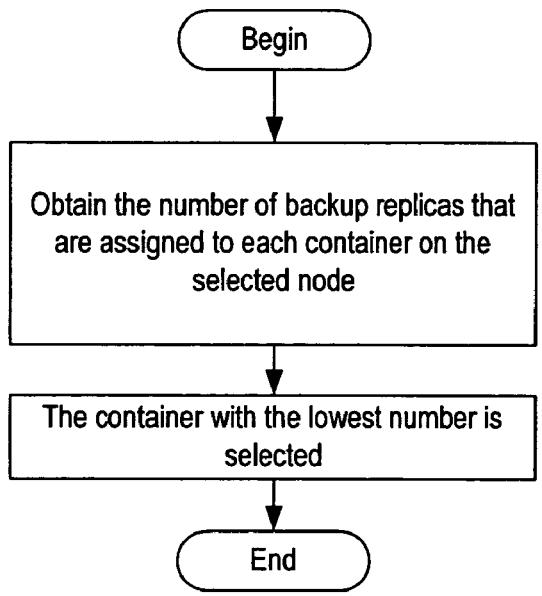
Fig 38-O

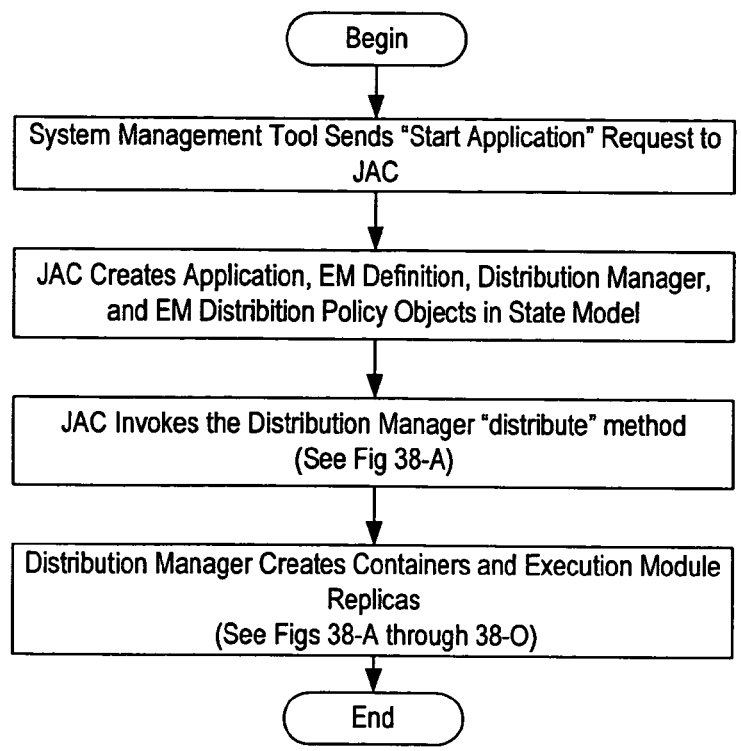
Fig 39-A
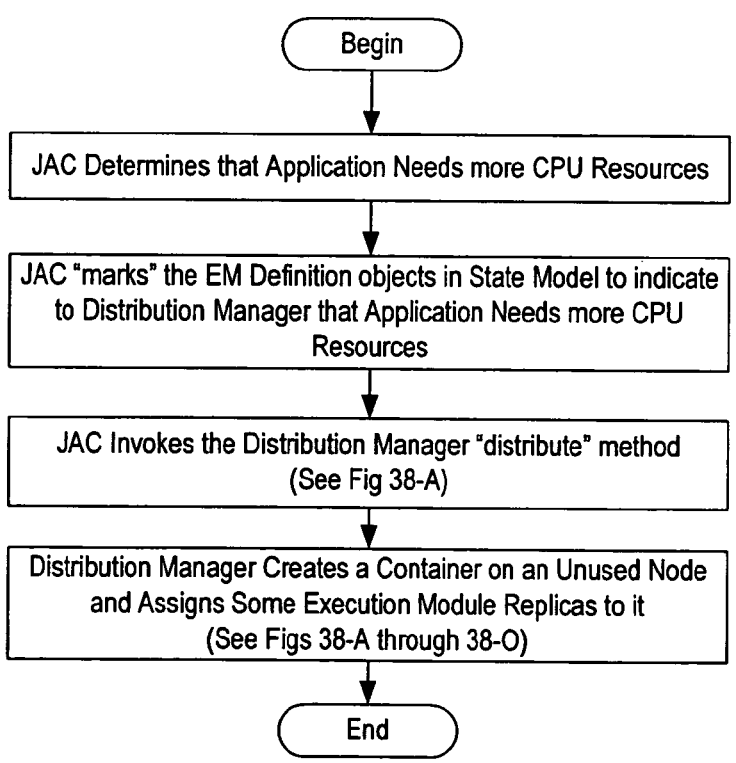
Fig 39-B

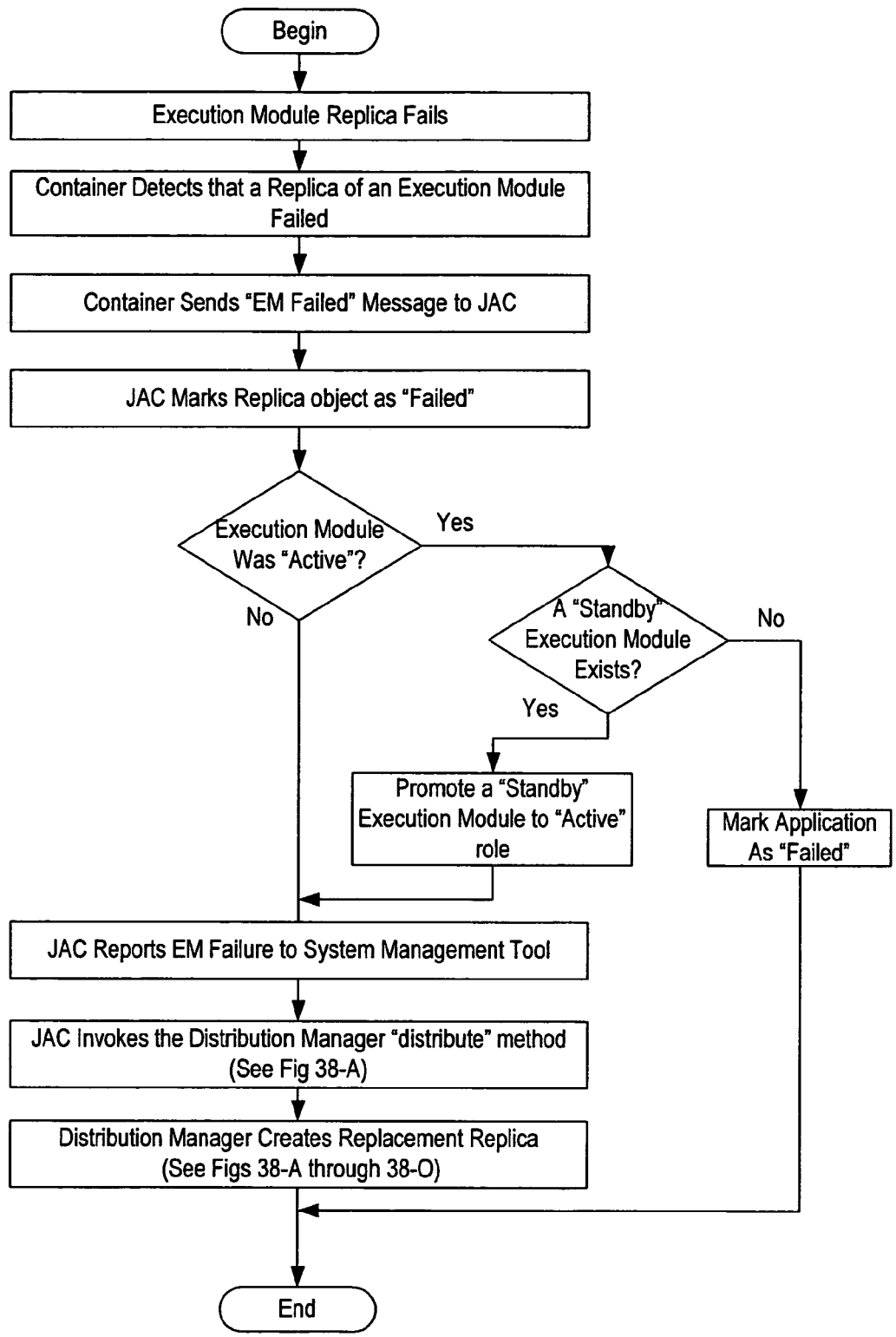
Fig 40-A

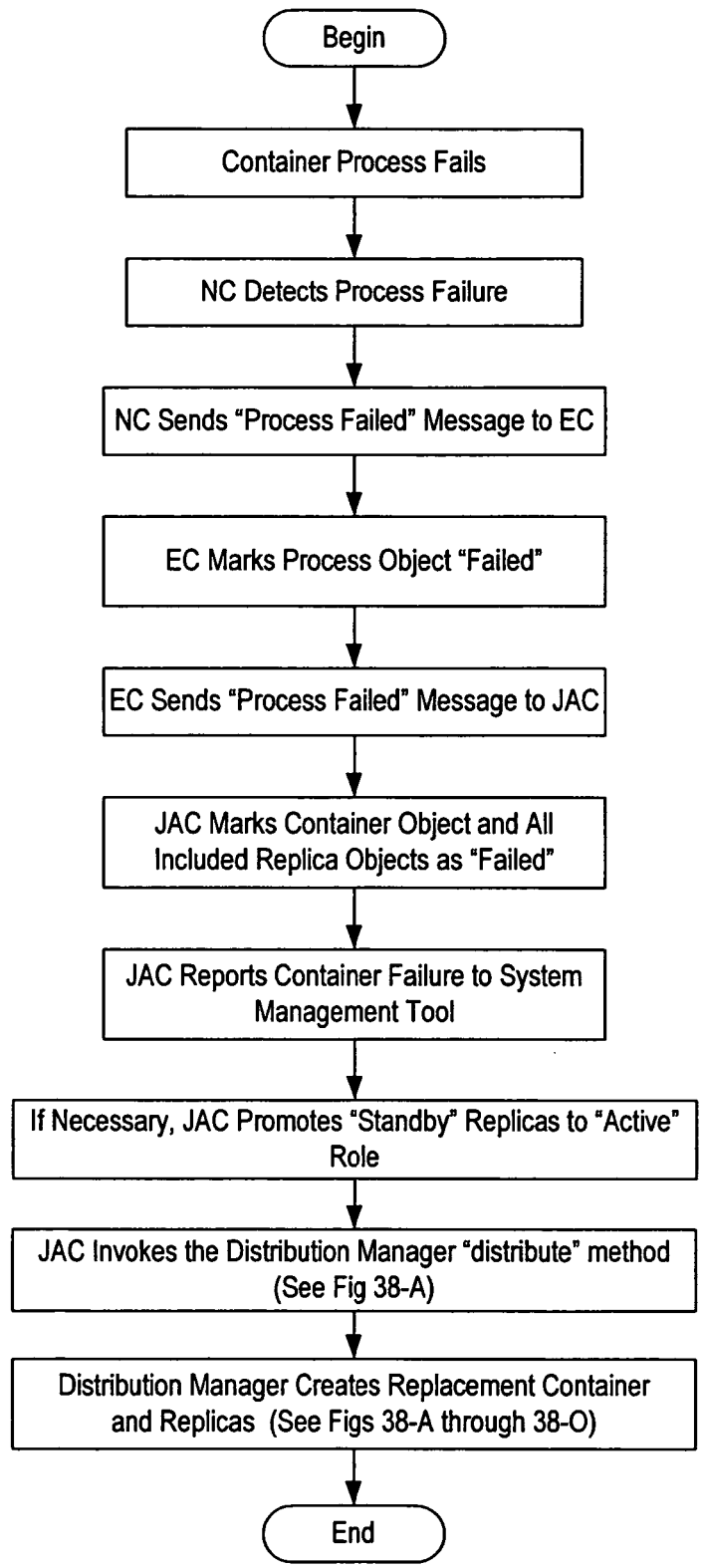
Fig 40-B

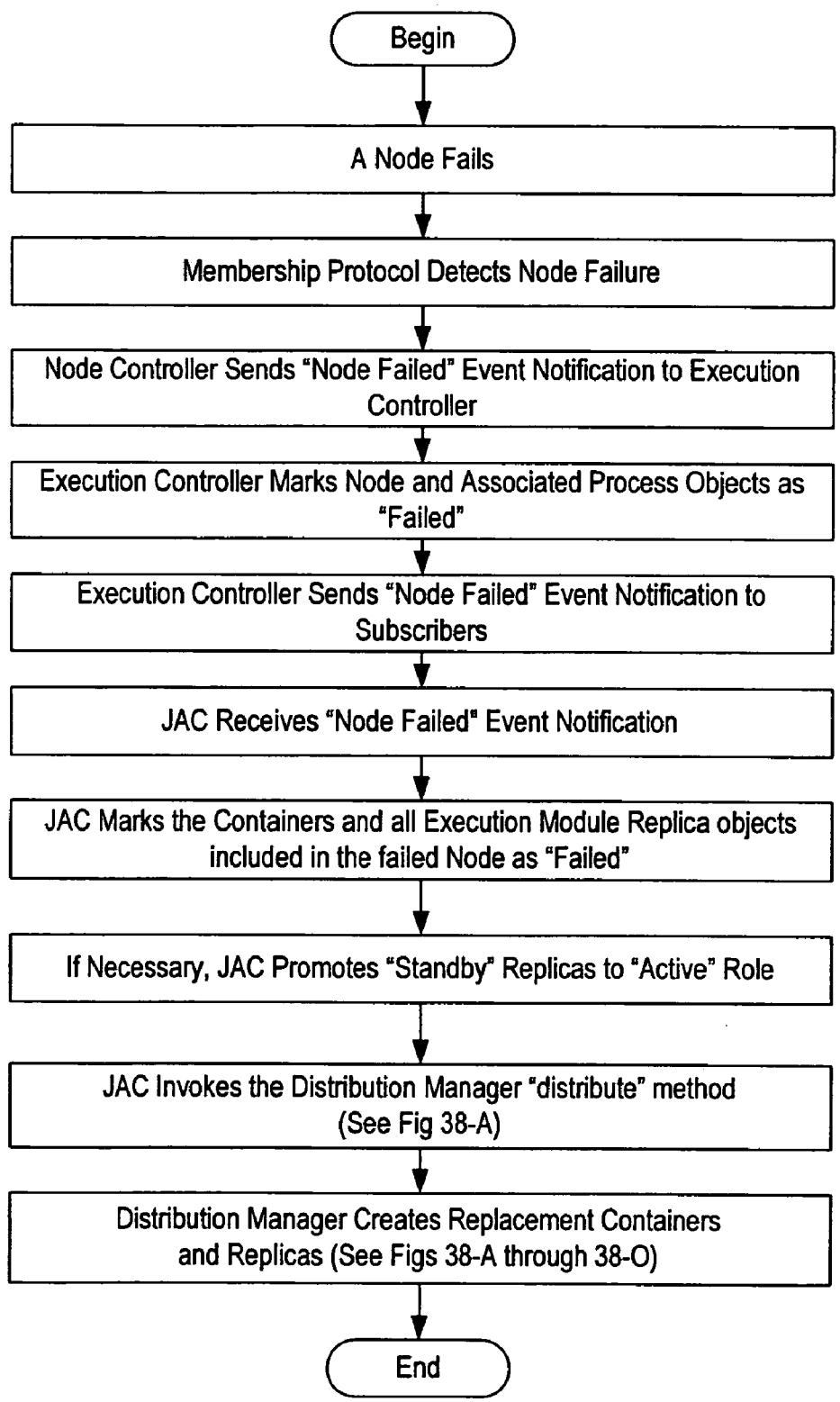
Fig 40-C

NG1 = (Node 1, Node 2, Node 3, Node 4 ... Node 10)
NG2 = (Node 11, Node 12, Node 13, Node 14 .. Node 20)
...
NG10 = (Node 91, Node 92, Node 93, Node 94 .. Node 100)

RG1 = (NG1, NG1)
RG2 = (NG2, NG2)
...
RG10 = (NG10, NG10)

RC = (HotStandby : RG1, RG2, RG3, RG4, RG5, RG6, RG7, RG8, RG9, RG10)

NG = (Node A, Node B, Node C, Node D, Node E, Node F)
RG1 = (NG, NG)     // Cardinality 2: 1 active + 1 backup
RG2 = (NG, NG, NG) // Cardinality 3: 1 active + 2 backups
RC1 = (HotStandby : RG1)
RC2 = (HotStandby : RG2)
Associate RC1 with Catalog EM Definition
Associate RC2 with Auction EM Definition ReliableNG = (Node A, Node B)
UnreliableNG = (Node C, Node D, Node E, Node F)
RG1 = (ReliableNG, UnreliableNG)   // 1 active + 1 backup
RG2 = (UnreliableNG, UnreliableNG, UnreliableNG) // 1 active + 2 backups
RC1 = (HotStandby : RG1)
RC2 = (HotStandby : RG2)
Associate RC1 with Auction EM Definition
Associate RC2 with Catalog Definition Enclosure1_NG = (Node A, Node B, Node C)
Enclosure2_NG = (Node D, Node E, Node F)
RG = (Enclosure1_NG, Enclosure2_NG)
RC = (HotStandby : RG1)
Associate RC with Auction EM Definition

Net1NG = (Node A, Node B, Node C)
Net2NG = (Node D, Node E, Node F)
RG1 = (Net1NG, Net1NG)
RG2 = (Net2NG, Net2NG)
RC1 = (HotStandby : RG1)
RC2 = (HotStandby : RG1, RG2)
Associate RC1 with Cell EM Definition
Associate RC2 with Dir EM Definition DISKNG = (Node A, Node B)
NODISKNG = (Node C, Node D, Node E, Node F)
DISKRG = (DISKNG, DISKNG)
NODISKRG = (NODISKNG, NODISKNG)
DISKRC = (HotStandby : DISKRG)
NODISKRC = (HotStandby : NODISKRG)
Associate DISKRC with Catalog EM Definition
Associate NODISKRC with Auction EM Definition NG1 = (Node A, Node B, Node C, Node D)
NG2 = (Node E, Node F)
RG = (NG1, NG2)
RC = (ColdStandby : RG)
Associate RC with Auction EM Definition NG1 = (Node A, Node B, Node C, Node D)
NG2 = (Node E, Node F)
NG3 = (Node A, Node B, Node C, Node D, Node E, Node F)
RG1 = (NG1, NG2)
RG2 = (NG3, NG3)
RC1 = (ColdStandby : RG1)
RC2 = (HotStandby : RG2)
Associate RC1 with Auction EM Definition
Associate RC2 with Catalog EM Definition

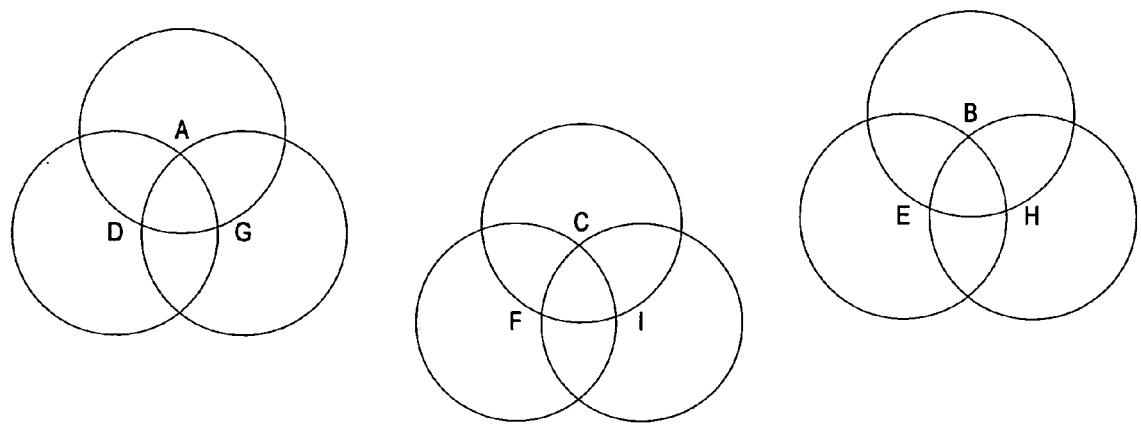
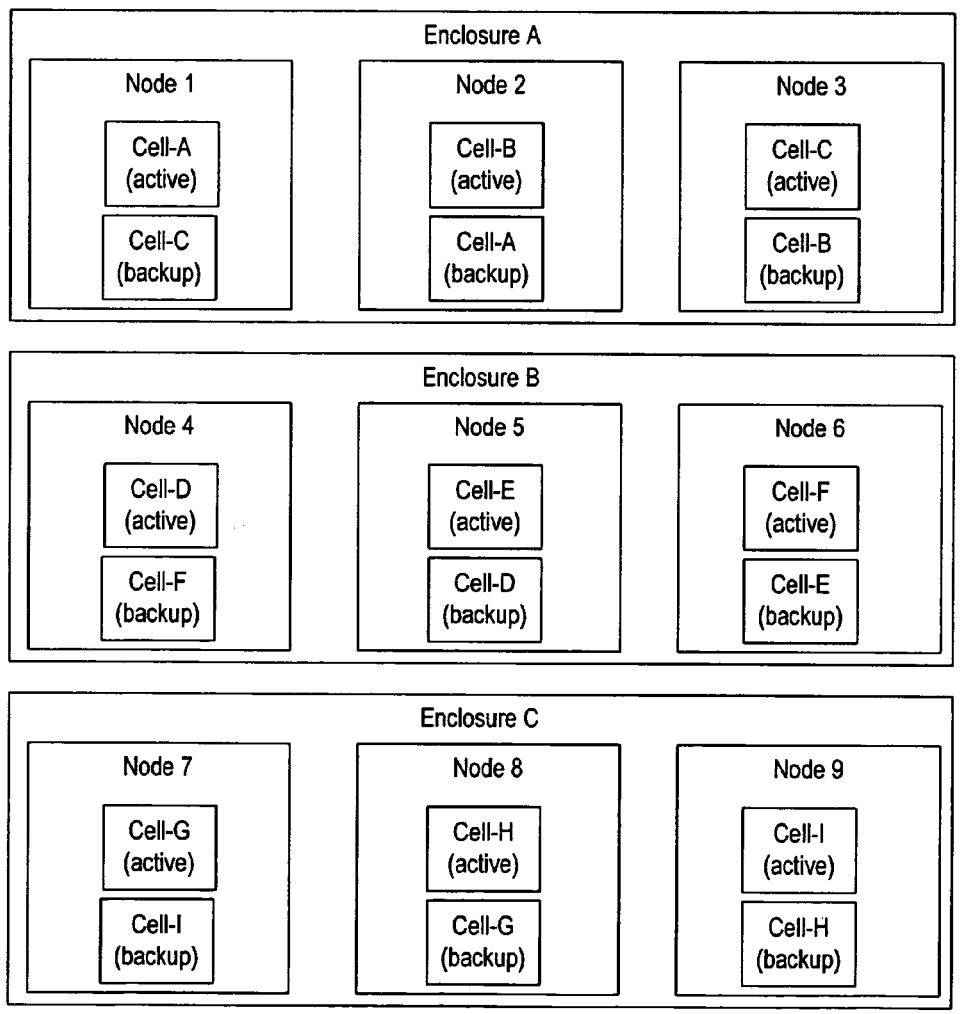
Fig 50

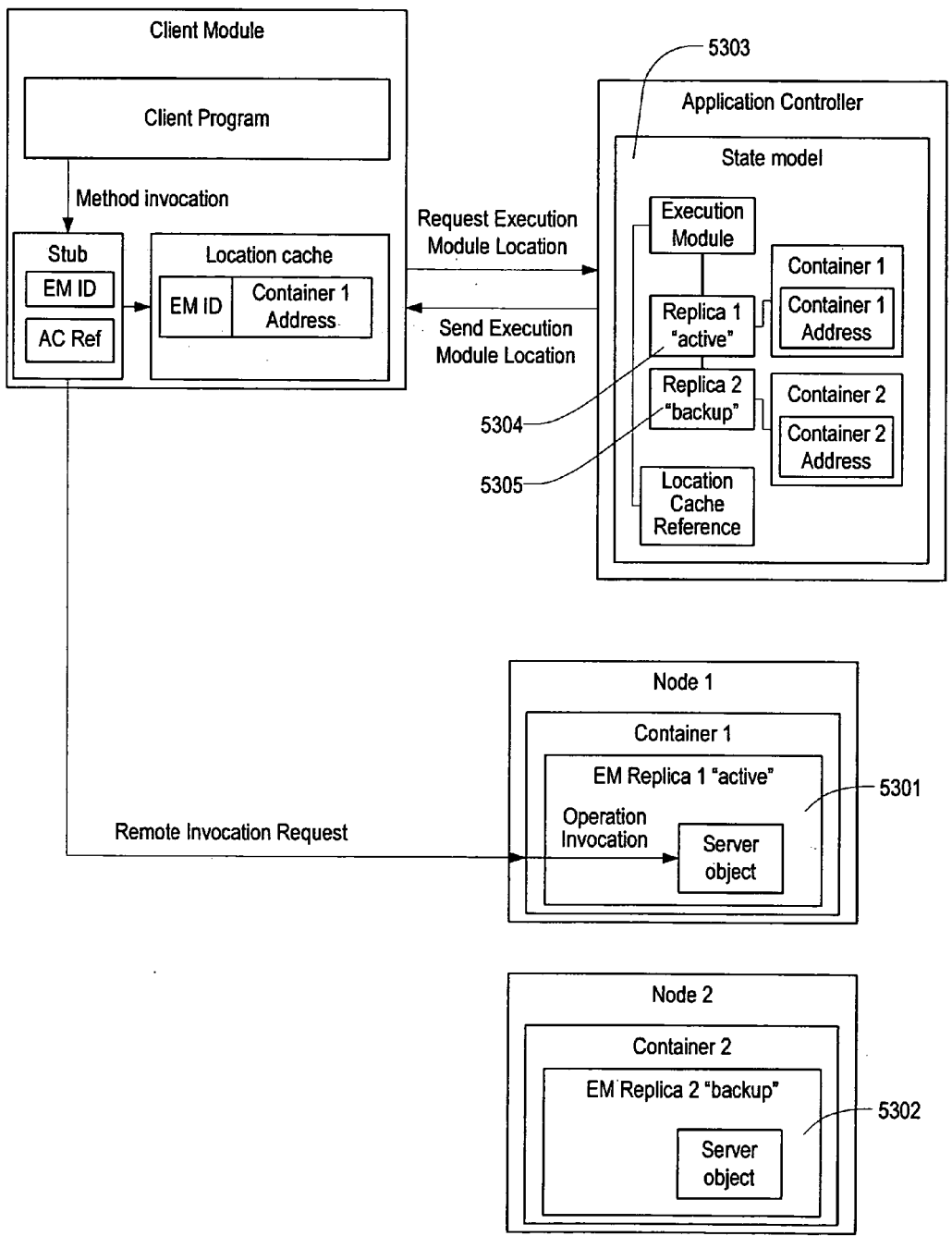
Fig 53-A

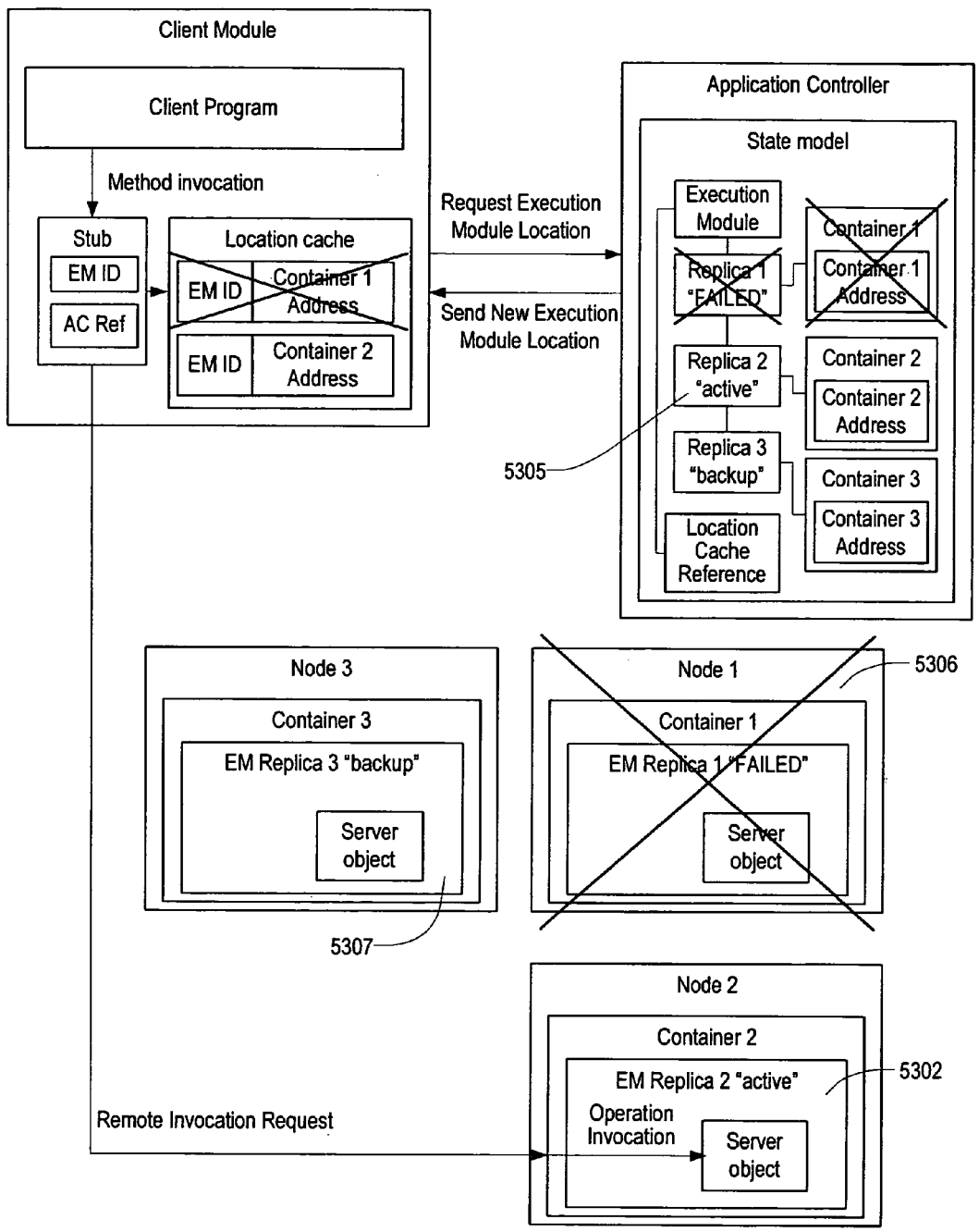
Fig 53-B

METHOD AND APPARATUS FOR EXECUTING APPLICATIONS ON A DISTRIBUTED COMPUTER SYSTEM

CROSS-REFERENCE TO RELATED APPLICATIONS

This application claims priority to and incorporates by reference:

U.S. Provisional Patent Application No. 60/454,510 titled METHOD AND APPARATUS FOR EXECUTING APPLICATIONS ON A DISTRIBUTED COMPUTER SYSTEM filed Mar. 12, 2003;

U.S. Provisional Patent Application No. 60/508,150 titled METHOD AND APPARATUS FOR EFFICIENT ONLINE TRANSACTION PROCESSING filed Sep. 30, 2003; and U.S. Provisional Patent Application No. 60/519,904 titled METHOD AND APPARATUS FOR EXECUTING APPLICATIONS ON A DISTRIBUTED COMPUTER SYSTEM filed Nov. 14, 2003.

BACKGROUND OF THE INVENTION

This invention relates to a method and system for executing application programs on distributed computer systems, including multiple nodes interconnected through a network, and to a method and system for protecting application programs from hardware and software failures.

Using a distributed computer system has three general advantages over using a single computer. First, it is possible to increase its performance by adding nodes. Second, a failure of one node does not impact the remaining nodes, which makes it possible for a software platform running on the distributed computer system to tolerate the failure. Tolerating node failures can greatly improve the overall availability of applications running on the distributed computer system. Third, it is possible to construct an inexpensive distributed computer system out of commodity parts, such as of small modular servers connected by high-speed Ethernet.

A distributed computer system typically includes a sophisticated software platform for applications to harness its power. The software platform includes an execution control system that can distribute the applications over the nodes of a distributed computer system and manage their execution. The main functions of the execution control system include starting of the application's modules on the nodes of the distributed computer system; handling of hardware and software failures; and balancing the applications' workload over the nodes of the system. In systems designed for continuous availability, the execution control system's functions also include coordinating the upgrades of applications and of the platform itself.

Software platforms and their execution control systems for distributed computer systems have been a subject of research and development since the advent of computer networks. We describe below the main forms of conventional systems related to software platforms for distributed computer systems and point out their limitations. The limitations are overcome by the system and method of the present invention.

The first form of system presently in use includes software platforms used in telecommunication systems, exemplified by Ericsson's Open telecom platform and An ATM transport and control platform. While these platforms achieve performance scalability and continuous availability, they suffer from several drawbacks that have prevented their use for applications outside of the telecommunication market segment. Their drawbacks include the following. Their application programming model is not standard, which inhibits adoption of the platform by application developers. Also, their application programming model is specific to the telecommunication application domain, and lacks the features required in other application domains. Further, their architecture is tightly coupled with the proprietary application programming model and cannot be easily extended to support other application programming models, such as the Java 2 Platform, Enterprise Edition ("J2EE") model. In addition, the applications of these systems use a proprietary, often complex, platform application programming interfaces ("API") to achieve performance scalability and continuous availability. As each telecommunication platform uses a different API, application developers are unwilling to learn these APIs, which severely limits the adoption of the platforms. Also, some platforms require that applications be written in a proprietary programming language and rely on specialized proprietary hardware or operating system features. Additionally, the applications for some of the platforms include non-trivial execution control logic invoked by the platform's execution control system. The inclusion of such logic in the applications raises the barrier for developing applications. Furthermore, as the control logic is limited to a single application, the platform cannot easily optimize the execution of multiple applications, and the control logic in multiple applications can contradict each other. Some platforms cannot optimally distribute applications across the nodes of a distributed computer system if some nodes have higher CPU capacity than other nodes, and others require that the nodes all of the same type (for example, the nodes must be Intel processor-based computers running Linux). Lastly, some platforms, especially those for high-availability applications, dramatically restrict the network topology and sometimes require a "static" configuration (for example, an application can run only on two nodes and would not work if the system changed the number of nodes).

The second form of system presently in use includes high-availability clustering frameworks exemplified by Sun Cluster 3.0 Concepts and Windows Server 2003, Server Cluster Architecture. The main functionality of such a framework is to monitor a service and restart it on another node, should the node on which the service is running fail. The main drawbacks of these clustering frameworks include the following. The distribution model is limited to services with restartable processes. The platform starts and restarts the processes on the nodes according to some criteria associated with the service. This simplistic model does not work for applications that are composed of fine-grained distributable modules that are smaller than a process. For example, the service distribution model does not work for J2EE applications and cannot be easily extended to do so. Also, The framework does not provide a single-system view to management tools. Rather, each node is presented as an independent computer. The administrative complexity of administering each node individually prevents the frameworks from being used in distributed computer systems with large number of nodes. Additionally, most frameworks do not allow mixing nodes of different processor architectures, or nodes running different operating systems.

The third form of system presently in use includes platforms for distributed computer systems used for scientific applications such as Sun HPC 3.1 AnswerBook Collection from Sun Microsystems Inc. and Beowulf Linux Clusters. Their main drawbacks include the following. Their application programming model is limited to scientific applications. The programming model does not support other important applications types, such as transaction processing applications, Web services, database services, or telecommunication applications. Also, they do not provide the application availability typically required by enterprise and telecommunication applications, such as those listed in the previous item.

The fourth form of system presently in use includes clustered servers supporting Java 2 Platform, Enterprise Edition ("J2EE") applications such as WebLogic 7.0, Creating and Configuring Server Domains from BEA Systems. These clustered servers are designed to allow applications to execute on multiple identically-configured J2EE server processes and perform transactions on data in a shared database. The main limitations of this type of system include the following. The servers are limited to a single programming model (i.e. to the J2EE applications). If the execution environment includes other distributed components, such as Web or database servers, the execution of these other components is controlled by a different distributed software platform. Using multiple different software platforms increases the administrative complexity of the distributed computing environment. Also, with the exception of Web session state, which can be stored in the application servers' memories, J2EE applications are stateless (meaning that all their application state is stored in a database outside of the application). Therefore, J2EE clustering platforms cannot be used generally for applications that have in-memory state spanning transaction boundaries. For example, it would be difficult or impossible to use clustered J2EE servers to run distributed non-J2EE Java applications or telecommunication call-control applications with in-memory state. Additionally, they do not provide single-system images of the computing resources. Although the J2EE servers typically include some mechanism to automatically provision applications to multiple nodes, each node appears as an independent computer for system administration purposes. This makes the system harder to use with a large number of nodes.

The fifth form of system presently in use is described in two United States patent applications. The first is titled "Method and Apparatus for Providing Application Specific Strategies to a JAVA Platform Including Start and Stop Policies" and has Ser. No. 09/812,536. The second is titled "Method and Apparatus for Providing Application Specific Strategies to a JAVA Platform Including Load Balancing Policies" and has Ser. No. 09/812,537. These references describe how control modules included in Java applications customize how the execution control system starts, stops, recovers failures, and balances the application service modules. A similar system is described in Ericsson's A Java application platform, which uses the term "root block" instead of "control module". The main drawbacks of this type of system include the following. The mechanism seems to be limited to Java applications. Second, each application typically includes a "control module". The control module includes the implementation of callback operations invoked by the platform during starting, stopping, failure recovery, and load-balancing of the application. The development of these operations would likely require specialized expertise that is not common among application developers. Also, at a closer inspection of the description of such systems indicates that the control modules are likely to include execution control state. If the execution control state is lost as a result of a failure, it is not clear from the description of these systems how the lost state could be reconstructed. If the state could not be reconstructed, the applications associated with the failed control module must be stopped and restarted, at least in some systems, which is unacceptable for most applications that require continuous availability. Additionally, the applications are conventionally organized into a parent-child control hierarchy. This concept is not part of the standard Java application programming model and would be foreign to application developers. Finally, the control modules are written by application developers, who are not experts in the field of execution control. Therefore, the control modules are likely to contain more bugs than the platform that is developed and well tested by experts in the field. As a software error in one of the control modules could negatively impact the operation of the entire platform, including other applications, the use of control modules may reduce the overall reliability and availability of the entire distributed computer system.

Some prior art systems use replication as a technique for achieving tolerance to failure thereby increasing the availability of the application to its users. When replication is used, an application is partitioned into smaller execution modules and each execution module is replicated on two or more nodes of a distributed computer system. Many of the prior-art systems suffer from one or both of the following flaws. First, some systems using prior art distribute the replicas across the nodes such that after a failure of node, another node in the system will take over the entire workload of the failed node. The disadvantage of this approach is that the capacity of the system (and its price) is doubled in order to handle a node failure (these systems are sometimes called 2-N availability (or 2-N redundancy) systems because twice as many nodes are used in order to tolerate a single node failure). Second, some other systems of prior art distribute the replicas of execution modules across the nodes such that after a failure of any node, all the remaining nodes take over a portion of the workload of the failed node (these systems are often called N+1 availability (or N+1 redundancy) systems because only one extra node is required to tolerate a single node failure). The main problem with this approach is that if the number of nodes is high, the exposure to a double node failure could become significant. With a double node failure (when a second node fails shortly after the failure of a node), the state of an application could be lost because the state was replicated across the two failed nodes.

SUMMARY OF THE INVENTION

An execution control system for a distributed computer system consistent with the present invention can support more types of applications than systems using prior art by associating applications of the same type with an application controller that includes the control operations specific to the application type. The execution control system includes an execution controller, one or more node controllers, and one or more application controllers. Each node controller is associated with a node and has the capability to start and stop processes on the node. The execution controller maintains the information about the distributed computer system including the knowledge of the nodes that are present in the distributed computer system, the processes executing on all the nodes, the node groups defined in the distributed computer system, and the application controllers present in the system. An application controller implements the application execution model for a particular type of application. The application execution model specifies how an application includes distributable application modules, how the application modules could be associated with processes, and how the application modules should be managed by the application controller. The functionality provided by an application controller typically includes the starting of applications, stopping of applications, load-balancing of applications over the nodes, recovering applications from failures, and upgrading applications to a new version. The application controllers utilize the execution controller. To its users, the execution control system provides a single-system image of the distributed computer system and applications running on it. The execution control system enables the distributed computer systems to include nodes of different computer architectures and nodes that use different operating systems. The execution control system further uses node groups to simplify administration of distributed application on the distributed computer system.

The disclosure further describes replication constraints that an execution control system consistent with the present invention can use for replicating application modules across the nodes of a distributed computer system. A distributed computer system that includes replication constraints can protect applications better from hardware and software failure than systems using prior art and/or it is easier to manage than systems using prior art.

The disclosure further describes how an application controller controls remote invocation and creation of server objects located in the execution modules. The advantages include location transparency of server objects; ability to relocate server objects; transparent failure recovery; partitioning of server objects; and on-demand creation of execution modules to store new server objects.

The various embodiments of the present invention include many features. The features include providing a flexible and customizable system for executing applications on distributed computer systems as well as allowing customers to execute on the same distributed computer system applications of different types, which could be written in different programming languages and according to different application programming models. The features also include, enabling the execution of many pre-existing applications without the need to modify them and allowing customers to extend the functionality of the execution control system by adding components developed by customers or third parties. Further features include providing for a distributed computer system comprising many individual nodes to be viewed as a single system by application developers and allowing a distributed computer system comprising a large number of individual nodes to be viewed as a single system from the perspective of system management and application deployment.

Various embodiments of the present invention also include additional features. The features including achieving continuous availability of applications even if the application programs or the operating system contain faults (software bugs) and even if some individual parts of the computer hardware fail. Other features include providing a flexible and customizable method for quickly (typically under one second) detecting and recovering applications from hardware and software failures and freeing the application developer from having to develop complex distribution and failure recovery logic in the application. Further features include providing a flexible method for load-balancing applications' work across the nodes of the distributed system, thereby achieving application scalability to a large number of nodes and allow a distributed computer system to include nodes with different computer architectures and operating systems. Also, the features include optimally using a distributed computer system that includes nodes with different mean-time between failures (MTBF) rating and allowing the applications and the software platform to be upgraded to a new version without stopping the applications or losing availability of the service implemented by the applications.

Various embodiments of the present invention also include other features. These features include optimally replicating the state of applications running on a distributed computers system across the nodes such that the probability of losing their state is minimized and allowing applications to specify in a flexible way how many replicas of their state should be created and how the replicas should be distributed across the nodes of the distributed computer systems. Additional features include achieving an optimal balance between reliability and system cost for applications using replication that are exposed to "double failures" and allowing applications to avoid failure exposures resulting from shared points of failure. Further features include allowing applications to exploit non-uniform network connectivity among the nodes and allowing applications requiring a resource to execute on a distributed computer system even if only a subset of the nodes includes the resource. One other feature is to allow concurrent execution of multiple applications on a distributed computer system even if the application uses different replication types.

BRIEF DESCRIPTION OF DRAWINGS

FIG. 12 depicts an exemplary service that uses the GroupDistribution(N) policy object.

FIGS. 34-A and 34-B are diagrams illustrating how a failure of a replica of an execution module that uses hot-standby replication is handled.

FIGS. 35-A and 35-B are diagrams illustrating how a failure of a replica of an execution module that uses cold-standby replication is handled.

FIGS. 38-A through 38-O are flow charts showing steps performed by an exemplary distribution manager object's "distribute" method, which distributes containers and execution module replicas across the nodes of a distributed computer system.

FIG. 39-A is a flow chart illustrating a method of starting an application that includes execution module replicas.

FIG. 39-B is a flow chart illustrating a method used to increase the processing capacity of an application by increasing the number of nodes on which it executes.

FIGS. 40-A through 40-C are flow charts illustrating methods of exemplary failure recovery.

FIG. 50 is a block diagram of elements of a system using a combination of replication and an application-specific distribution manager.

FIG. 53-A is a block diagram illustrating the invocation of a server object located in a replicated execution module before the failure of the active execution module replica.

FIG. 53-B is a block diagram illustrating the invocation of a server object located in a replicated execution module after the failure of the active execution module replica.

DETAILED DESCRIPTION

Figure 1:
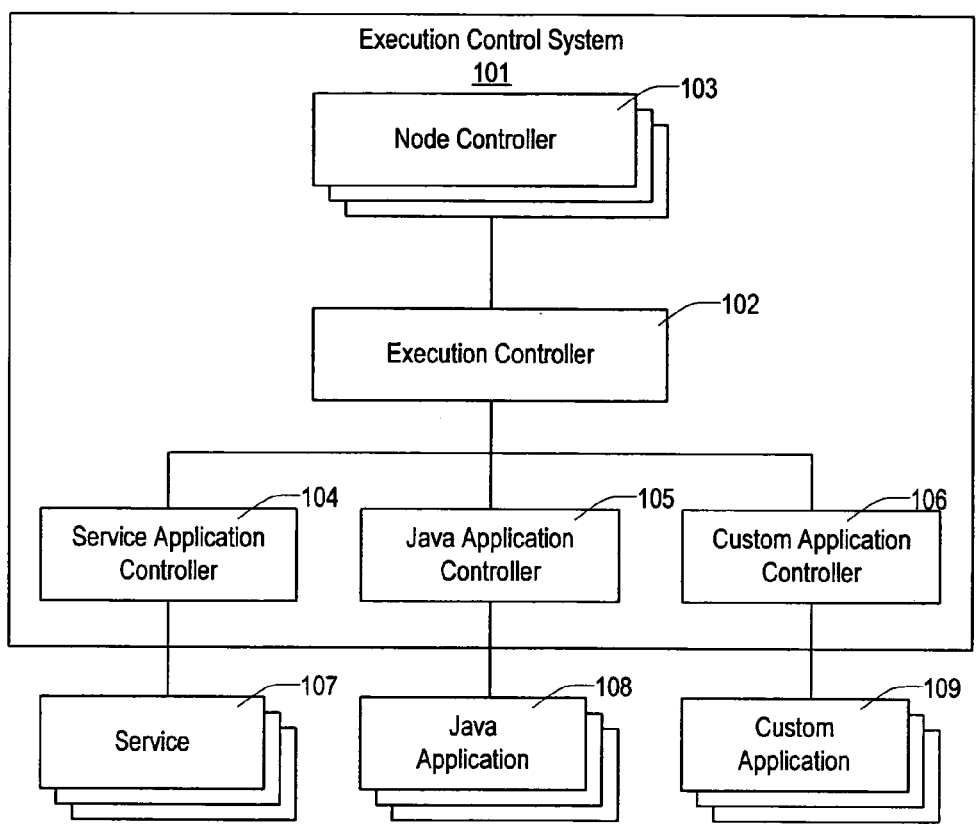
FIG. 1 illustrates the main components of the execution control system consistent with the present invention.

An execution control system for a distributed computer system consistent with the present invention can support more types of applications than systems using conventional designs by associating applications of the same type with an application controller that includes the control operations specific to the application type. The execution control system includes an execution controller, one or more node controllers, and one or more application controllers. Each node controller is associated with a node and has the capability to start and stop processes on the node. The execution controller maintains the information about the distributed computer system including the knowledge of the nodes that are present in the distributed computer system, the processes executing on all the nodes, the node groups defined in the distributed computer system, and the application controllers present in the system. An application controller implements the application execution model for a particular type of applications. The application execution model specifies how an application includes distributable application modules, how the application modules could be associated with processes, and how the application modules should be managed by the application controller. The functionality provided by an application controller typically includes the starting of applications, stopping of applications, load-balancing of applications over the nodes, recovering applications from failures, and upgrading applications to a new version. The application controllers utilize the execution controller. To its users, the execution control system provides a single-system image of the distributed computer system and applications running on it. The execution control system enables the distributed computer systems to include nodes of different computer architectures and nodes that use different operating systems. The execution control system further uses node groups to simplify administration of distributed application on the distributed computer system.

The system of the present invention may be implemented with components or modules. The components and modules may include hardware (including electronic and/or computer circuitry), firmware and/or software (collectively referred to herein as "logic"). A component or module can be implemented to capture any of the logic described herein. For instance, the various controllers may be embodied as modules or components.

The disclosure further describes replication constraints that an execution control system consistent with the present invention can use for replicating application modules across the nodes of a distributed computer system. A distributed computer system that includes replication constraints can protect applications better from hardware and software failure (and is easier to manage) than systems presently in use.

The disclosure further describes how an application controller controls remote invocation and creation of server objects located in the execution modules. The advantages include location transparency of server objects; ability to relocate server objects; transparent failure recovery; partitioning of server objects; and on-demand creation of execution modules to store new server objects.

Execution Control System Concepts

Execution Control System Components

FIG. 1 illustrates the main components of the execution control system ("ECS") 101 and their relationship to applications executing under the supervision of the execution control system 101.

ECS 101 includes an execution controller 102, one or more node controllers 103, and one or more application controllers. Each application controller implements the execution model suitable for a particular type of applications supported by the distributed computer system.

For example, the exemplary ECS 101 in FIG. 1 includes three application controllers: a service application controller 104, which is suitable for controlling applications that are services 107 including operating-system level processes; a Java application controller 105, which is suitable for controlling Java applications 108 including containers and execution modules (container and execution modules are explained later in this disclosure); and custom application controller 106, which is suitable for controlling applications 109 that have a custom structure and use a custom application execution model.

Figure 2:
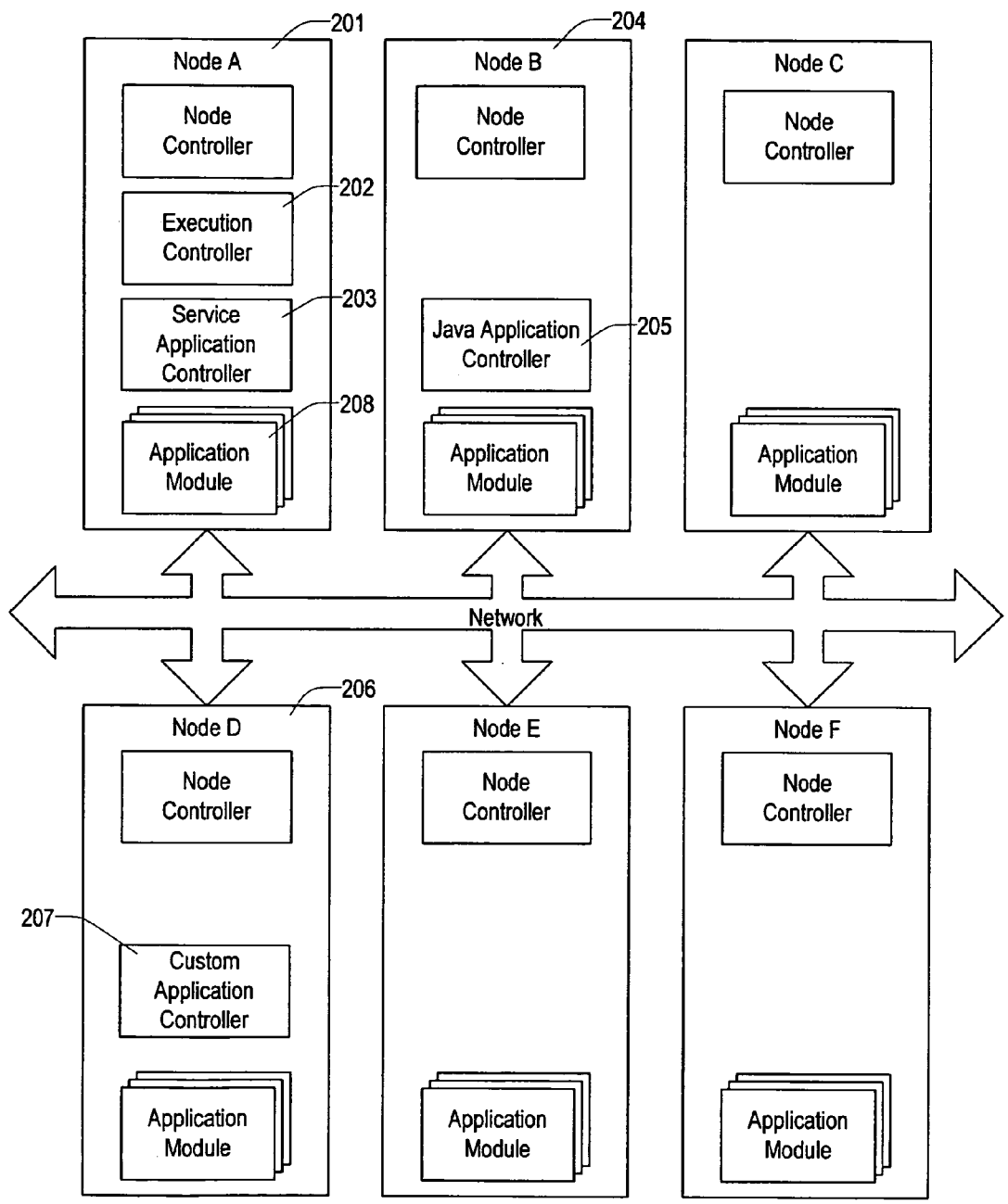
FIG. 2 depicts representational distribution of the main components the execution control system over the nodes of an exemplary distributed computer system.

The node controllers 103, execution controller 102 and application controllers are distributed over the nodes of a distributed computer system. FIG. 2 illustrates an exemplary distributed computer system including nodes interconnected by a network. The distributed computer system includes an execution control system. The exemplary distributed computer system includes six nodes but other embodiments of the invention may use fewer or more nodes. Each node in the distributed computer system includes a node controller.

Node A 201 includes the execution controller 202 and the service application controller 203. Node B 204 includes the Java application controller 205. Node D 206 includes the custom application controller 207.

In other embodiments of the invention, the components could be distributed over the nodes differently although each node may include a node controller. For example, while the exemplary system in FIG. 2 collocates the execution controller and the service application controller on the same node, in other embodiments, these two controllers might be on different nodes. Although the exemplary system in FIG. 2 includes three application controllers, other embodiments may include fewer or more application controllers, or include different application controllers than those illustrated in FIG. 2.

In some embodiments of the invention, the execution control system includes backup copies of the execution and application controllers located on different nodes. The backup copies are used to recover the state of the controllers in case of failure.

The nodes in the exemplary distributed computer system illustrated in FIG. 2 that include the parts of the execution control system also include application modules 208. Application modules are, for example, operating-system level processes and other types of executable objects such as execution modules of Java applications. In other embodiments of the invention, the application modules could be located on different nodes from the nodes that include the execution controller and the application controllers.

Application, Application Modules, and Application Execution Model

A distributed application ("application") is a computer program including one or more related application modules that could be distributed over the nodes of a distributed computer system. There are different types of distributed applications, each using different types of applications modules and each using a different application execution model. For example, while service applications use application modules that correspond directly to operating-system level processes, Java 2 Platform, Enterprise Edition ("J2EE") applications use two kinds of applications modules. The larger modules, which are called containers, correspond to operating-system level processes. The smaller modules, which are called "execution modules" in this disclosure, include the application's Java classes loaded into the container.

An application execution model is a specification of how an application includes application modules and how the application modules shall be managed at runtime. The application execution model includes the rules for how many application modules should be created for an application; how the application modules should be distributed over the nodes of the distributed computer system; how the application modules could be associated with processes; how to redistribute the application modules to achieve more leveled load across the nodes; how to respond to failures; and how to upgrade the application to a new version.

Figure 3:
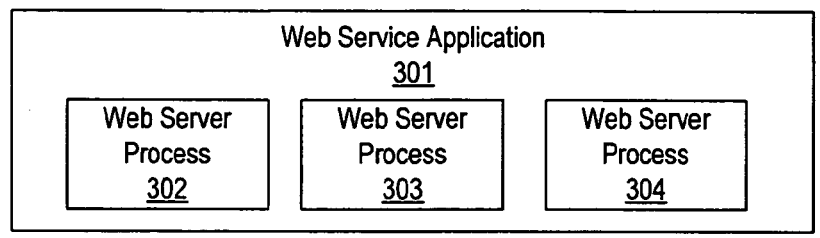
FIG. 3 depicts an exemplary distributed application that is a Web service including multiple service processes.
Figure 4:
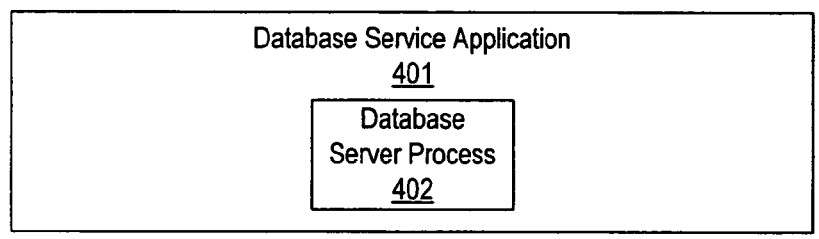
FIG. 4 depicts an exemplary distributed application that is a database service having a single service process.
Figure 5:
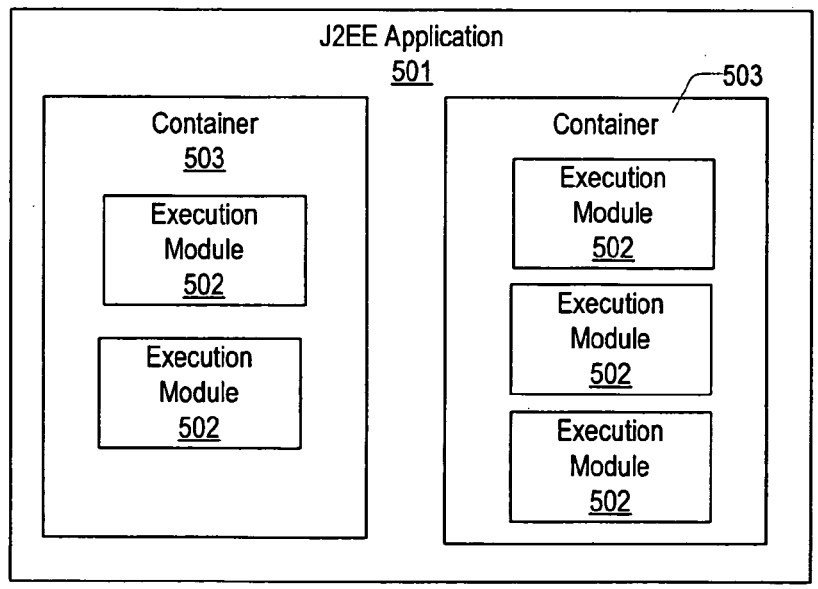
FIG. 5 depicts an exemplary distributed application that is a Java 2 Platform, Enterprise Edition application with multiple execution modules distributed over multiple containers.

FIGS. 3 through 5 depict three representational applications including application modules. FIG. 3 illustrates an exemplary Web service application 301. The application includes multiple identical Web server processes 302. The processes are application modules of the Web service application. On a distributed computer system, the Web server processes could be distributed over multiple nodes.

FIG. 4 illustrates an exemplary database service application. The application includes a single database server process 401. The process is an application module of the database service application 402.

FIG. 5 illustrates an exemplary Java 2 Platform, Enterprise Edition ("J2EE") application 501. The application includes five execution modules 502 that are distributed over two Java container processes ("containers") 503. The containers 503 could be located on the same or different nodes of the distributed computer system. The containers 503 and execution modules 503 are application modules of the J2EE application.

It is apparent that the application execution model of the J2EE application depicted in FIG. 5 is different from the application execution model of the Web service and database service applications depicted in FIGS. 3 and 4 respectively. While the application modules of the Web service and database service applications are processes, the structure of the J2EE application is more complex. The J2EE application uses a two-level application execution model that includes containers and execution modules as its application modules.

As described in detail later, the plurality of application controllers according to a method and system of the invention make it possible to support multiple, possibly very dissimilar, application execution models on the same distributed computer system.

Node

Figure 6:
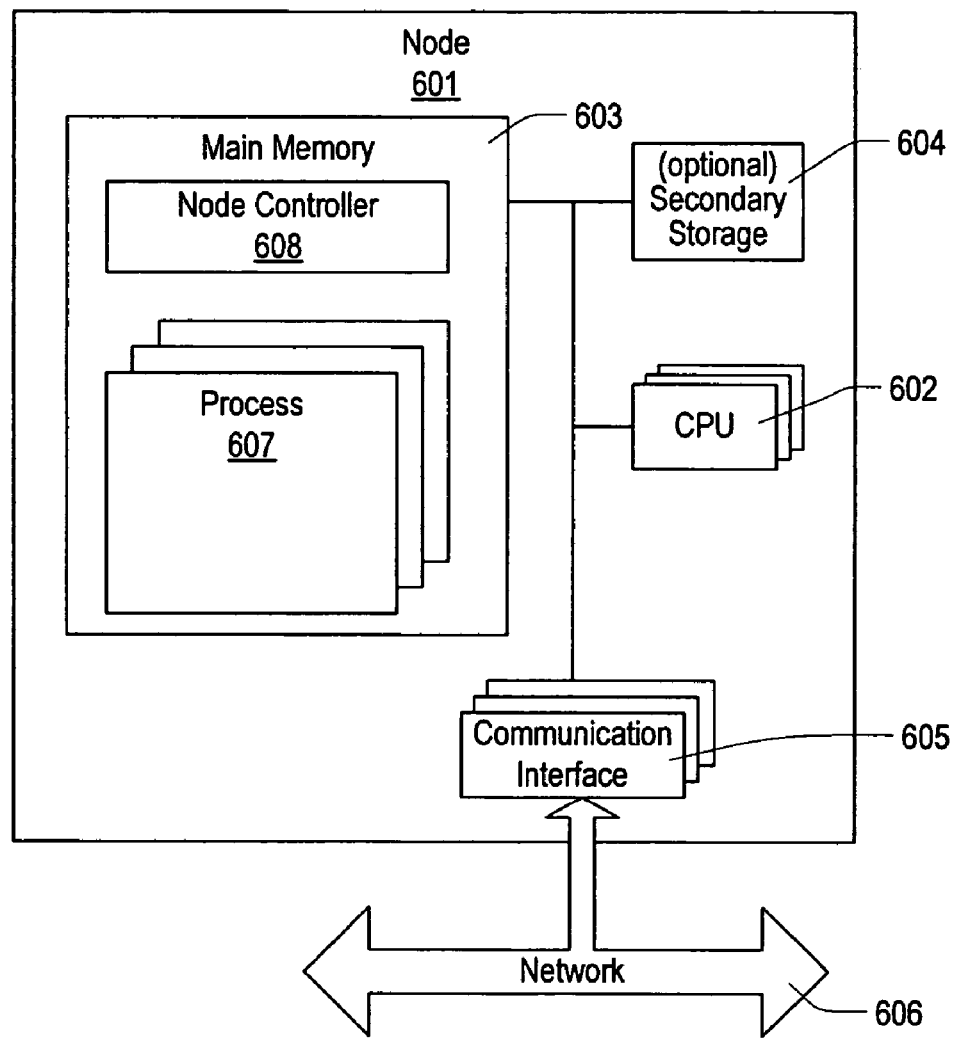
FIG. 6 illustrates the structure of an exemplary node of a distributed computer system.

FIG. 6 illustrates a representational node 601 suitable for being used in a method and system of the invention. A node is a computer system including one or more central-processing units (CPU) 602, main memory 603, optional secondary storage 604, and one or more communication interfaces 605. The communication interfaces 605 allow a node 601 to communicate with other nodes and optionally with other computers over a network 606.

The node's main memory 603 is capable of including the program instructions and data of one or more processes 607. The node's main memory 603 also includes the instructions and data of the node controller 608.

Node Controller

Figure 7:
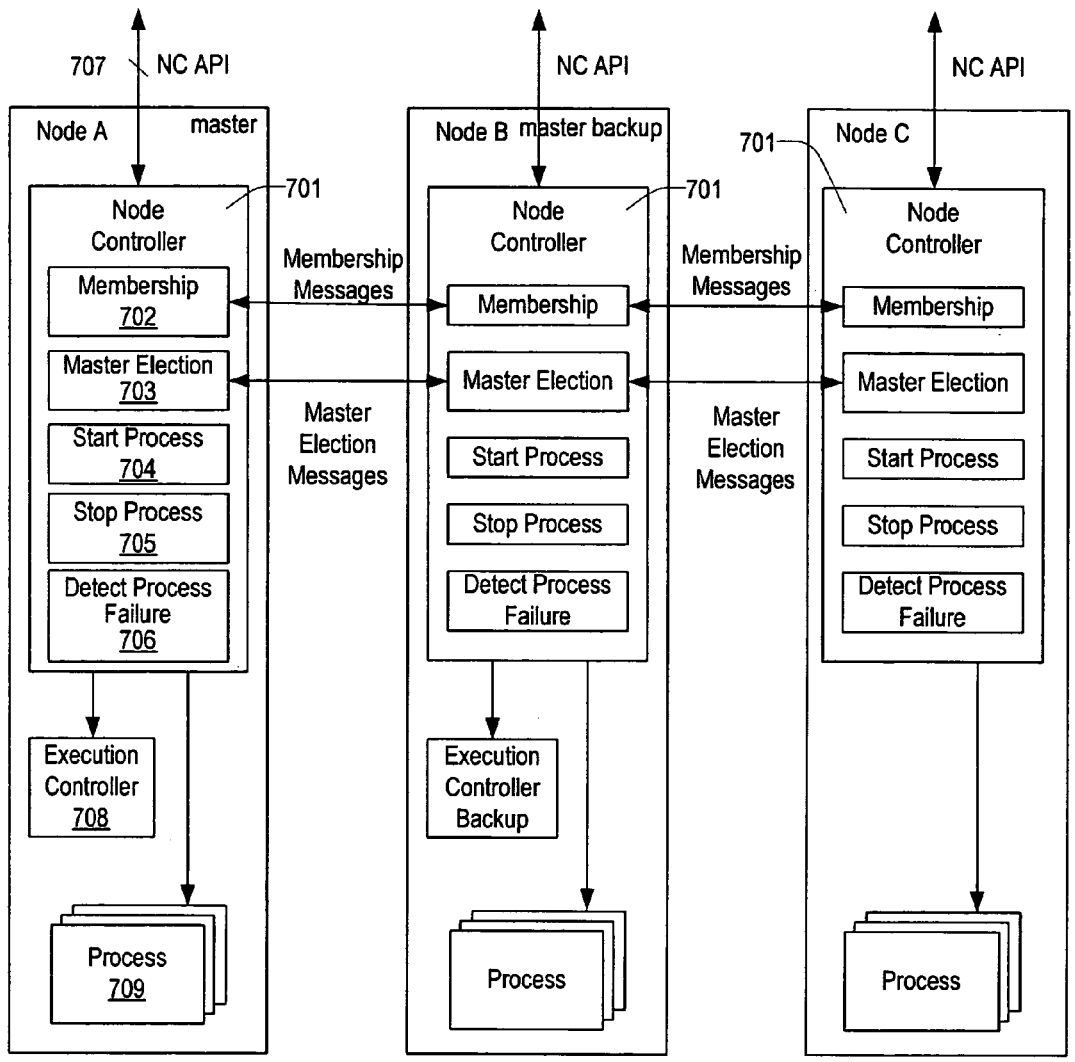
FIG. 7 depicts the main components of a node controller and role of a node controller in the distributed computer system.

Each node of a distributed computer system includes a node controller 701. FIG. 7 depicts the functionality provided by a node controller and its main components. A node controller 701 implements the following functions: node membership 702, master election 703, start process 704, stop process 705, and detect process failure 706.

The "membership" function 702 includes sending messages to other nodes and receiving messages from other nodes in order to determine which nodes are currently participating in the distributed computer system. If one node controller detects missed membership messages from another node controller, it assumes that the other node has failed, or that the communication link between the two nodes failed. By periodically exchanging membership messages, the node controllers can reach agreement on the current set of nodes that are included in distributed computer system. This agreement is dynamically adjusted when nodes are added or removed from the distributed system, or when nodes fail and subsequently restart.

The "master election" function 703 is logic by which a node participates in a distributed master election protocol. The purpose of the master election protocol is to elect a node that will act as the "master" and another node that will act as the "master backup". In the exemplary system in FIG. 7, node A has been elected the master and node B the master backup. If the master or master backup node fails, the master election protocol will quickly elect a replacement.

Although the membership and master election functions and their corresponding messages are depicted in FIG. 7 as separate functions, in some embodiments of the invention, these functions are combined into a single protocol to reduce the number of messages exchanged between the nodes. In other embodiments of the invention, these two functions could be implemented as two independent protocols.

When the master election protocol elects a node to be the master, the node controller on the master node starts the execution controller on that node. In the exemplary system depicted in FIG. 7, the execution controller is created on node A.

When the master election protocol elects a node to be the master backup, the node controller on the master backup node starts the execution controller backup on that node. In the exemplary system depicted in FIG. 7, the execution controller backup is created on node B. In some embodiments of the invention, leases are associated with the execution controllers to ensure consistency in the presence of node failures.

A node controller has the capability to start, stop, and supervise the execution of operating-system level processes ("processes") 709 running on the node. The "start process" 704 operation allows the node controller to start a new process with specified command line arguments. This operation is used by the execution control system to start processes that will be associated with application modules and to start parts of the execution control system itself. The "stop process" 705 operation allows the node controller to stop a process. This operation is used by the execution control system to stop processes and parts of the execution control system itself. The "detect process failure" 706 function allows the node controller to detect that a process running on the node has failed. This operation is used by the execution control system to detect failures of processes and failures of the components of the execution control system itself. When a node controller detects a process failure, it sends an event notification to all the subscribers for the event. For example, the execution controller subscribes to the process failure events so that it can maintain an up-to-date state model of the processes in the distributed system.

The membership and master election protocol messages exchanged between the nodes of a distributed system are encoded in an architecture-neutral way. This allows the distributed computer system to include nodes of different hardware architecture.

A node controller provides the Node Controller Application Programming Interface ("NC API") 707 that allows other components to invoke the node controller operations and to subscribe to its event notifications. The NC API 707 is primarily used by the execution controller 708 to manage the lifecycle of processes in the distributed computer system.

In some embodiments of the invention, the distributed computer system may include nodes with different operating systems. Each operating system may use a slightly different format of the operating system command line that is used to start a process (for example, the Windows operating system uses the backslash character as the file path separator while Linux uses the regular slash character). To shield the other components of the execution control system from the differences in the command line format, the NC API 707 uses a virtual, operating-system neutral format of the command line. The node controllers 701 have the logic to translate the virtual command line to the format understood by the local operating system.

In some embodiments of the invention, a node controller 701 is implemented using Java technology. In some embodiments of the invention, the NC API 707 is implemented as a set of simple text-based messages sent over TCP/IP connections, which makes it possible for the node controllers 701 to be implemented in any language and for the nodes to run any operating system that supports the TCP/IP protocol.

In some embodiments of the invention, the membership and master election protocol is based on the Paxos algorithm described in Lamport Leslie's Paxos Made Simple.

Node Groups

The distributed computer system might include a large number of nodes, which could make its administration tasks unwieldy. The method and system of the present invention utilizes the concept of "node groups" to simplify the management of applications on the distributed computer system with a large number of nodes.

A node group is a named subset of the nodes in the distributed computer system. A node can be a member of multiple node groups. Using node groups in a distributed computer system has several advantages. First, node groups simplify many management tasks because instead of listing a large number of individual nodes when performing system a administration task, a node group name can be given instead. Second, it is easy to adjust the processing capacity or distribution of multiple applications by simply adding or removing nodes from a node group associated with the applications. For example, if a node is added to a node group, the application controllers can automatically distribute application modules of multiple applications to the node. Without the concept of node groups, the system administrator would have to distribute each application individually to the new node. Third, it is easier for administrators to refer to a set of nodes by mnemonic names that convey the function of the nodes, such as "Database Nodes", than by the names of the nodes, which may not have any meaning to the administrators. Fourth, node groups could be used in the specification of replication groups and replication constraints according to a method of this invention. Replication constraints simplify the specification of high availability requirements for a distributed computer system and allow applications to be replicated across the nodes of the distributed computer system in a manner appropriate for the applications. In the present invention, node groups are used mainly for associating sets of nodes with applications with the purpose of distributing the applications' modules to those nodes.

Figure 8:
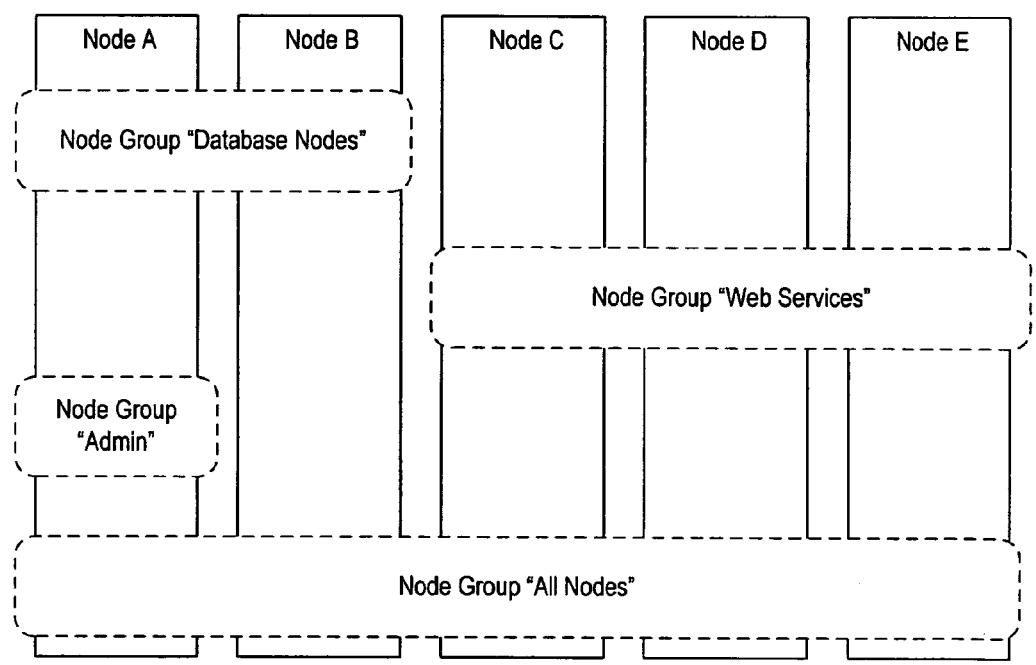
FIG. 8 illustrates an exemplary distributed computer system that includes several node groups.

FIG. 8 illustrates a representational distributed computer system including five nodes: nodes A, B, C, D, and E. The system includes four exemplary node groups, named "Database Nodes", "Web Services", "Admin", and "All Nodes". The "Database Nodes" node group includes nodes A and B. The "Web Services" node group includes nodes C, D, and E. The "Admin" node group includes a single node, node A. The "All Nodes" node group includes all the nodes, that is, nodes A, B, C, D, and E. As depicted in FIG. 8, a node could be a member of multiple node groups. Although not illustrated in FIG. 8, it is possible that a node is not a member of any node group.

Execution Controller

The execution control system includes an execution controller. The main purpose of the execution controller is to provide an easy to use, fault-tolerant abstraction of the distributed computer system to the application controllers. The model of the distributed computer system provided by the execution controller includes nodes, node groups, and processes. Without the execution controller, each application controller would have to implement the execution controller's functionality, which would make the development of application controllers hard. It would also make achieving single-system image impossible because each application controller would include its own concept of processes and node groups, thus making the distributed computer system look like having a collection of several independent software platforms rather than a single software platform.

Figure 9:
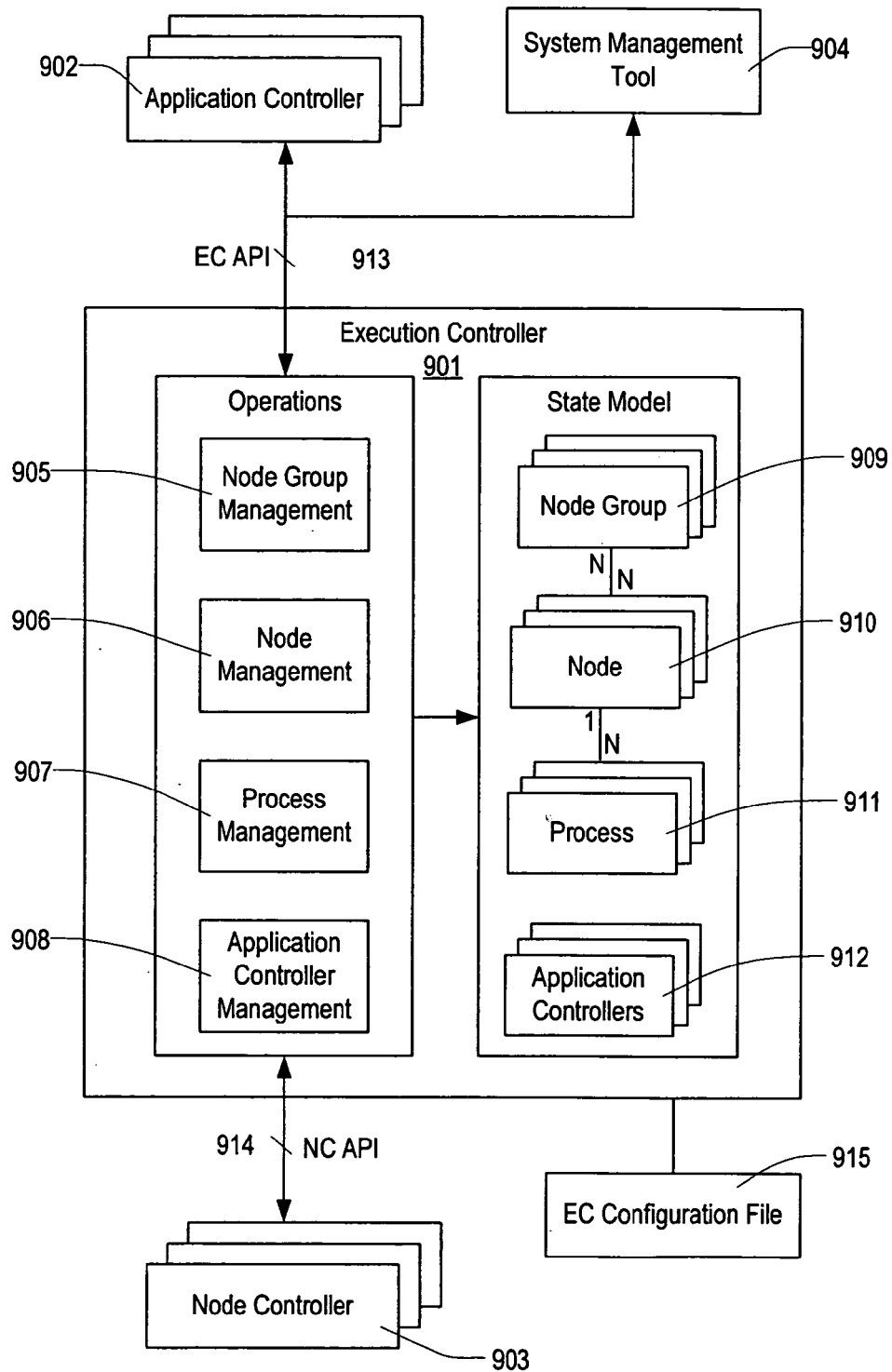
FIG. 9 depicts the main components of an execution controller.

The functionality of the execution controller is depicted in FIG. 9. The execution controller 901 includes operations and a state model. The execution controller 901 interacts with application controllers 902, node controllers 903, and a system management tool 904.

The operations included in the execution controller 901 implement the management of node groups 905, nodes 906, processes 907, and application controllers 908. The operations describes below are typical to most embodiments of the invention, but some embodiments might omit some operations or include additional operations.

The "node group management" 905 operations include the operations to create and remove a node group; operations to add and remove a node from a node group; and operations to obtain status information about the node groups.

The "node management operations" 906 include operations to add and remove a node from the distributed computer system; an operation to respond to a node failure notification; an operation to respond to a notification indicating that a node has been repaired; and operations to obtain status information about the nodes.

The "process management operations" 907 include the operation to start an operating-system level process with specified command line arguments on a specified node; an operation to stop a previously started process; an operation to respond to a process failure notification; and operations to provide status information about processes.

The "application controller management" 908 operations include operations to start an application controller and its optional backup copy on specified nodes; an operation to respond to an application controller or its backup copy failure notification; operations to add new application controllers to the system; operations to remove application controllers from the system; and operations to obtain information about application controllers.

The state model includes objects that present nodes 909, node groups 910, processes 911, and application controllers 912 in the distributed computer system. The state model also includes relationships among the objects. The execution controller maintains its state model objects up to date so that they reflect accurately the current state of the distributed computer system.

The illustration of the execution controller state model in FIG. 9 uses the notation for relationships used in class diagrams of the Unified Modeling Language (UML) described in Booch G., Rumbaugh J., and Jacobson I. The Unified Modeling Language User Guide. Addison-Wesley, 1999. A relationship between two objects is represented by a line between the objects. An optional number at the end of the line indicates whether an object can be associated with at most one, or with multiple instances of the other object. For example, the numbers at the end of the line between the Node 910 and Process 911 objects in FIG. 9 indicate that a Node object can be associated with multiple Process objects and that a Process object can be associated only with a single Node object. This UML-like notation is used also in the illustrations of the application controller's state models.

The execution controller 901 includes an event notification mechanism that sends event notifications to registered subscribers when an object in the state model has been created, removed, or its status changed. For example, an appropriate event notification is sent when a process has been started or stopped, or when the execution controller 901 has received a process failure notification from a node controller 903.

The execution controller 901 exposes its operations to the application controllers 902, system management tools 904, and other users via the Execution Controller Application Programming Interface ("EC API") 913. The EC API 913 allows application controllers 902 to invoke the execution controller's 901 operations and subscribe to the event notifications generated in response to the state model changes. The EC API 913 is the primary means for the application controllers 902 to manage the execution of processes distributed over the nodes of the distributed computer system.

The EC API 913 could be used by other components in addition to the application controllers 902. For example, a system management tool uses the EC API 913 to define node groups and obtain status information about the nodes, node groups, and processes. The EC API 913 provides a single-system image of the distributed computer system including multiple nodes to its users.

In some embodiments of a method of the invention, the EC API 913 is bridged into a standard API used for system management, such as Java Management Extensions ("JMX"). This allows standard system management tools that conform to the JMX API to invoke the execution controller operations and to subscribe to its events.

The execution controller 901 communicates with node controllers 903 located on the nodes of the distributed computer system by using the NC API 914 provided by the node controllers 903. The NC API 914 allows the execution controller 901 to start and stop operating-system level processes on the nodes, and to receive a failure notification when a process fails.

The execution controller 901 is associated with its configuration file 915. The configuration file 915 includes information that the execution controller 901 uses at its startup. The information in the configuration file 915 includes the specification of the application controllers that the execution controller should create at startup; optional information specifying on which nodes each application controller should be started; optional information specifying on which nodes a backup copy of each application controller should be created; and optional specification of the node groups that should be created at execution controller startup.

In some embodiment of the invention, if the optional information for application controllers 902 is not specified in the configuration file 915, the execution controller 901 creates the application controllers 902 on the node that includes the execution controller 901, and their backup copies on the node that includes the backup copy of the execution controller 901. In some embodiments of the invention, the execution controller 901 is realized as a transaction processing application as described in U.S. Provisional Patent Application Ser. No. 60/445,639 entitled Method and Apparatus for Online Transaction Processing and U.S. Provisional Patent Application Ser. No. 60/508,150 entitled Method and Apparatus for Efficient Online Transaction Processing. Both of these provisional patent applications are incorporated by reference. It is also described in U.S. patent application Ser. No. 10/774,207 entitled Method and System for Efficient Online Transaction Processing. This patent application is also incorporated by reference.

Application Controller

The execution control system separates application controllers from the execution controller. The execution controller includes the control functions that are common to all types of applications. Each application controller includes the control functions that are specific to a particular type of applications, thereby enabling the execution of applications of that type. Typically, an application controller can control the execution of multiple applications of the same type.

From the description of the invention, it will become apparent that the separation of application controllers from the execution controller yields advantages. These advantages include the ability to have multiple application controllers, each supporting different type of applications with a different application execution model. This feature makes the distributed computer system usable by a larger number of applications. Also, a customer can extend the execution control system by adding new application controllers developed by customers or by third parties. In this way, customers can use the execution control system for new types of applications that were not known or anticipated at the time the execution control system was developed. This extensibility by customers obviates the disadvantage of creating a new version of the entire execution control system each time the support for a new application type is desired.

An application controller is an abstract concept that can have many different implementations. Each implementation is specialized to support a specific type of applications. A description of two application controllers: the service application controller ("SAC") and the Java application controller ("JAC") are included. These two application controllers are illustrative rather than prescriptive of the method and system of the invention.

Replication Constraints and Replication Groups

Some applications executing on a distributed computer system replicate their application modules across two or more nodes to achieve tolerance to failures, thereby increasing the availability of the application to its users. One of the challenges in the development of applications that use replication is that the developer of the application might not know the exact configuration of the distributed computer on which an application will be deployed. Furthermore, it might be desirable that the same application could be deployed on several distributed computer systems, each having a different configuration, and each possibly requiring different assignment of application module replicas to nodes.

Therefore, in one embodiment the algorithm for assigning the replicas to nodes is not included in the application. Instead, the algorithm is included in the execution control system. However, it is possible, at the same time, for applications to "customize" the algorithm for assignment of application module replicas to nodes. Such customization might be useful, for example, to take advantage of application-specific information to increase the overall availability of the application, or to configure the application for a distributed computer system such that different application modules achieve different availability.

An execution control system consistent with the present invention may use the Replication Constraints and Replication Group objects described in the Replication Constraints and Replication Groups section to accomplish these and other goals that could arise in the development and deployment of applications with replicated application modules.

Service Application Controller

The service application controller ("SAC") is one of the application controllers used in an embodiment of the invention. The service application controller implements the application execution model suitable for managing services.

Service Applications

A service is a type of a distributed application that includes one or more identical service processes that are distributed across one or more nodes. A service is associated with an operating-system level command line that SAC uses to start the service processes comprising the service. Examples of services that fit the SAC application execution model are: database servers, Web servers, file servers, name servers, directory servers, and others.

It is possible for a service process to start additional operating-system level processes. For example, a database service process could start several helper processes. From the perspective of SAC, these additional processes are logically included in the service process and are not necessarily individually managed by SAC.

Service Application Controller Components

Figure 10:
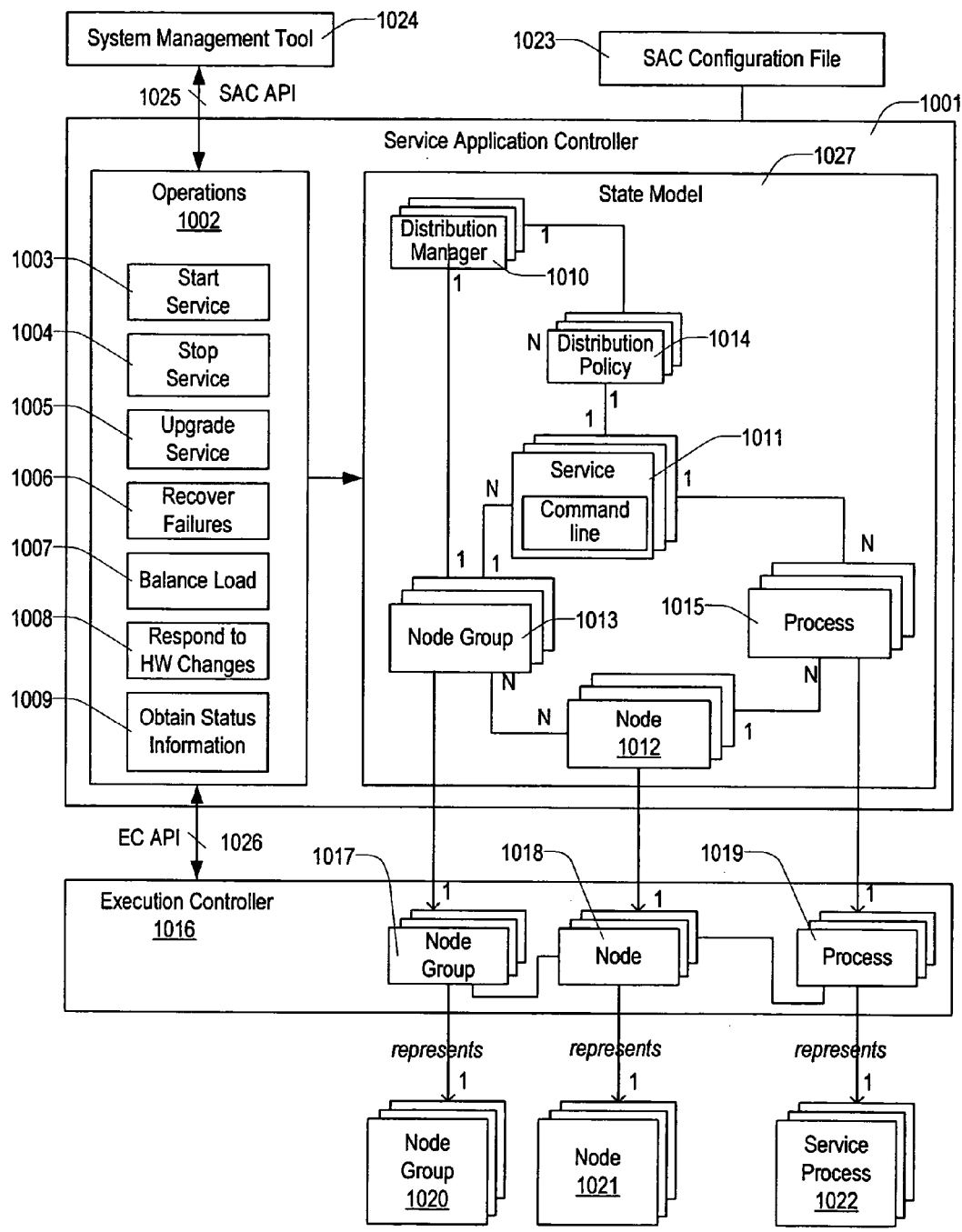
FIG. 10 illustrates the main components of the service application controller.

FIG. 10 illustrates the main SAC 1001 components. SAC 1001 includes operations 1002 and state model 1027. The "start service" operation 1003 starts a service by starting its constituent service processes according to the Distribution Policy object associated with the service. The "stop service" operation 1004 stops a service by stopping all its service processes. The "upgrade service" operation 1005 replaces a previous version of the service processes with a new version. The "recover failures" operation 1006 recovers a service from the failure of its constituent service processes. The recovery action depends on the Distribution Policy object associated with the service and the type of the failure (i.e. whether the failure was a node failure or process failure). The "balance load" operation 1007 can stop a process running one node and restart it on a different, less loaded node. The balance load operation is invoked internally by the service application controller when it detects that a node is overloaded while other nodes have spare capacity or explicitly by an operator. Any load-balancing decision is subject to the Distribution Policy object and node group associated with a service. This means, for example, that SAC 1001 will never start a process on a node that is not a member of the node group associated with a service. The "respond to hardware (HW) changes" operations 1008 adjust the distribution of processes over the nodes after a node has been added to the distributed computer system, or a node has been removed from it. Any adjustments made by SAC 1001 are subject to the Distribution Policy object and node group associated with the services. The "obtain status information" operations 1009 allow other applications and the system management tool to obtain service status information.

SAC 1001 includes one or more Distribution Manager objects 1010. The Distribution Manager objects 1001 are explained later in this disclosure. SAC 1001 includes a state model 1027 including objects. The Service objects 1011 represent services; the Node objects 1012 represent nodes 1021; the Node Group objects 1013 represent node groups 1020; and the Process objects 1015 represent service processes 1022. The notation used in the state model diagram is explained in the description of the execution controller state model in FIG. 9.

A Service object 1011 represents a service. A Service object 1011 includes the command line that is used to start associated service processes. Each Service object 1011 is associated with a Distribution Policy object 1014, a Node Group object 1013, and one or more Service Process objects 1015. The SAC 1001 state model 1027 can include multiple Service objects 1011, each representing a service running on the distributed computer system.

The Distribution Policy objects 1014 provide parameters to the algorithm of the Distribution Manager objects 1010. They affect how many processes a Distribution Manager object 1010 will create on behalf of a service 1011 and how it will distribute the processes 1015 over the nodes 1012 of the associated node group 1013. Exemplary Distribution Policy objects will be discussed later in this disclosure.

The Node Group objects 1013 correspond to the Node Group objects 1017 in the execution controller 1016 and represent the node groups 1020 defined in the distributed computer system. SAC 1001 uses the EC API 1026 to maintain its Node Group objects 1013 synchronized with the Node Group objects 1017 in the execution controller 1016.

The Node objects 1012 correspond to the Node objects 1018 in the execution controller 1016 and represent nodes 1021 in the distributed computer system. SAC 1001 uses the EC API 1026 to maintain its Node objects 1012 synchronized with the Node objects 1018 in the execution controller 1016.

The Process objects 1015 represent service processes 1022 running on some node 1021 of the distributed computer system. A Process object 1015 is associated with a Service object 1011 and corresponds to a Process object 1019 in the execution controller's 1016 state model. SAC 1001 uses the EC API 1026 to maintain the state of its Process objects 1015 synchronized with the state of the corresponding Process objects 1019 in the execution controller 1016.

SAC 1001 includes an event notification mechanism that sends event notifications to interested subscribers when an object in the state model has been created, removed, or its state has been changed. For example, an appropriate event notification will be sent when a service has been started or stopped.

The service application controller 1001 exposes its operations via the Service Application Controller Application Programming Interfaces ("SAC API") 1025. The SAC API 1025 allows system management tools 1024 and other system components to invoke the SAC operations 1002 and to subscribe to its events. The SAC API 1025 provides a single-system image of the distributed computer system including multiple nodes to its users.

In some embodiments of a method of the invention, the SAC API 1025 is bridged into a standard API used for system management, such as Java Management Extensions ("JMX"). This allows standard system management tools that conform to the JMX API to invoke the SAC operations 1002 and to subscribe to its events.

SAC 1001 interacts with the execution controller operations by using the EC API 1026. For example, SAC 1001 uses the EC API 1026 to start and stop processes on the nodes 1021 of the distributed computer system. When SAC 1001 is started, it reads its configuration file 1023. In some embodiments of the invention, SAC is realized as a transaction processing application similar to those described in U.S. Provisional Patent Application Ser. No. 60/445,639 entitled Method and Apparatus for Online Transaction Processing and U.S. Provisional Patent Application Ser. No. 60/508,150 entitled Method and Apparatus for Efficient Online Transaction Processing. It is also described in U.S. patent application Ser. No. 10/774,207 entitled Method and System for Efficient Online Transaction Processing. In some embodiments of the invention, a backup copy of SAC is used to protect the SAC 1001 from failures.

Distribution Manager Customization

One of the main functions of SAC is to manage the distribution of service processes over the nodes of a distributed computer system. SAC gives users a lot of flexibility in customizing the distribution mechanism. SAC encapsulates its distribution algorithms in the Distribution Manager objects. A Distribution Manager object includes an algorithm for distributing service processes over the nodes of a node group. A Distribution Manager object uses the objects of the state model, such as Node and Node Group objects, to make its distribution decisions. SAC invokes internally the Distribution Manager objects in response to events that may require that the distribution of service processes be changed. SAC can include multiple Distribution Manager objects. Each Distribution Manager object may implement a different distribution algorithm suitable for a subset of services. In some embodiments of the invention, the Distribution Manager objects are implemented using Java objects.

The algorithm of a Distribution Manager object can be parameterized by the Distribution Policy objects. The Distribution Policy objects are objects that in some way limit, or give preferences to the Distribution Manager object's algorithm. A Distribution Manager object in some embodiments of the invention use two types of Distribution Policy objects: the NodeDistribution(N) and GroupDistribution(N) policy objects. Both types of policy objects take a numeric argument N. If a service is associated with the NodeDistribution(N) policy object, the associated Distribution Manager object in some embodiments will interpret the policy object such that the service requires that there be, at all times, N service processes on each node of the associated node group.

Figure 11:
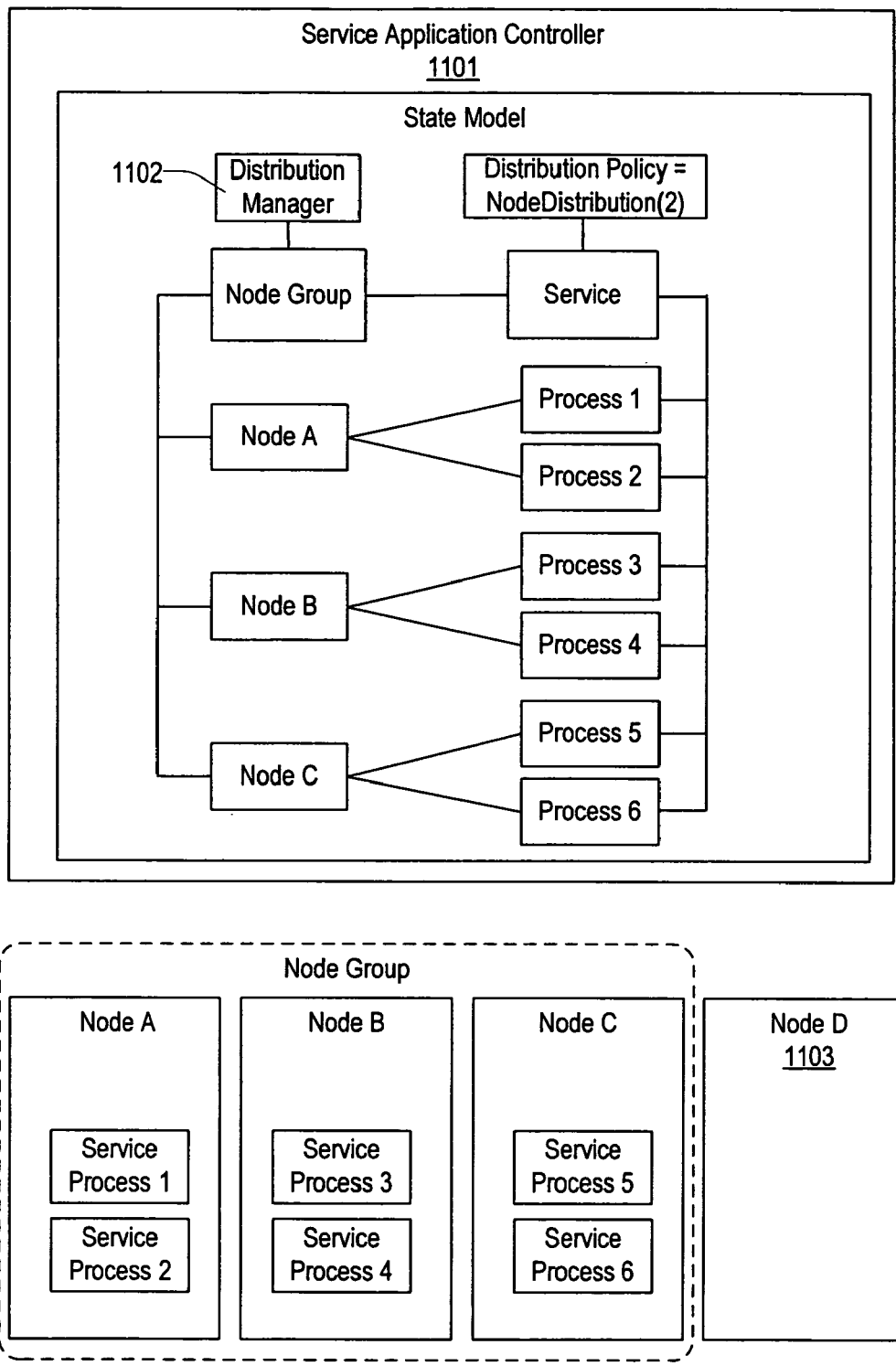
FIG. 11 depicts an exemplary service that uses the NodeDistribution(N) policy object.

FIG. 11 illustrates an exemplary service that is associated with the NodeDistribution(2) policy object and with a node group that includes three nodes. The Distribution Manager object 1102 will create two processes on each node of the node group. As indicated in FIG. 11, the Distribution Manager object 1102 will not create a process on a node that is not part of the node group associated with the service, such as Node D 1103.

As the Distribution Policy object 1102 for the service in FIG. 11 is NodeDistribution(2), the Distribution Manager object 1102 will handle the various events in the distributed computer system as follows. If a node is added to the node group associated with the service, the Distribution Manager object 1102 will automatically create two processes on the added node. If a process fails, the Distribution Manager object will restart the process on the same node. If a node fails, the service processes running on the failed node are lost, but the service processes running on the remaining nodes will continue providing service.

The NodeDistribution(N) policy object is generally applicable for service including multiple service processes distributed over a number of nodes for service scalability and/or availability purposes. An example of such a service is Web service including multiple Web server processes running on multiple nodes.

If a service is associated with the GroupDistribution(N) policy object, the associated Distribution Manager object in some embodiments will interpret the policy object such that the service requires that there be, at all times, a total of N service processes distributed in some way over the nodes of the associated node group.

FIG. 12 illustrates an exemplary service that is associated with the GroupDistribution (2) policy object and with a node group 1201 that includes three nodes. The Distribution Manager object 1202 will create a total of two processes and will distribute them over the nodes of the associated node group. As the number of processes (two) to be created is smaller than the number of nodes in the node group (three), node C, although it is part of the node group, does not contain any service process.

As the Distribution Policy object 1202 for the service in FIG. 12 is GroupDistribution(2), the Distribution Manager object 1202 will handle the various events in the distributed system as follows. If a node is added to the node group associated with the service, the Distribution Manager object will automatically try to take advantage of the new node by transferring some processes to the new node if this results in better distribution of the workload. If a process fails, the Distribution Manager object will restart it on the same node. If a node fails, the Distribution Manager object will restart the processes that were on the failed node on the remaining nodes of the node group. For example, if node B fails, the Distribution Manager object can restart service process 2 on node C.

Other embodiments of the invention might use other types of Distribution Policy objects. For example, some embodiments might use a LoadBasedDistribution(NodeLoad) policy object to achieve load-based distribution of processes. If the CPU utilization of the nodes including the processes associated with a service associated with the LoadBasedDistribution(NodeLoad) exceed the NodeLoad parameter, the Distribution Manager will automatically start a new process on a less loaded node in the node group. Such a policy object allows the system to dynamically grow and shrink the number of nodes used by a service depending on the service's current load. An example of using a LoadBasedDistribution(NodeLoad) is provided in the section regarding increasing an application's processing capacity section.

Method For Starting A Service

Figure 13:
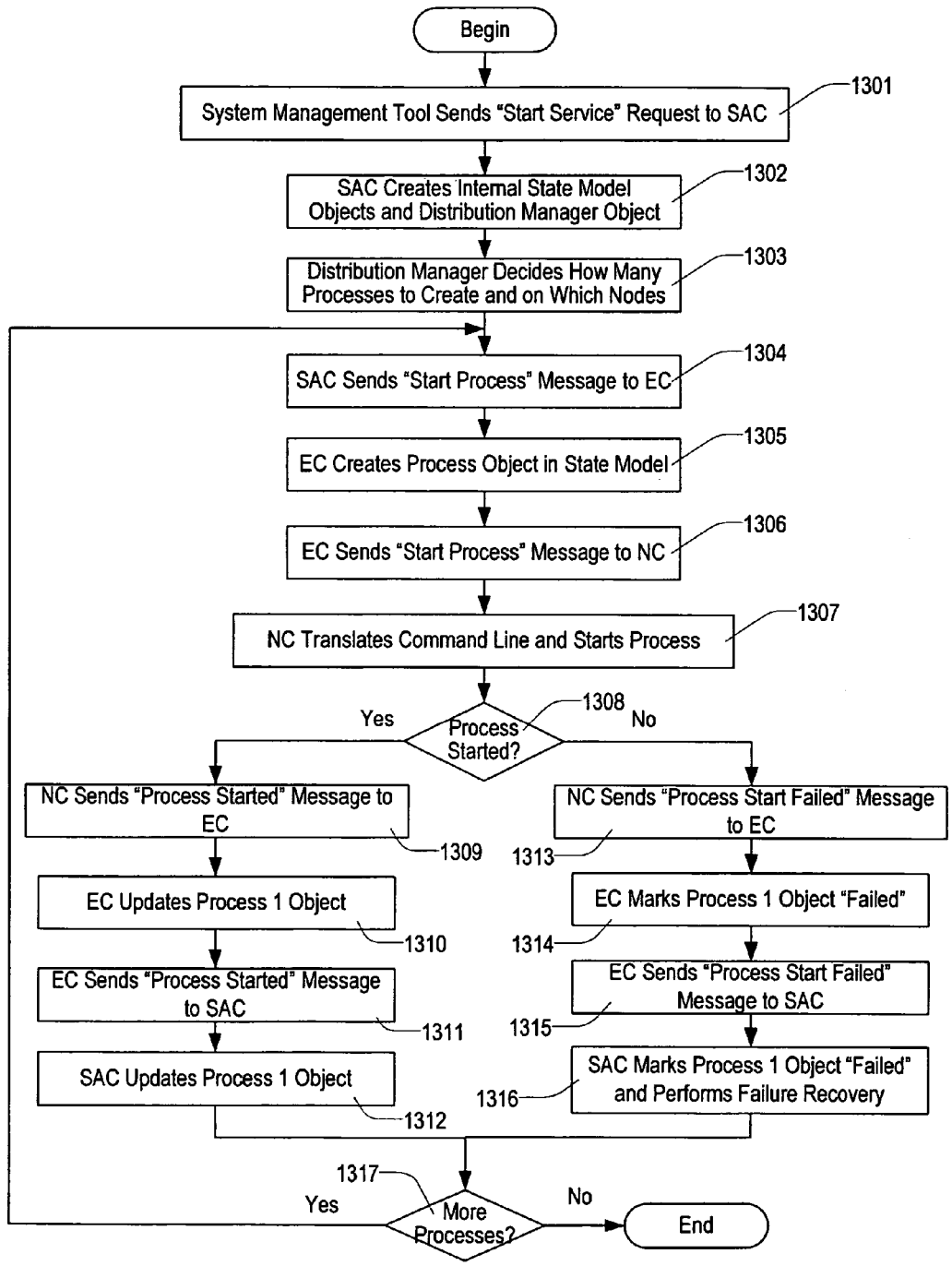
FIG. 13 illustrates a flow chart that includes the steps used in starting a service.
Figure 14:
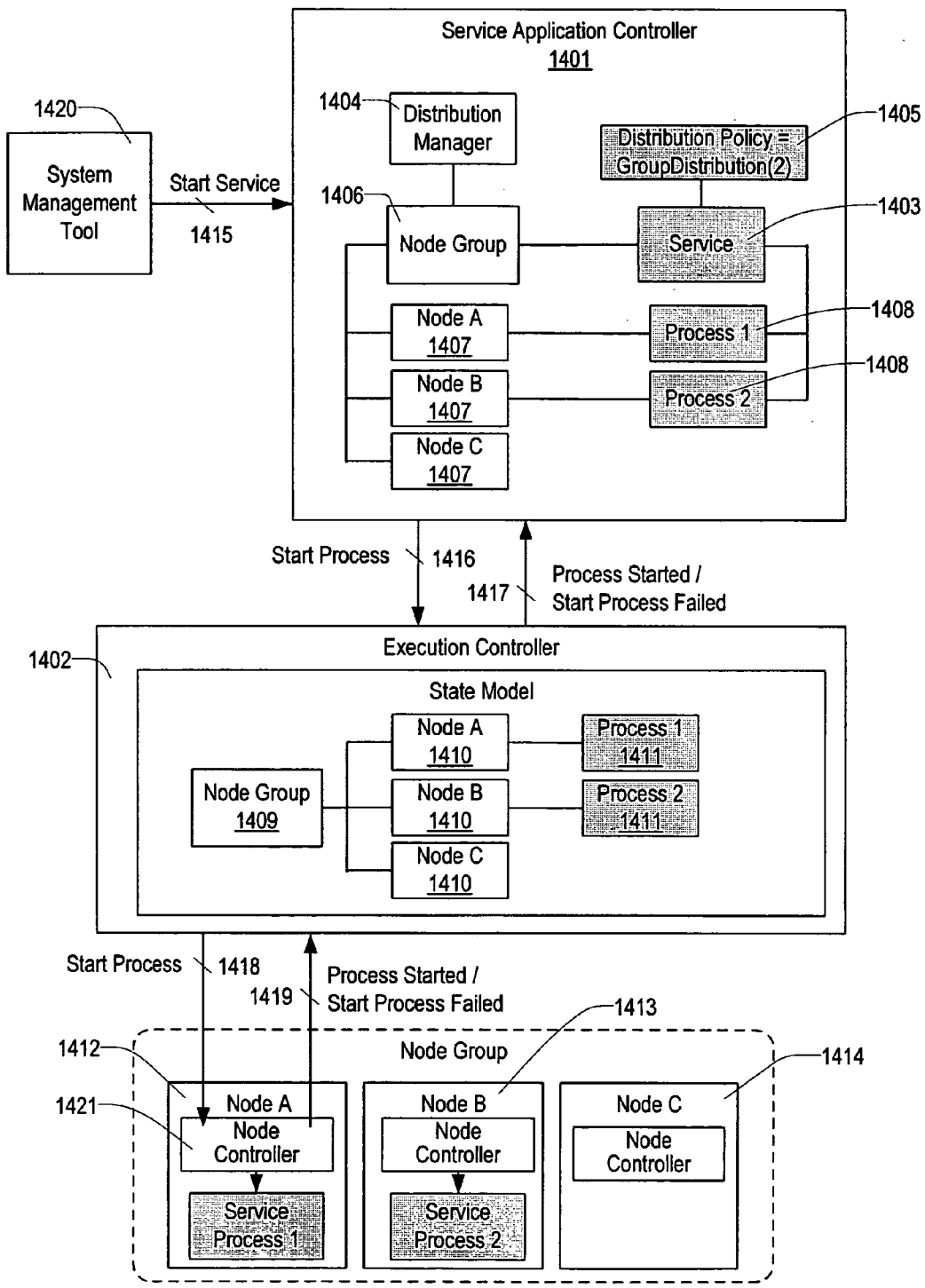
FIG. 14 depicts objects relevant to understanding the steps of starting a service.

FIGS. 13 and 14 illustrate the method used by SAC to start a service. FIG. 13 is a flow chart depicting the steps used in starting a service and FIG. 14 depicts the objects related to an exemplary service that are relevant to understanding the flow chart. The shaded objects in FIG. 14 are objects that have been created by the steps of the flow chart.

FIG. 14 illustrates the system management tool that initiates the start of a service; the service application controller ("SAC") 1401 that manages the service's execution; the execution controller 1402 that manages nodes, node groups, and process in the distributed computer system; an exemplary node group that is associated with the service; and nodes A, B, and C which are exemplary nodes of the distributed computer system.

The SAC objects relevant to starting the exemplary service are: the Service object representing the service 1403; the Distribution Manager object 1404 that includes the algorithm for distributing service processes over the nodes of a node group; the Distribution Policy object 1405 specifying the distribution policy for the service; the Node Group object 1406 representing the node group associated with the service; Node objects 1407 A, B, and C representing their corresponding nodes of the distributed computer system; and Process objects 1408 1 and 2 representing service processes 1 and 2. Service processes 1 and 2 are started on behalf of the service by the steps of the flow chart depicted in FIG. 13.

The execution controller state model objects relevant to starting the exemplary service are: the Node Group object 1409 representing the node group associated with the service; Node objects 1410 A, B, and C representing nodes A, B, and C, respectively; and Process objects 1411 1 and 2 representing processes 1 and 2, respectively.

Node A 1412 includes a node controller and service process 1 created by the start service method. Node B 1413 includes a node controller and service process 2 created by the start service method. Node C 1414 includes a node controller. There are no service processes created by the start method on node C.

FIG. 14 also depicts the messages exchanged between the components of the execution control system. The system management tool 1420 sends the "Start Service" message 1415 to SAC 1401. SAC 1401 sends the "Start Process" message 1416 to the execution controller 1402. The execution controller 1402 sends the "Process Started" or "Start Process Failed" message 1417 to the service application controller 1401. The execution controller 1402 sends the "Start Process" message 1418 to a node controller 1421. A node controller 1421 sends the "Process Started" or "Start Process Failed" message 1419 to the execution controller.

FIG. 13 is a flow chart including steps that may be included as part of the start service method. The abbreviations used in the flow chart are: service application controller ("SAC"), execution controller ("EC"), and node controller ("NC").

First the system management tool sends the "Start Service" message to SAC 1301. In response to the message, SAC creates the Service and Distribution Policy objects in its internal state model 1302. Then it associates the Service object with a Node Group object. The Distribution Policy object and the node group name either have been specified in the "Start Service" message, or are some default values provided by SAC. If there is no Distribution Manager object associated with the Node Group object, SAC also creates a Distribution Manager object and associates it with the Node Group object 1302.

The Distribution Manager object uses the Distribution Policy object to determine how many service processes should be created on behalf of the service 1303. The Distribution Manager object creates the representation of the processes in its internal state model 1303. For the exemplary service, the Distribution Manager object creates the Process 1 and 2 objects.

For each Process object that has been created by the distribution manager in the SAC state model, SAC performs the following steps. The description of the steps illustrates the creation of service process 1. SAC sends the "Start Process" message to the execution controller 1304. The message specifies the node on which the process should be created and the command line that should be used to start the process on the node. In some embodiments, particularly in those that include nodes with different operating systems, the command line may be sent in a virtual format that is translated to an operating-system specific format by a node controller. In response to the "Start Process" message, the execution controller creates Process 1 object in its state model 1305. Then the execution controller sends the "Start Process" message to the node controller residing on the node on which the service process should be created 1306. The message includes the command line that should be used to start the process. For process 1 of the exemplary service in FIG. 14, the message is sent to the node controller on node A.

The node controller receives the "Start Process" message. If necessary, the node controller translates the virtual command line to a format usable by the operating system running on the node 1307. Then the node controller attempts to start the service process by issuing the command line to the operating system running on the node. The node controller checks if the process has successfully started 1308. If the process has successfully started, the node controller sends the "Process Started" message to the execution controller 1309.

In response to the "Process Started" message, the execution controller updates the state of Process 1 object in its state model to indicate that the process has successfully started 1310. Then the execution controller sends the "Process Started" message to SAC 1311. SAC updates its internal Process 1 object in its state model to reflect that process 1 has successfully started 1312. This completes the steps of starting a process. SAC checks if there are more service processes that should be started 1317. If yes, the steps of starting a process are repeated. If no, the start service operation has completed.

If the check made by the node controller indicates that a process has not successfully started, the node controller sends the "Process Start Failed" message to the execution controller 1313. In response to the "Process Start Failed" message, the execution controller marks Process 1 object as "Failed" 1314. Then the execution controller sends the "Process Start Failed" message to SAC 1315. SAC marks Process 1 object in its state model as "Failed" 1316. The Distribution Manager object applies the distribution policy associated with the service to determine the appropriate recovery action. In the case of the exemplary service, the Distribution Manager object could, for example, attempt to start the service process on a different node within the node group associated with the service, for example on node C.

In some embodiments of the invention the service processes are started sequentially as illustrated in the steps of the flow chart. In other embodiments, all service processes are started in parallel. In an alternative embodiment of the invention, the state model objects representing failed processes are removed instead of being marked as "Failed".

Method For Handling A Process Failure

Figure 15:
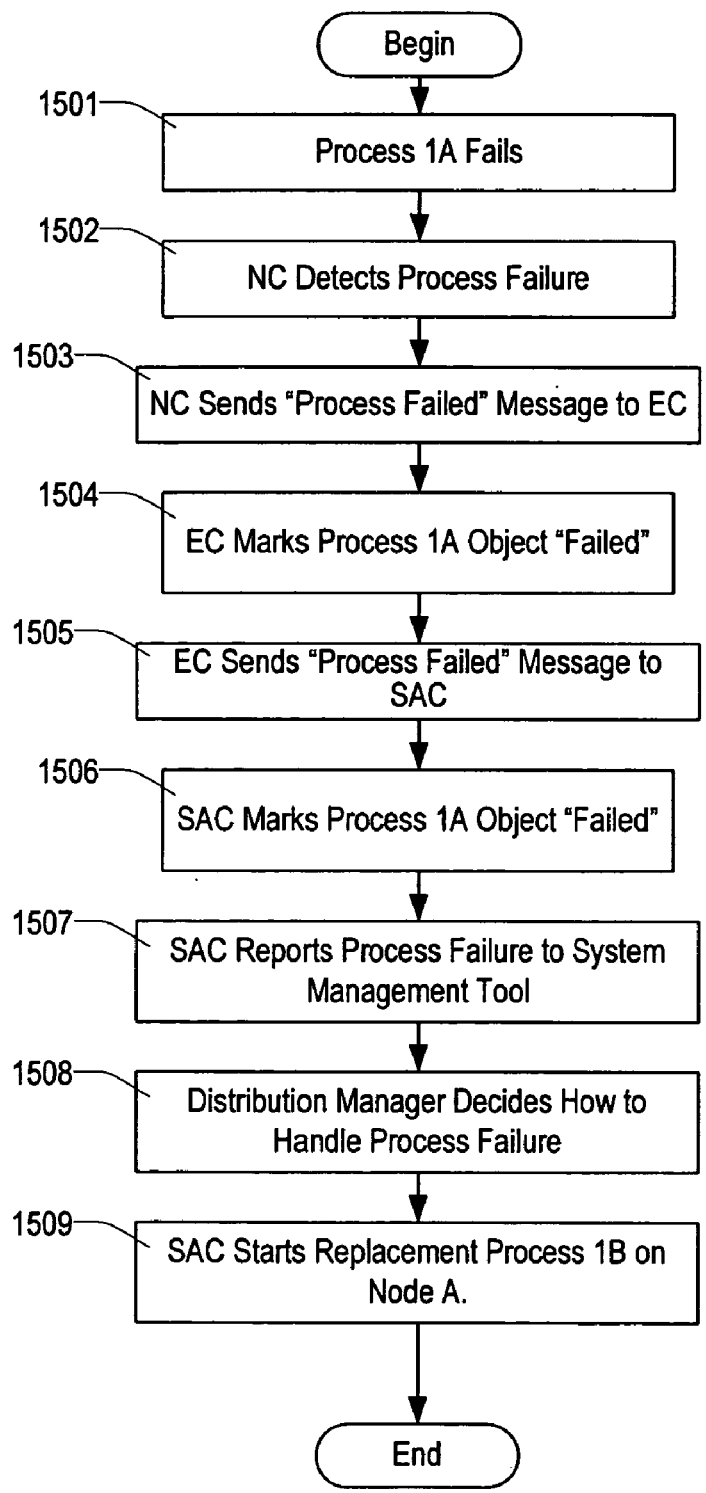
FIG. 15 illustrates a flow chart that includes the steps used in detecting and recovering a service process failure by the service application controller.
Figure 16:
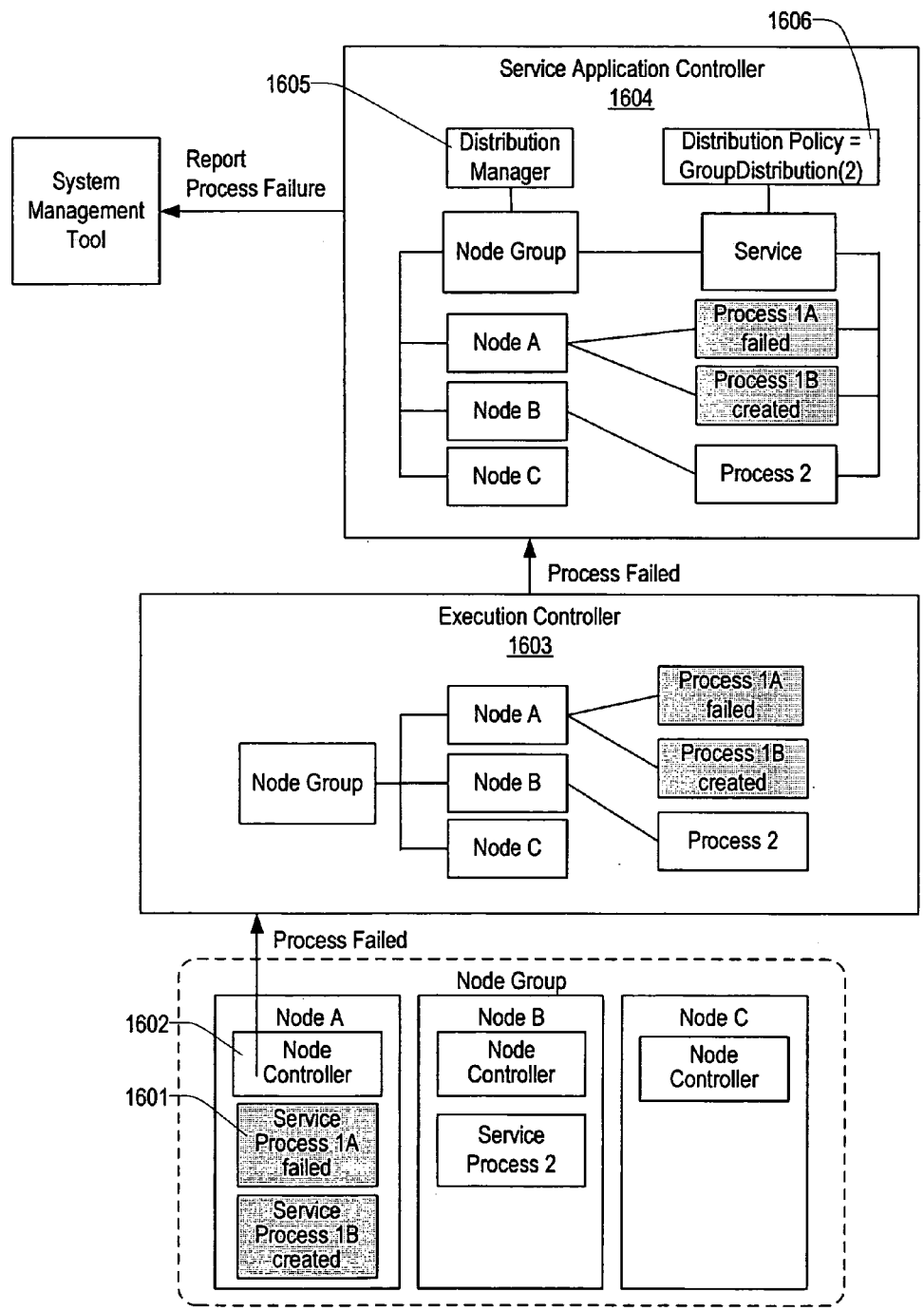
FIG. 16 depicts objects relevant to understanding the steps of detecting and recovering a service process failure by the service application controller.

FIGS. 15 and 16 illustrate a method that SAC uses to handle a service process failure. FIG. 15 illustrates a flow chart that includes the steps of detecting and recovering from a process failure. FIG. 16 illustrates the objects related to an exemplary service that are relevant to understanding the steps in the flow chart. The abbreviations used in the flow chart are: service application controller ("SAC"), execution controller ("EC"), and node controller ("NC").

The steps of the flow chart in FIG. 15 are initiated when a service process, for example service process 1A 1601 of our exemplary service illustrated in FIG. 16, fails 1501. The node controller 1602 on node A detects the failure 1502 and sends a "Process Failed" message to the execution controller 1503. The execution controller 1603 receives the message and marks Process 1A object in its state model as "Failed" 1504. The execution controller then sends the "Process Failed" notification to the subscribers of process failure events, which includes SAC 1505.

When SAC 1604 receives the "Process Failed message, it marks Process 1A object in its state model as "Failed" 1506. SAC 1604 reports the failed process to the system management tool 1507 (assuming that the system management tool has subscribed to the event) and invokes the Distribution Manager object 1605 to handle the process failure.

The Distribution Manager object 1605 uses the Distribution Policy object associated with the service to determine how to handle the failure 1508. The Distribution Policy object 1606 of the exemplary service is GroupDistribution (2), which means that, at least in some embodiments, there should be two service processes at all times. Therefore, the Distribution Manager object 1605 makes the decision to create a replacement service process, service process 1B, on the same node. SAC 1604 then uses the same steps to start the replacement service process that were used to start the original process 1509. The steps were described previously in this disclosure as part of the description of the start service method illustrated in FIG. 13.

In an alternative embodiment of the invention, the SAC and EC state model objects representing failed processes are removed instead of being marked as "Failed".

Method For Handling A Node Failure

Figure 17:
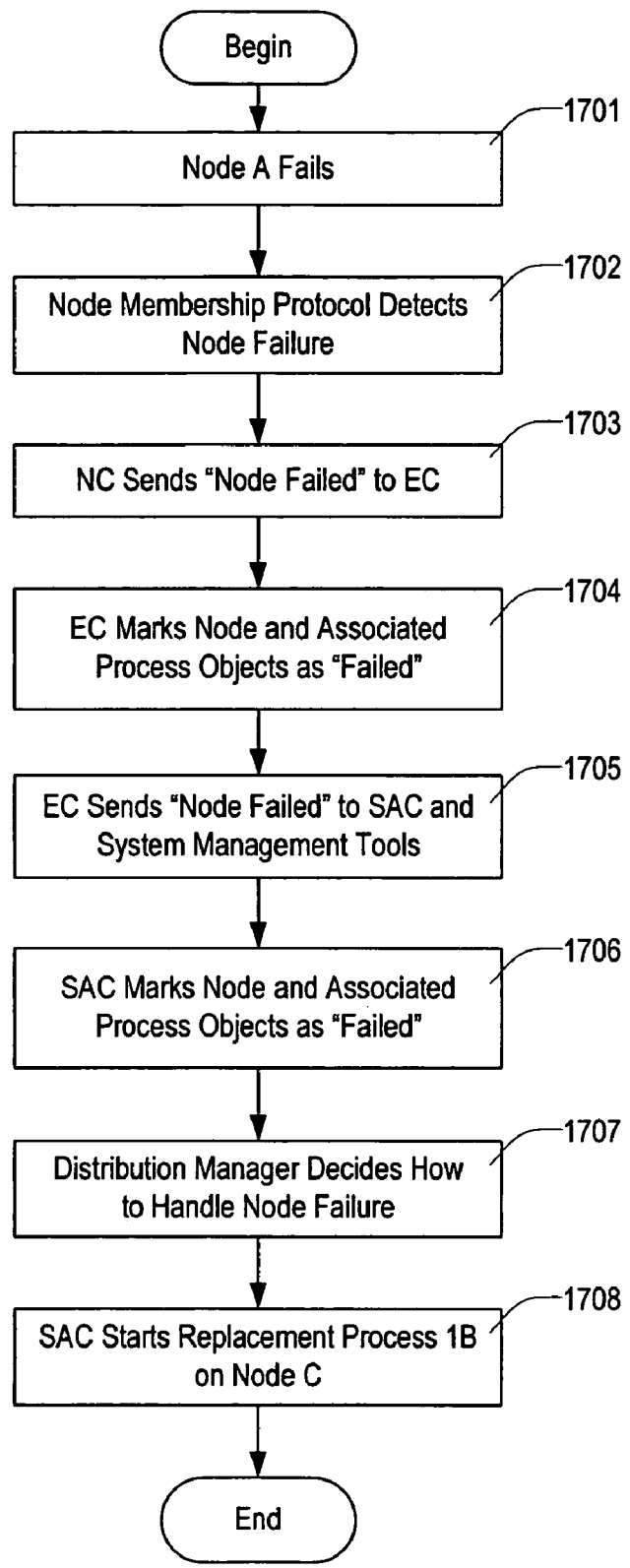
FIG. 17 illustrates a flow chart that includes the steps used in detecting and recovering a node failure by the service application controller.
Figure 18:
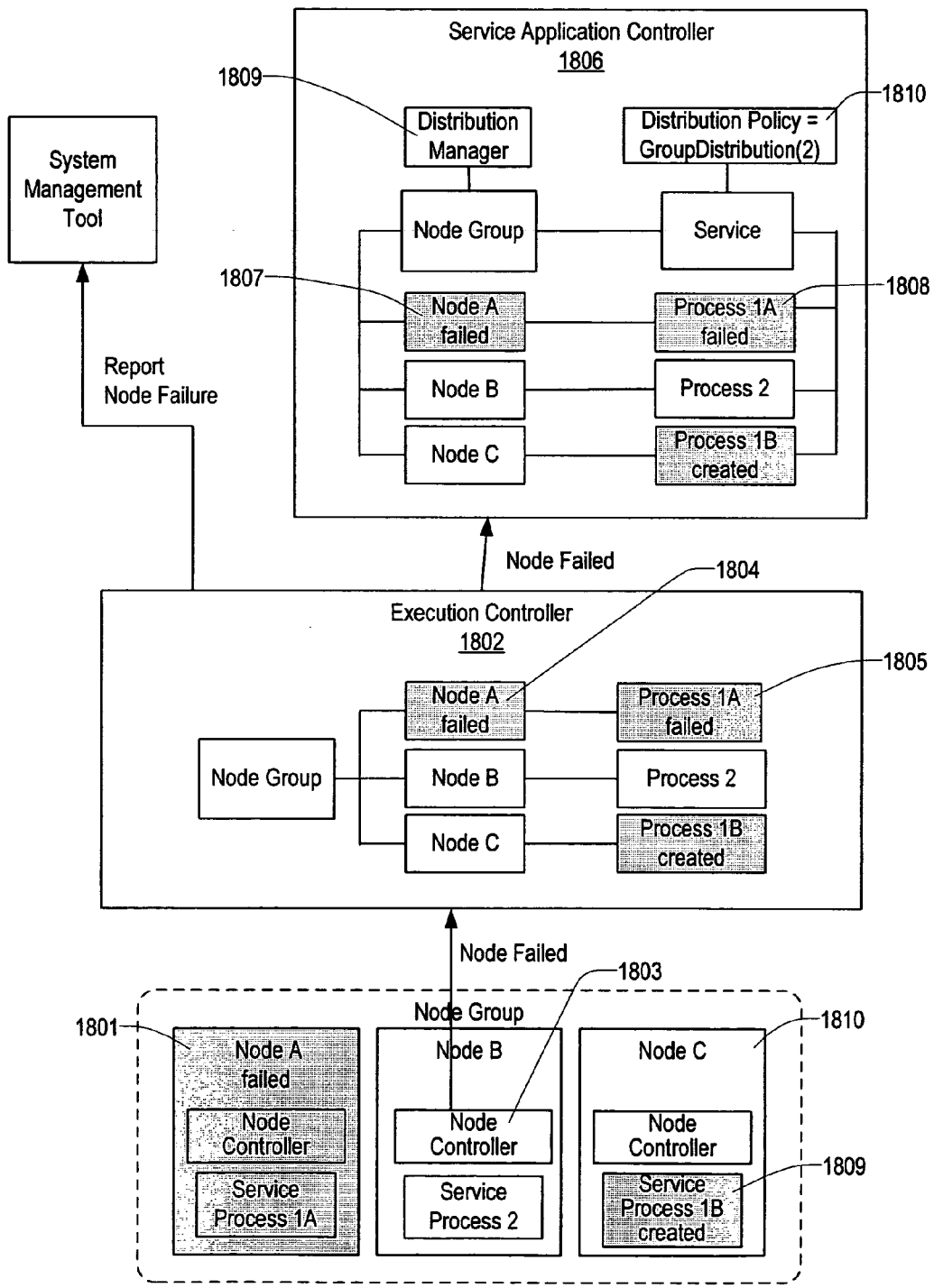
FIG. 18 depicts objects relevant to understanding the steps of detecting and recovering a node failure by the service application controller.

FIGS. 17 and 18 illustrate a method that SAC uses to handle a node failure. FIG. 17 illustrates a flow chart that includes the steps of detecting and recovering a node failure. FIG. 18 illustrates the objects related to an exemplary service that are relevant to understanding the steps in the flow chart. The abbreviations used in the flow chart are: service application controller ("SAC"), execution controller ("EC"), and node controller ("NC").

The steps of the flow chart in FIG. 17 are initiated when a node, for example node A 1801 in our exemplary distributed computer system illustrated in FIG. 18, fails 1701. The membership protocol detects the node failure 1702 and one of the node controllers 1803 reports the failure to the execution controller by sending a "Node Failed" message to it 1703.

When the execution controller 1802 receives the "Node Failed" message it marks the Node object and its associated Process objects as "Failed" 1704. In the case of the exemplary application in FIG. 18, the Node A 1804 and Process 1A objects 1805 are marked as "Failed". The execution controller 1802 reports the node failure to the management system and other subscribers registered to receive the node failure event notification 1705. One of the subscribers is SAC 1806. When SAC 1806 receives the "Node Failed" event notification, it marks Node A object 1807 as "Failed" 1706. It also marks all its associated Process objects as "Failed" 1706, including the Process 1A 1808 object.

The SAC 1806 invokes the Distribution Manager object 1809 to recover the failure. The Distribution Manager object 1809 uses the Distribution Policy object 1810 in its decision on how to handle the node failure 1707. As the Distribution Policy object for the exemplary service is GroupDistribution (2), the Distribution Manager object in this embodiment should maintain, at all times, two service processes. Therefore, the Distribution Manager object will decide to start a replacement service processes, service process 1B 1809, on node C 1810.1708 SAC 1806 then uses the same steps to start the replacement service process that were used to start the original process. The steps were described previously in this disclosure as part of the description of the start service method illustrated in FIG. 13.

Method For Adding a New Node

Figure 19:
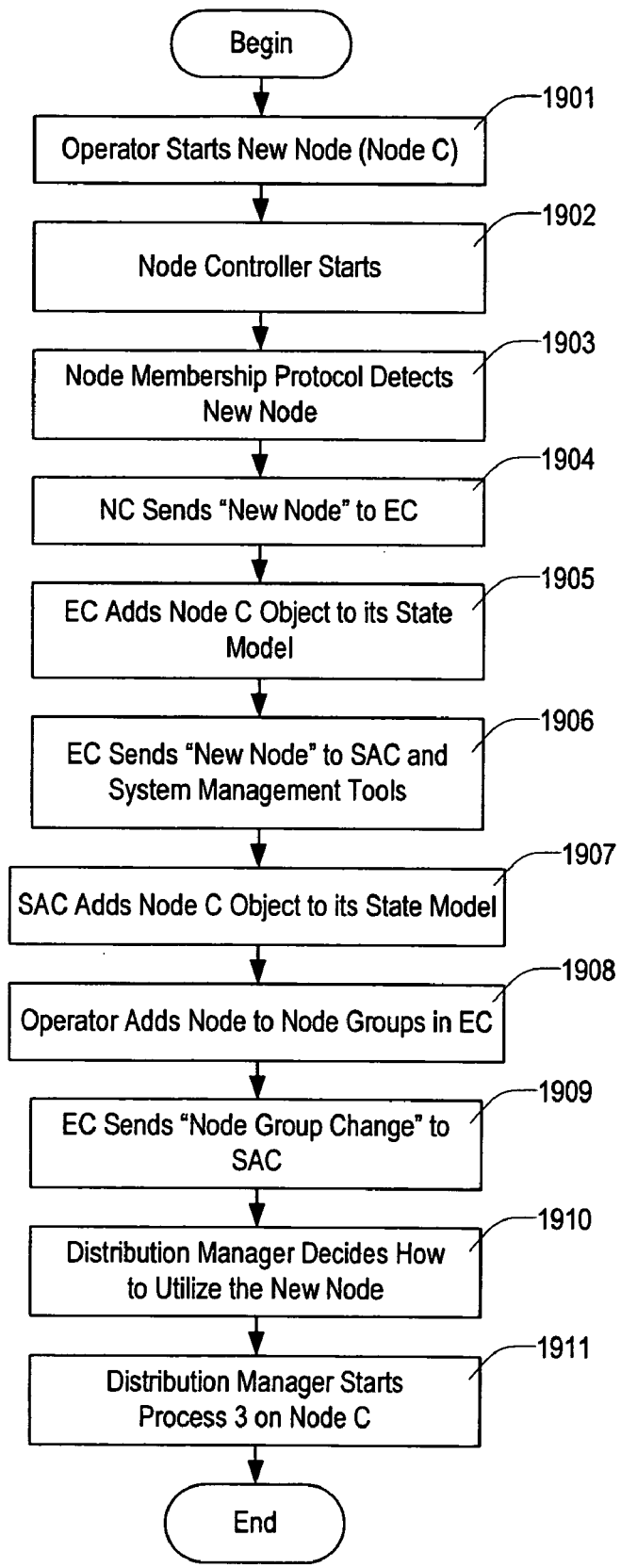
FIG. 19 illustrates a flow chart that includes the steps used in adding a new node to the distributed computer system.
Figure 20:
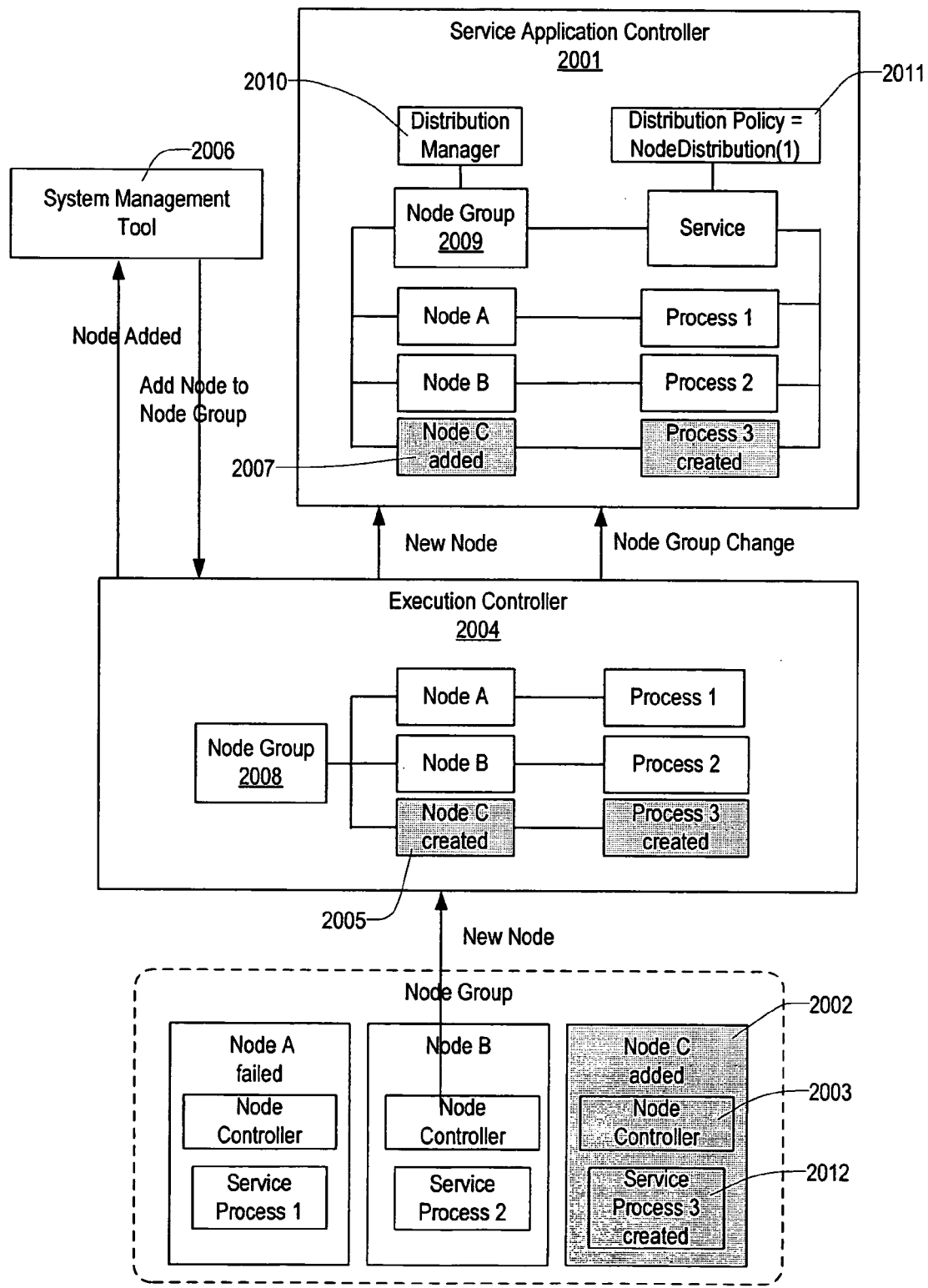
FIG. 20 depicts objects relevant to understanding the steps of adding a new node to the distributed computer system.

FIGS. 19 and 20 illustrate a method used by SAC to take advantage of a new node that has been added to the system. FIG. 19 illustrates a flow chart that includes the steps of detecting the new node and letting services take advantage of it. FIG. 20 illustrates the objects related to an exemplary service that are relevant to understanding the steps in the flow chart. The abbreviations used in the flow chart are: service application controller ("SAC"), execution controller ("EC"), and node controller ("NC").

The steps of the flow chart in FIG. 19 are initiated when an operator adds and starts a new node 1901. In the exemplary distributed computer system in FIG. 20, the new node is node C 2002.

When the node starts, it starts its node controller 2003. 1902 The node controller 2003 starts exchanging membership protocol messages with other node controllers. Eventually, all the other node controllers detect the presence of the new node 1903 and agree to allow the new node join the system.

One of the node controllers sends the "Node Added" message to the execution controller 1904. When the execution controller 2004 receives the "Node Added" message, it creates the Node C object 2005 in its state model to represent the new node 1905. Then it sends the "Node Added" notification to the system management tool 2006 and other subscribers that registered to receive node-related event notifications 1906. One of the subscribers is SAC 2001. When SAC 2001 receives the "Node Added" notification, it creates the Node C object 2007 in its state model and associates it with the Node C object 2005 in the execution controller 1907.

If this is a new node, rather than a node that failed and restarted, the operator adds the new node to some node groups 1908. For example, the operator can decide to improve the performance of the exemplary service illustrated in FIG. 20 by adding the new node to the node group used by the service. A node is added to a node group by operators sending the "Add Node to Node Group" message to the execution controller. In response to the message, the execution controller creates the association between the Node Group object 2008 and Node C object 2005. Then the execution controller sends the "Node Group Changed" message to the subscribers registered to receive node group events 1909. One of the subscribers is SAC 2001. When SAC receives the "Node Group Changed" message, it updates its state model by creating an association between the Node Group object 2009 and Node C object 2007.

SAC 2001 then invokes the Distribution Manager object 2010 to determine how to take advantage of the new node in the node group. The Distribution Manager object 2010 examines the Distribution Policy object 2011 to decide on an appropriate action 1910. The Distribution Policy object associated with the exemplary service is NodeDistribution (1) which specifies in some embodiments that there shall be, at all times, a single service process on each node of the node group. To comply with the policy object, the Distribution Manager object creates a new service process, service process 3, on the new node 1911. SAC starts service process 3 2012 using the steps that were described previously in this disclosure as part of the description of the start service method illustrated in FIG. 13.

Java Application Controller

The Java Application Controller ("JAC") is another exemplary application controller used in the preferred embodiment of the invention. Although the description of JAC focuses on the execution control of Java applications, the system and method of the invention equally apply to any distributed applications written in any programming language if they have a similar application execution model to Java applications.

Java Applications

JAC is designed to control the execution of Java 2 Platform, Standard Edition ("J2SE") and Java 2 Platform, Enterprise Edition ("J2EE") applications. The J2SE and J2EE applications are collectively referred in this disclosure as "Java applications". In the description of JAC, Java applications are often referred for short as "applications".

Many Java applications are distributed applications. The term "distributed" means that an application includes, at runtime, multiple application modules located possibly on different nodes of a distributed computer system. There are different ways to organize Java applications into distributable application modules.

Figure 21:
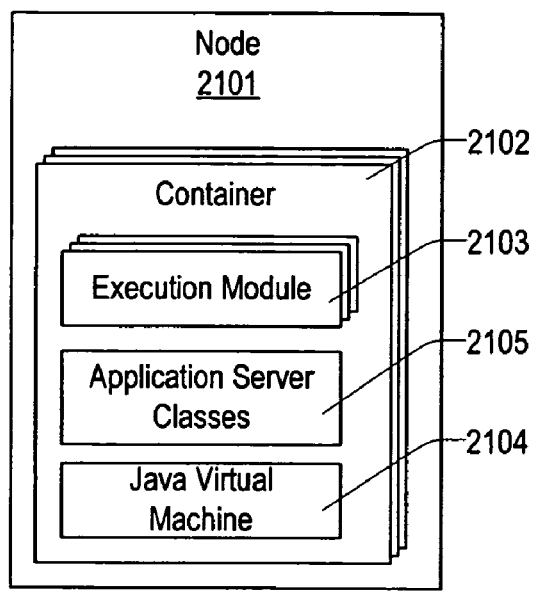
FIG. 21 illustrates containers and execution modules used by Java applications.

The application execution model implemented by JAC uses a two-level approach to managing the distribution of applications over the nodes of a distributed computer system. The concepts of the two-level approach are depicted in FIG. 21. Each node 2101 of the distributed computer system includes zero or more Java container processes 2102 ("containers"). Each container 2102 includes zero or more execution modules 2103. An execution module 2103 is a part of the distributed Java application and includes the program instructions and state (i.e. data). An execution module is typically realized by loading the classes from one or more Java Archive ("JAR") files into a container. The state included in the execution module includes state elements. An example of a state element is a programming-language variable that represents the value of an account balance.

An example of an execution module is an executable Enterprise Java Bean (EJB) module (EJB modules are described in Sun Microsystems' Enterprise JavaBeans™ 2.1 Specification). The execution module's program instructions are the EJB business methods; the execution module's state is the content of the EJB CMP (container-managed persistence) and CMR (container-managed relationships) fields. For example, a "debit" EJB business method is one exemplary embodiment of an execution module's program instructions and the "balance" EJB CMP field is one exemplary embodiment of an execution module's state element.

JAC manages how the containers are distributed over the nodes of the distributed system and how the application execution modules are distributed over the containers. FIG. 21 also depicts the parts of the container used in an embodiment of the invention. The container 2102 is a process that includes a Java Virtual Machine ("JVM") 2104 and application server classes 2105. The application server classes 2105 include Java classes that implement the operations that JAC uses to manage the lifecycle of the execution modules (such as the classes that implement the creation of execution modules) and Java classes that are provided as runtime library classes for the execution modules (such as classes that implement the Enterprise JavaBeans container functions).

JAC starts applications from applications definitions. An application definition could be a Java Archive File ("JAR") or an Enterprise Application Archive File ("EAR"). The formats of the JAR and EAR file are standard and are specified in Sun Microsystems' Enterprise JavaBeans™ 2.1 Specification. Other embodiments of the invention might use a different format of the application definition.

Figure 22:
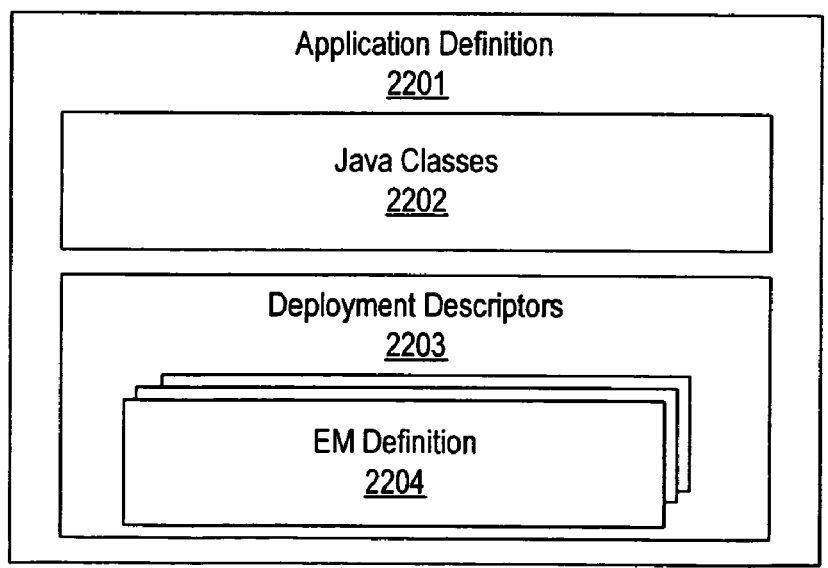
FIG. 22 depicts the structure of Java application definition.

FIG. 22 depicts the content of an application definition 2201. An application definition 2201 includes Java classes 2202 and deployment descriptors 2203. The Java classes 2202 include the program instructions of the application's execution modules. The deployment descriptors 2203 include the definitions of one or more execution module ("EM definitions") 2204. An EM definition 2204 is a template for one or more execution modules. An EM definition 2204 also includes the distribution policies for the execution modules created from the EM definition 2204. In one embodiment of the invention, the distribution policies specify how many instances of the execution module should be created, the name of the container group in which the execution modules should be created, and how the execution modules should be distributed over the containers. In some embodiments of the invention, the information in the deployment descriptor is represented using Extensible Markup Language (XML) technologies.

The JAC used in an embodiment of the invention does not require that all the EM definition information be present in the deployment descriptor. If some information is missing, JAC will assume some appropriate default values that work for most applications. For example, JAC can treat the entire application as a single execution module that will be assigned to a default container group.

In its distribution algorithms, JAC uses the concept of a container group. A container group is a named set of containers distributed over a node group associated with the container group. The container group then logically includes all the nodes in the associated node group. Multiple container groups can be associated with a single node group. When a node is added to a node group, it is automatically considered added to all the container groups that are associated with the node group.

Figure 23:
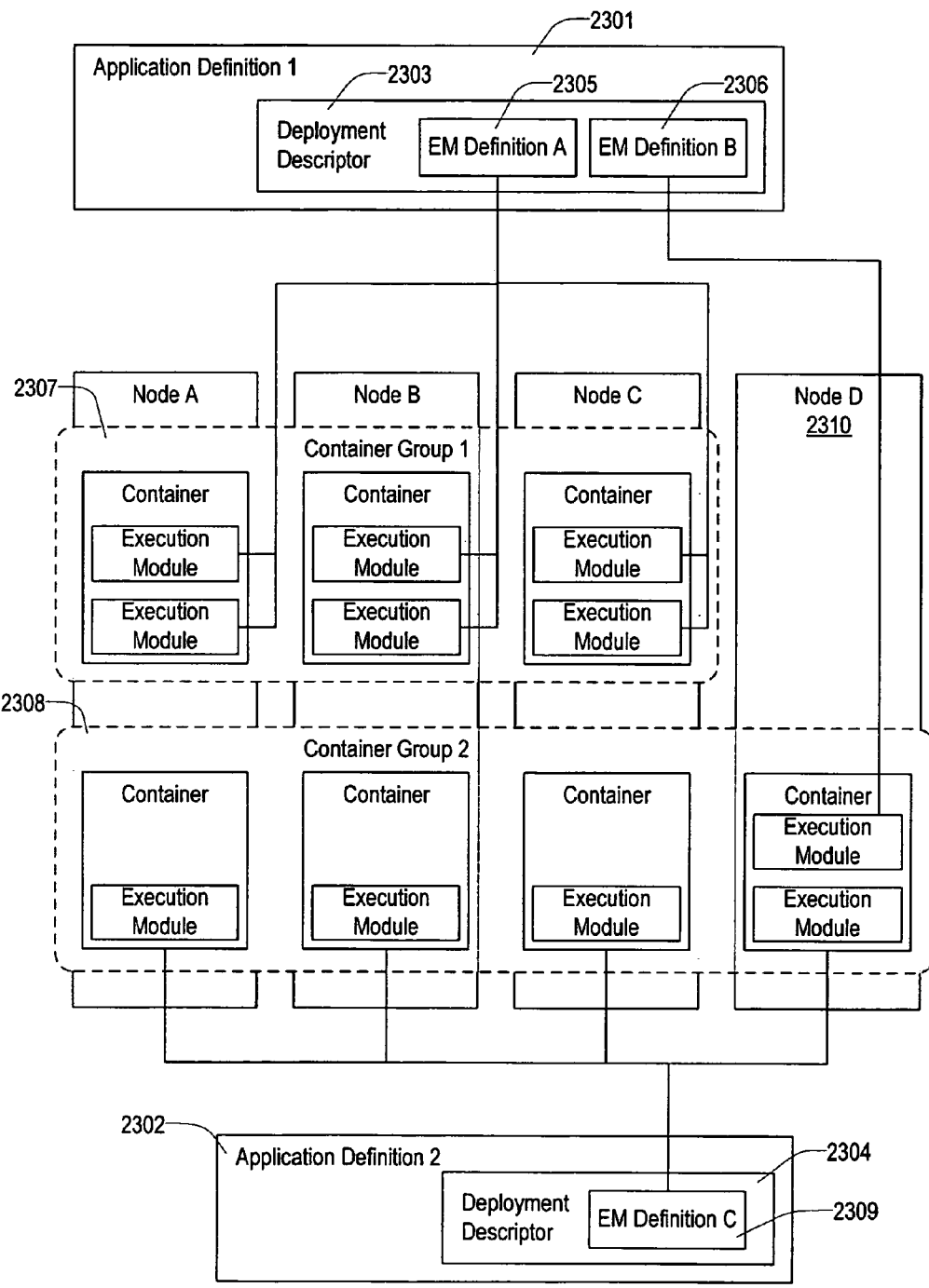
FIG. 23 illustrates two exemplary Java applications distributed over nodes of a representational distributed computer system.

FIG. 23 illustrates how two exemplary applications, started from application definition 1 2301 and application definition 2 2302, could be distributed across four nodes of a distributed computer system. Application definition 1 2301 includes a deployment descriptor 2303, which includes two EM definitions, EM definition A 2305 and EM definition B 2306.

EM definition A 2305 specifies that its associated execution modules shall be created in containers belonging to container group 1 2307 and that each container shall include two execution modules. This specification is accomplished by including the EmContainerDistribution(2) policy object in the EM definition. The distribution policy objects are explained later in this disclosure.

Similarly, EM definition 2 2306 specifies that its associated execution modules shall be created in containers belonging to container group 2 2308 and that there shall be a single execution module in the container group, irrespective of the number of containers in the container group. This specification is accomplished by including the EmGroupDistribution(1) policy object.

Application definition 2 2302 includes a deployment descriptor 2304, which includes a single EM definition C 2309. EM definition C 2309 specifies that its associated execution modules shall be allocated to containers belonging to container group 2 2308, and that each container should include a single execution module. This is accomplished by including the EmGroupDistribution (1) policy object in the EM definition. FIG. 23 further illustrates that the exemplary distributed computer system includes two container groups, container group 1 2307 and container group 2 2308.

Container group 1 2307 includes three nodes, nodes A, B, and C. Container group 1 2307 is associated with the NodeDistribution(1) policy object, which specifies that there shall be a single container on each node of the container group. Therefore, JAC creates three containers, one on each node of the container group.

Container group 2 2308 includes all four nodes, nodes A, B, C, and D. Container group 2 2308 is associated with the NodeDistribution(1) policy object, which specifies that there shall be a single container on each node in the container group. Therefore, JAC creates four containers, one on each node of the container group.

FIG. 23 illustrates that it is possible that a container includes execution modules associated with different EM definitions, possibly even from different applications. For example, the container on node D 2310 includes an execution module belonging to the application created from application definition 1 and another execution module belonging to the application created from application definition 2.

In some embodiments of the invention, an application's execution modules include the application's state. The state is comprised of elements. For example, the state of a banking application may include the CMP and CMR fields of the Enterprise JavaBeans (EJB) objects representing customers' accounts. When an application is divided into execution modules, the application's state becomes partitioned across multiple execution modules. For example, referring to FIG. 23, the bank account EJB objects would be partitioned and distributed across the multiple execution modules. Each execution module would include a subset of the bank accounts.

In some embodiments of the invention, the algorithm for partitioning the application's state into partitions is application-specific. In some embodiments of the invention, the application's deployment descriptor may provide the partitioning information for the execution control system.

Advantages of partitioning the application's state across multiple execution modules include increased scalability and better availability. Increased scalability is achieved due to the execution modules could be assigned to different containers included in different nodes, thereby taking advantage of all the processors included in all the nodes. Better availability is achieved because when one execution module (or the container or node including the execution module) fails, other execution modules are unaffected and can provide services to the application's user. A method for achieving availability will be described in detail below.

Java Application Controller Components

Figure 24:
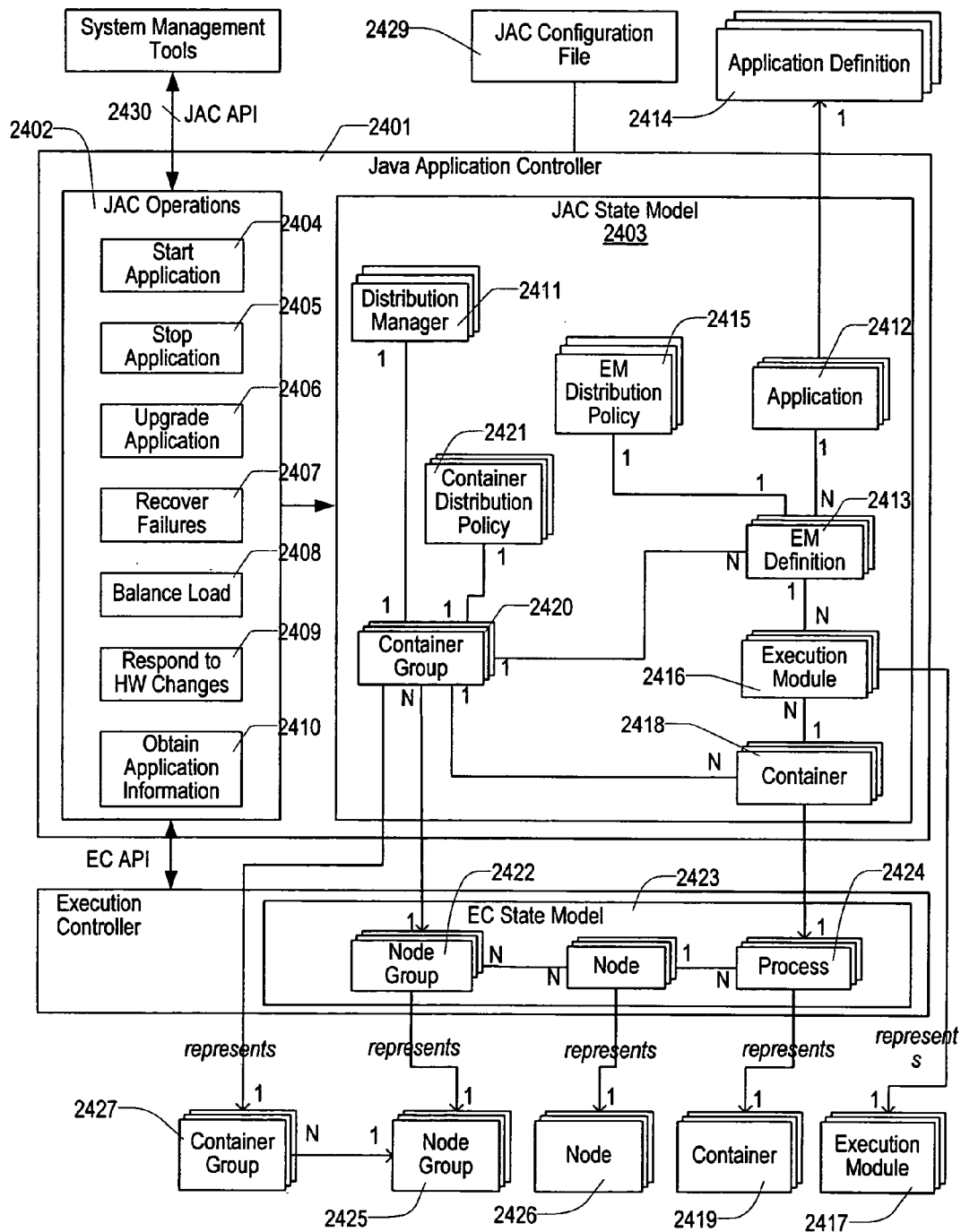
FIG. 24 depicts the structure of the Java application controller.

FIG. 24 illustrates JAC's 2401 internal structure. It also illustrates the relationships between JAC 2401 and other components of the execution control system. JAC includes operations 2402 and a state model 2403. Although the operations 2402 and state model 2403 are illustrated as logically separate, in some embodiment of the invention the operations 2402 and state model 2403 are tightly integrated in programming language objects, such as in Java objects or Enterprise JavaBeans.

The "start application" operation 2404 implements the algorithm for starting an application. JAC starts an application by starting containers and creating the execution modules associated with the application's EM definitions in the containers. The containers and execution modules are distributed in accordance to the distribution policies associated with the container groups and EM definition. A method for starting an application is described later in this disclosure.

The "stop application" operation 2405 implements the algorithm for stopping an application. JAC stops an application by removing the execution modules associated with the application and optionally stopping the containers that are no longer used.

The "upgrade application" operation 2406 implements the algorithm for upgrading an application to a new version of software. JAC orchestrates the upgrade by starting containers with the new version of the application server classes, creating execution modules using the new version of the application definition, removing the old execution modules, and stopping old containers.

The "recover failures" operations 2407 implement the handling of various failures in the distributed computer system, including the failures of execution modules, containers, and nodes. In general, a failure is handled by restarting the failed execution modules and containers on some of the remaining nodes of the distributed computer system. In the preferred embodiment of the invention, JAC associates each execution module with a standby execution module. The standby execution module includes a copy of the execution module's state. If a failure results in the loss of the execution module's state, the backup execution module is used for failure recovery.

The "balance load operations" 2408 implement the algorithms for leveling the application workload across the nodes of the distributed computer system. If one node is becoming overloaded while other nodes have spare capacity, JAC may transfer some execution modules from the overloaded node to other, less loaded nodes.

The "respond to hardware changes" 2409 operations implement the algorithms to redistribute the applications across the nodes of the distributed computer system in response to nodes being added or removed from the system. JAC uses its capabilities for transferring execution modules and starting and stopping containers to respond to hardware changes. The "obtain application information" 2410 operations return status information about the running applications.

JAC 2401 includes one or more Distribution Manager objects 2411. A Distribution Manager object 2411 implements the algorithm for how containers are distributed over nodes and how execution modules are distributed over containers. The algorithm of a Distribution Manager object is parameterized by distribution policy objects. The Distribution Manager and distribution policy objects are explained later in the disclosure.

JAC 2401 maintains knowledge of the state of the distributed computer system and applications running on it in its state model 2403. FIG. 24 illustrates representational JAC state model objects and relationships among the objects. The state model objects in FIG. 24 should be considered as illustrative rather than prescriptive.

The notation used in the relationships between state model objects is described in the description of FIG. 9. Each running application is represented in the state model by an Application object 2412. Each Application object 2412 is associated with one or more EM Definition objects 2413. An Application object 2412 corresponds to an application definition 2414 from which the application has been started. An EM Definition object 2413 includes the information from the EM definition in the application definition. Each EM Definition object 2413 is associated with an EM Distribution Policy object 2415 and one or more Execution Module objects 2416. Every execution module 2417 in the distributed computer system is represented in the JAC state model 2403 by an Execution Module object 2416. Each Execution Module object 2416 is associated with an EM Definition object 2413, and with a Container object 2418. A Container object 2418 represents a Java container process ("container") running on some node of the distributed computer system and is associated with a Process object in the execution controller state model.

Every container group 2419 is represented in the JAC state model 2403 by a Container Group object 2420. Each Container Group object 2420 is associated with a Distribution Manager object 2411 which includes the algorithm for distributing containers and execution modules for this container group; a Container Distribution Policy object 2421 which specifies how the Distribution Manager object 2411 shall distribute containers over the nodes of the node group; one or more EM Definition objects 2413 representing EM definitions assigned to the container group; and one ore more Container objects 2418 representing the containers that belong to this container group.

As depicted in FIG. 24, a Container Group object 2420 is also associated with a Node Group object 2422 in the EC state model 2423. A container group logically includes all the nodes the associated node group. As it was explained previously, the Node objects 2422 and Process objects 2424 within the EC state model 2423 represent the nodes and processes in the distributed computer system. FIG. 24 also depicts the actual parts of the distributed computer system that are represented by the objects in the state model: container groups 2427, node groups 2425, nodes 2426, containers 2419, and execution modules 2417.

JAC 2401 is associated with a configuration file. At startup, JAC 2401 reads the JAC configuration file 2429 to discover, among other things, the default container group and default distribution policy object that the JAC shall use for the application whose EM definitions do not specify a container group or distribution policy objects. JAC includes an event mechanism. When a significant event has occurred, such as when an execution module or container has been created, JAC generates an event notification. The notification is sent to all subscribers who registered to receive the event.

JAC exposes its operations to the system management tool and other components via the Java Application Controller Application Programming Interface ("JAC API") 2430. The JAC API 2430 allows the system management tool and other components to manage the lifecycle of application by invoking the JAC operations 2402 and subscribing to the JAC event notifications. The JAC API 2430 provides a single-system image of the applications running on a distributed computer system including multiple nodes to its users.

In some embodiments of the invention, the JAC API 2430 is bridged into a standard API used for system management, such as Java Management Extensions ("JMX"). This allows standard system management tools that conform to the JMX API to invoke the JAC operations and to subscribe to its events.

In some embodiments of the invention, JAC is realized as a transaction processing application as described in U.S. Provisional Patent Application Ser. No. 60/445,639 entitled Method and Apparatus for Online Transaction Processing and U.S. Provisional Patent Application Ser. No. 60/508,150 entitled Method and Apparatus for Efficient Online Transaction Processing. It is also described in U.S. patent application Ser. No. 10/774,207 entitled Method and System for Efficient Online Transaction Processing. In some embodiments of the invention, the execution control system maintains a backup copy of the JAC state model. The JAC backup copy is located on a different node than JAC. If JAC fails, the execution control system will recover JAC using the backup copy.

Distribution Manager Customization

One of the main functions of JAC is to manage the distribution of containers over the nodes of a distributed computer system and the distribution of execution module over the containers. JAC gives its users a lot of flexibility in customizing the distribution algorithm.

JAC encapsulates its distribution algorithms in the Distribution Manager objects. A Distribution Manager object includes an algorithm for how execution modules are distributed over the containers of a container group and how the containers of a container group are distributed over the nodes of a container group. JAC invokes the Distribution Manager object in response to events that may require that new execution modules or containers be created or removed, or that some execution modules be transferred from one container to another. A Distribution Manager object uses the objects of the state model to make its decisions. In some embodiments of the invention, a Distribution Manager object may store additional, distribution manager specific, information in the state model objects.

Many different implementations of the Distributed Manager objects may exist. In some embodiments of the invention, a "default" Distributed Manager object implementation is provided in the JAC implementation. In some embodiments, an application might include a custom Distribution Manager object in its application definition. When JAC starts the application, it loads the Distribution Manager object from the application definition. In other embodiments, a Distribution Manager object might be provided in a separate file from which JAC can load it when the Distribution Manager object is used.

JAC can include multiple Distribution Manager objects, each implementing a different distribution algorithm that might be suitable for a subset of the applications. The algorithm of a Distribution Manager object is parameterized by the distribution policy objects. The distribution policy objects are objects that in some way limit, or give preferences, to a Distribution Manager object's algorithm.

A Distribution Manager object in some embodiments of the invention uses the NodeDistribution(N) and GroupDistribution(N) policy objects that constrain the distribution of containers over nodes, and the EmContainerDistribution(N) and EmGroupDistribution(N) policy objects that constrain the distribution of execution modules over containers as follows. If a container group is associated with the NodeDistribution(N) policy object, the associated Distribution Manager object in some embodiments interprets the policy object as a requirement that there be, at all times, N containers on each node of the associated container group. If a container group is associated with the GroupDistribution(N) policy object, the associated Distribution Manager object in some embodiments interprets the policy object as a requirement that there be, at all times, a total of N containers in the associated container group, irrespective of the number of nodes in the container group.

If an EM definition is associated with the EmContainerDistribution(N) policy object, the associated Distribution Manager object in some embodiments interprets the policy object as a requirement that there be, at all times, N execution modules in each container that is part of the associated container group. If an EM definition is associated with the EmGroupDistribution(N) policy object, the associated Distribution Manager object in some embodiments interprets the policy object as a requirement that there be, at all times, a total N execution modules distributed in some way across the containers of the associated container group.

The Distribution Manager object in some embodiments of the invention allows an EM definition to specify a distribution policy object stating that a new execution module is to be created for each Enterprise JavaBean ("EJB") object of a given EJB type. The Distribution Manager object in some embodiments of the invention controls the number of execution modules based on Service Level Agreements ("SLA"). If an application becomes overloaded and would not meet its SLA, the Distribution Manager creates additional execution modules in additional containers to increase the capacity of the application. The Distribution Manager object in some embodiments of the invention maintains one or more backup execution modules for each active execution module. The backup execution module includes the copy of the state of the active execution module and is used to recover the execution module from a failure. One embodiment of the invention that uses active and backup execution modules is described below.

Method For Starting Applications

Figure 25:
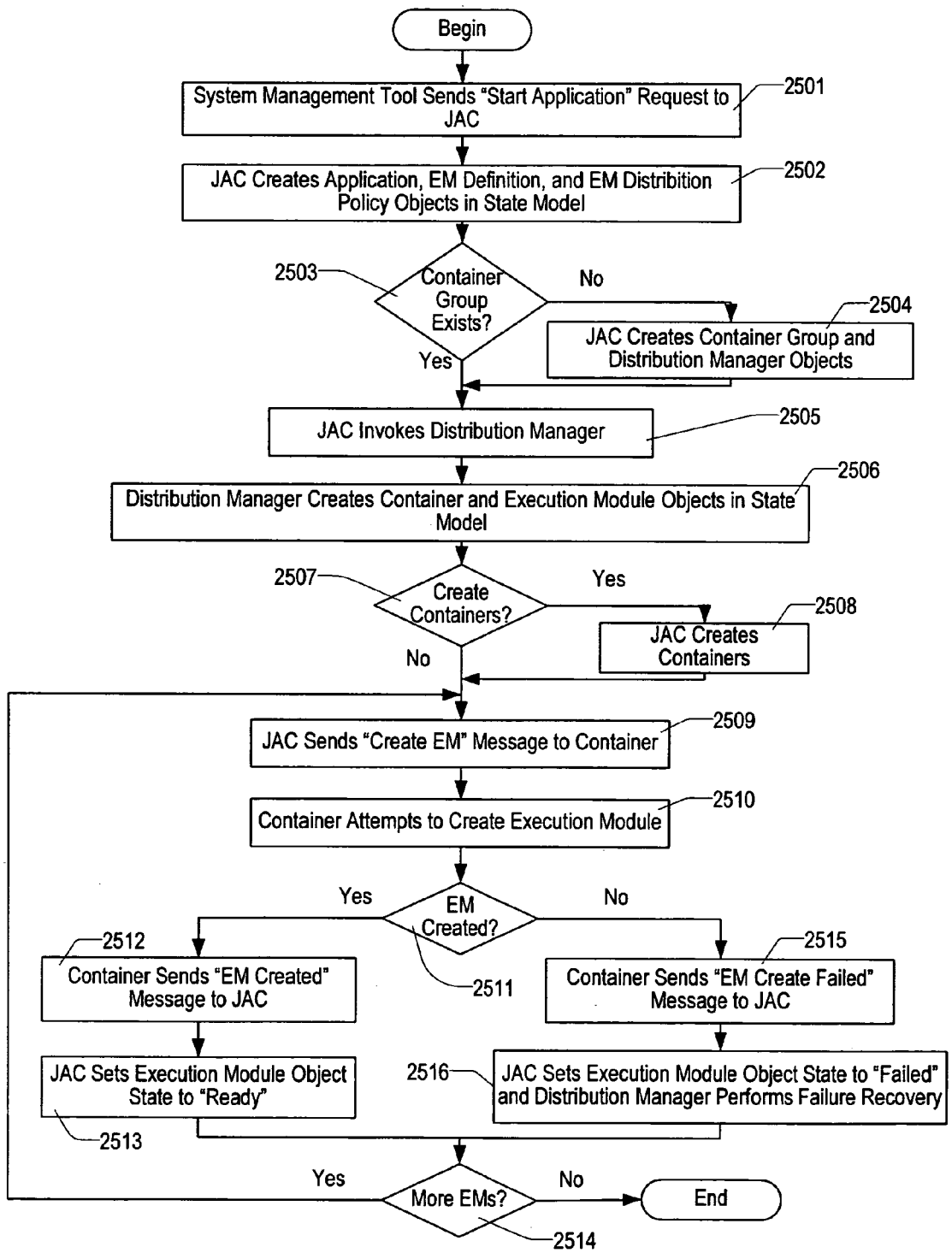
FIG. 25 illustrates a flow chart that includes the steps used in starting a Java application.
Figure 26:
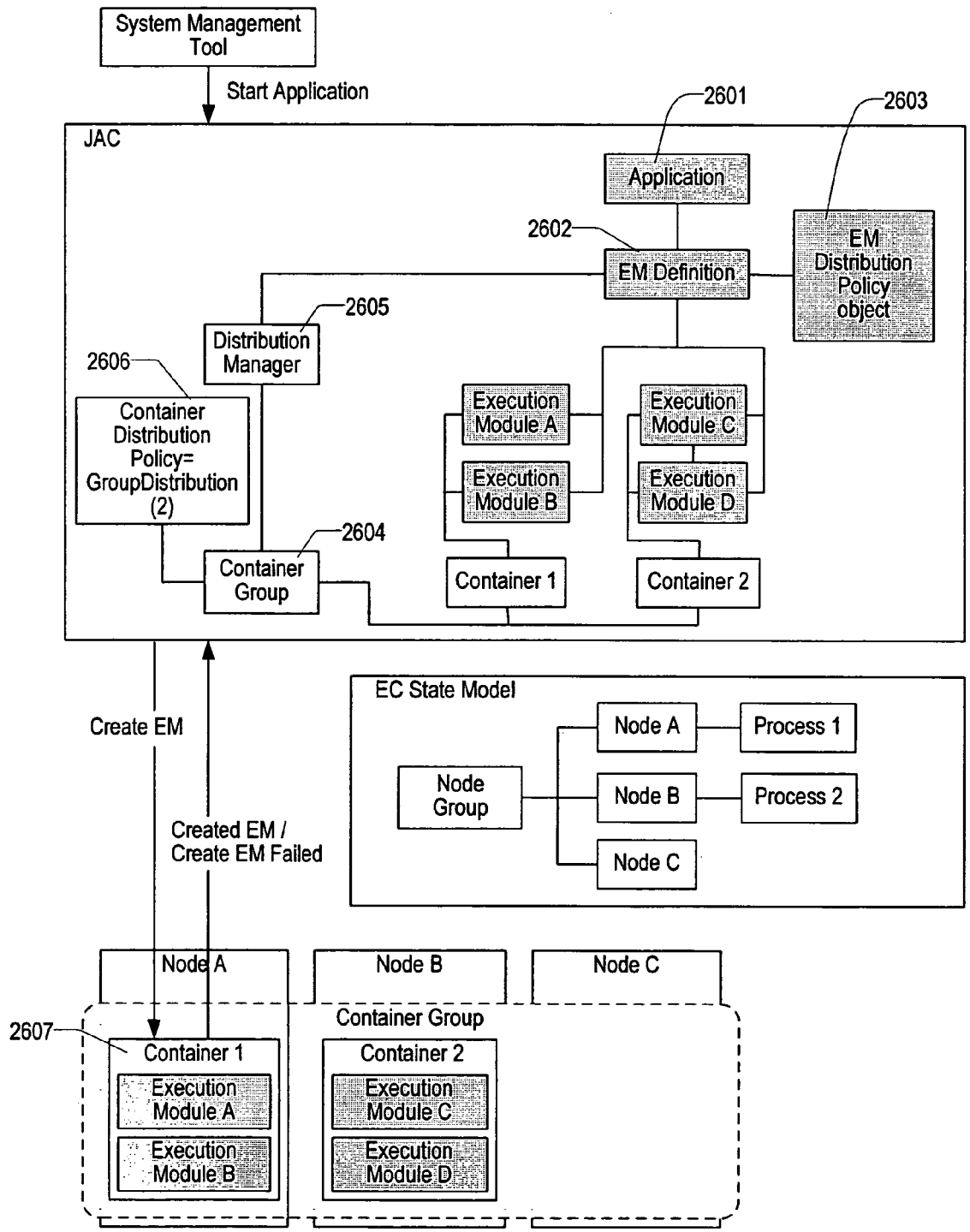
FIG. 26 depicts objects relevant to understanding the steps of starting a Java application.

FIGS. 25 and 26 illustrate the method used by JAC to start an application. FIG. 25 illustrates a flow chart including the steps of starting an application and FIG. 26 depicts the objects related to an exemplary application that are relevant to understanding of the method.

The following description follows the steps in the flow chart in FIG. 25 and refers to the objects in FIG. 26. The shaded objects in FIG. 26 are objects that are created during the steps of starting the exemplary application.

A system management tool sends the "Start Application" message to JAC 2501. In response to the message, JAC reads the application definition files and creates the Application object 2601, EM Definition object 2602, and EM Distribution Policy object 2603 in its state model 2502. The exemplary EM Distribution Policy object is the EmContainerDistribution(2) distribution policy object, which indicates that there shall be two execution modules in each container. The EM definition included in the application definition may specify the name of the container group to associate with the execution modules. If the container group is not specified in the EM definition, it might be specified alternatively in the "Start Application" message. If the container group name is specified neither in the application definition nor in the message, JAC would use a default container group specified in the JAC configuration file.

Then JAC checks if the container group exists 2503. If the container group does not exist, JAC creates the Container Group object 2604 in its state model and associates it with a Distribution Manager object 2605. 2504 The Distribution Manager object 2605 could be specified in the application definition, in the "Start Application" message, or in the JAC configuration file. JAC associates the Container Group object 2604 with a Container Distribution Policy object 2606 that gives the Distribution Manager object 2605 further information on how it should distribute containers over nodes. The exemplary Container Distribution Policy object 2606 in FIG. 26 is GroupDistribution(2) which indicates to the Distribution Manager object that there shall be a total of two containers.

Now JAC invokes the Distribution Manager object 2505 that decides how to distribute containers and execution modules. The Distribution Manager object 2605 determines how many containers should be created and on which nodes. If the containers do not exist, the Distribution Manager 2605 creates new Container objects 2506. Then the Distribution Manager object 2605 determines how many execution modules to create and how to distribute them over the containers 2506. The Distribution Manager object 2605 creates the Execution Module objects in the JAC state model that will represent the execution modules 2506. The execution modules are initially in the "Creating" state.

If the Distribution Manager object created new Container objects, the containers represented by the Container objects are first created. JAC makes a check to see if any containers should be created 2507. If some containers should be created, JAC creates them 2508.

For the sake of brevity of the flow chart, it assumed that the containers have been created prior to initiating the start application method and therefore do not have to be created during the application start. If the containers did not exist when the application were started, JAC would create the containers using the same method that the SAC uses to start process including a service. The method is specified in detail in the description of FIGS. 13 and 14.

Then JAC uses the following steps to create an execution module in a selected container. The steps are repeated for all execution modules that should be created. In some embodiments of the invention, the execution modules are created sequentially. In other embodiments, JAC creates the execution modules in parallel.

The Distribution Manager object 2605 sends the "Create Message" to the container 2607 in which the execution module should be created 2509. The container 2607 receives the message and attempts to create the execution module 2510. The container makes a check whether the execution module has been successfully created 2511. If the execution module has been successfully created, the container 2607 sends the "EM Created" message to JAC 2512. JAC sets the state of the Execution Module object in its state model to "Ready" to indicate that the execution module has been successfully created 2513.

If the creation of an execution module fails, the container 2607 sends the "EM Create Failed" message to JAC 2515. JAC marks the Execution Module object in its state model as "Failed" and performs failure recovery by invoking the Distribution Manager object 2516. The Distribution Manager object may, for example, attempt to retry the "Create EM" message, or it may attempt to create the execution module in a different container.

While the flow chart illustrates that the distribution manager creates all the Container objects and Execution module objects in the state model in step 2506 before the corresponding containers are created in step 2508 and the corresponding execution modules are created in step 2509, in some embodiments of the invention these steps might be done in different order or in parallel.

Method For Handling Node Failure

Figure 27:
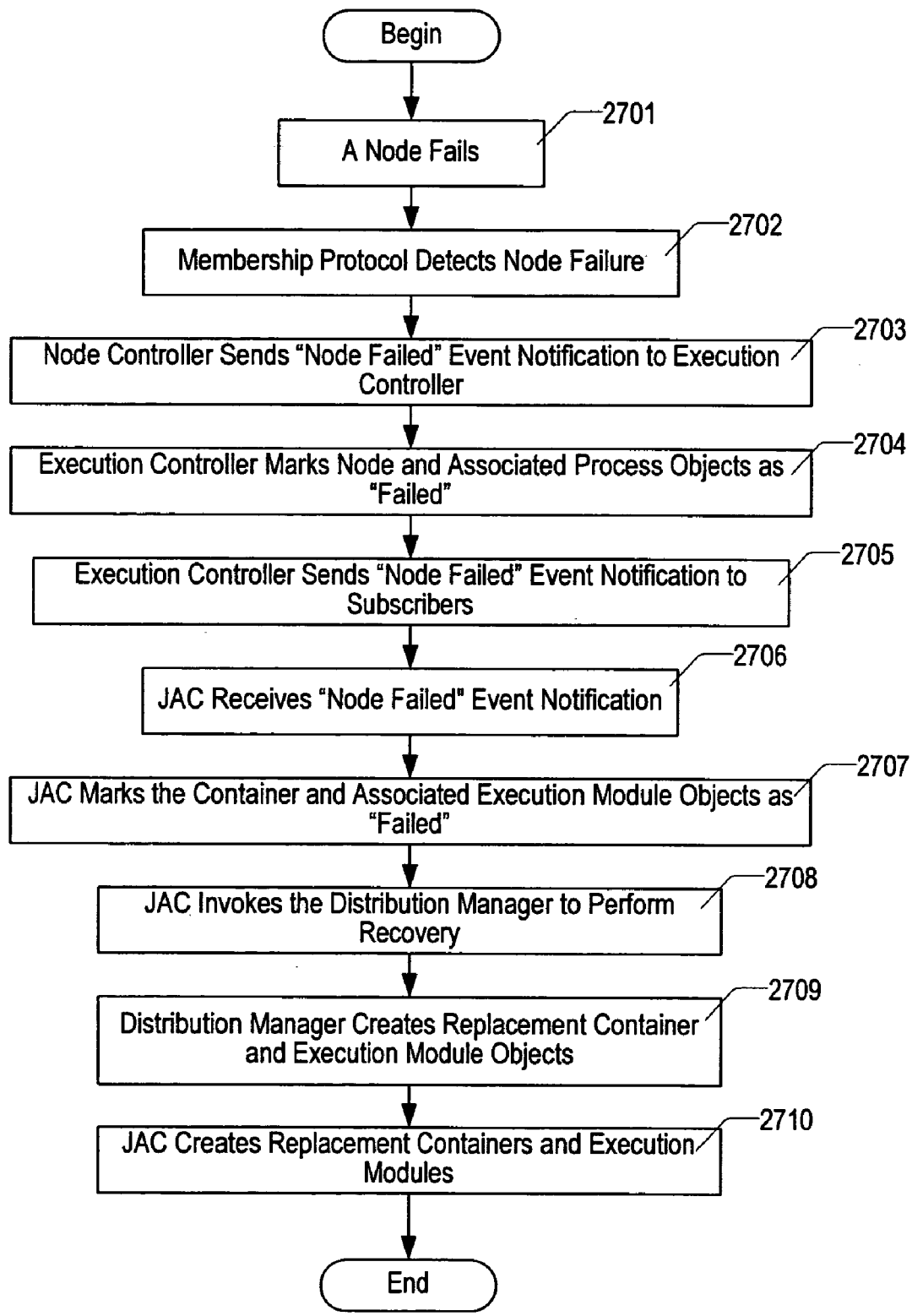
FIG. 27 illustrates a flow chart that includes the steps used in detecting and recovering a node failure by the Java application controller.
Figure 28:
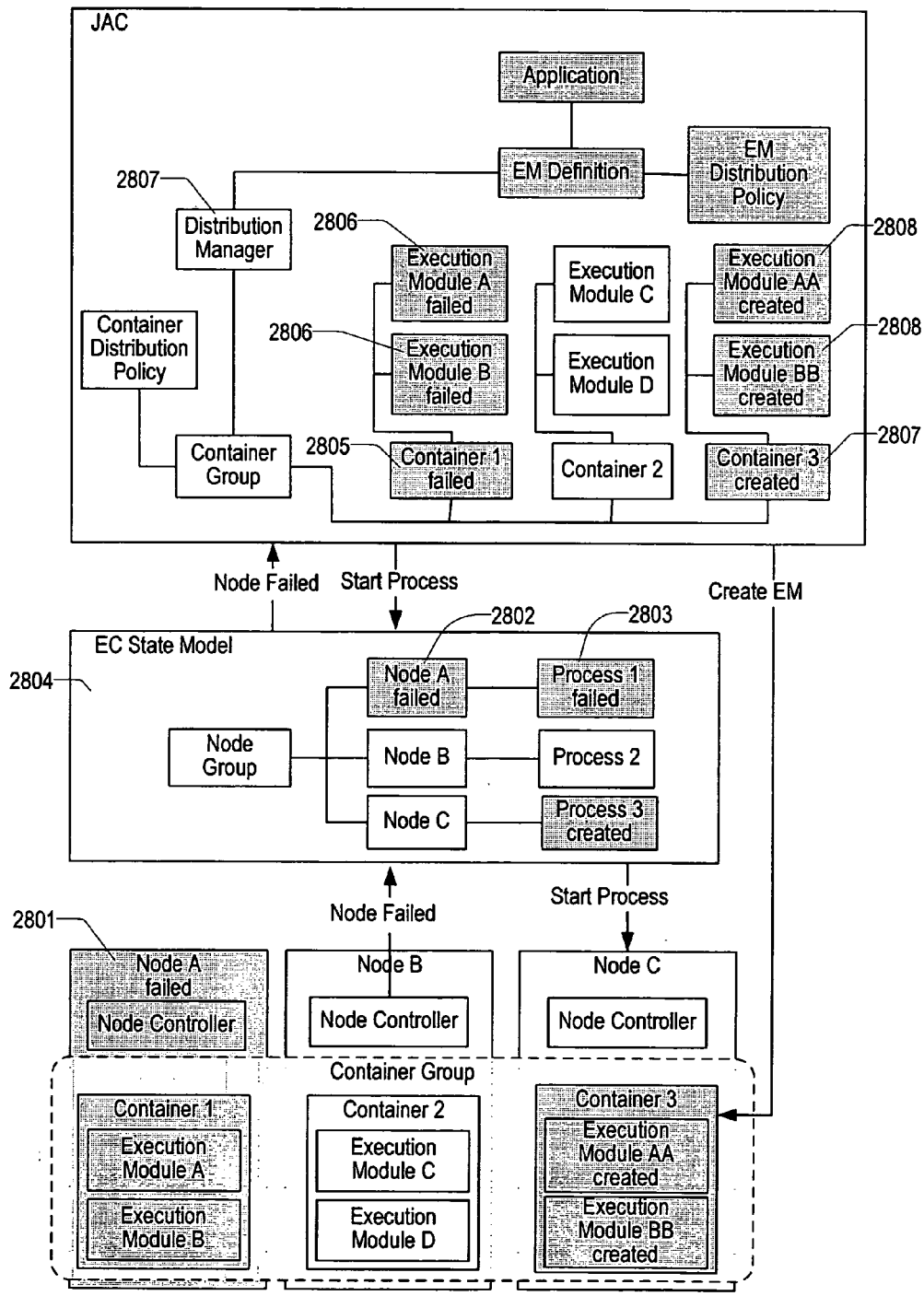
FIG. 28 depicts objects relevant to understanding the steps of detecting and recovering a node failure by the Java application controller.

One of the functions of JAC is to recover applications from various failures in the distributed computer system. FIGS. 27 and 28 illustrate a method used by JAC to recover applications from a node failure. FIG. 27 illustrates a flow chart including the steps of detecting and recovering an application from node failure and FIG. 28 depicts the objects related to an exemplary application that are relevant to understanding of the method.

The following description follows the steps in the flow chart in FIG. 27 and refers to the objects in FIG. 28. The shaded objects in FIG. 28 are objects that have been affected by the node failure or have been created during the recovery process. The method starts when a node 2801 fails 2701. A node could fail because of a hardware or software failure. All processes and execution modules on the failed node are lost. The node controller on the failed node stops sending membership protocol messages to the node controllers on the other nodes.

The node controllers on other nodes will miss the membership messages from the failed node and will reach agreement that the node has failed 2702. One of the node controllers, for example, the node controller on node B in FIG. 28, will send the "Node Failed" event notification to the execution controller 2703.

When the execution controller receives the node failure notification, it marks the Node object and all its associated Process objects as "Failed" 2704. In the case of the exemplary application in FIG. 28, the Node A object 2802 and Process 1 object 2803 in the EC state model 2804 are marked as "Failed". Then the execution controller sends the "Node Failed" and "Process Failed" event notifications to the subscribers that have registered to receive these event notifications 2705.

One of the subscribers is JAC. JAC has registered to receive the "Node Failed" event notifications from the execution controller. When JAC receives the "Node Failed" event notification 2706, it marks all the Container objects representing containers on the failed node as "Failed" 2707. For the exemplary application in FIG. 28, Container 1 object 2805 is marked as "Failed". JAC marks as "Failed" also all the Execution Modules that represent the execution modules associated with the failed containers. 2707 For the exemplary application, Execution Module A and B objects 2806 are marked as "Failed".

Now JAC invokes the Distribution Manager object 2807 to perform recovery 2708. The Distribution Manager object 2807 examines the JAC state model to discover which objects have failed and will perform recovery according to its internal algorithm and the distribution policy objects associated with the Container Group object and EM Definition object. When performing failure recovery, the Distribution Manager object may create new Container and Execution Module objects in the JAC state model 2709. In the case of the exemplary application in FIG. 28, the Distribution Manager object may create Container 3 object 2807 and the Execution Module AA and BB objects 2808.

JAC then creates the actual containers and execution modules that the Container and Execution Module objects represent 2710. JAC uses the same steps to create the containers and execution module that were used to create them at the start of the application.

In some embodiments of the invention, JAC may utilize the backup execution modules to recover the state of the failed execution modules and thereby make the node failure transparent to the application users. In this case, JAC could initialize the replacement execution module with the state from the backup execution module, or it could enable the backup execution module to become the replacement for the failed execution module.

Replication Of Application Modules

Advantages of the present invention include improved resilience to software and hardware failures, thereby improving the application's availability to its users. The term availability is usually defined as the percentage of the time that a system provides a minimal agreed-on level of service to its users. A system is called unavailable if it does not provide the minimal agreed-on level of service. As an example, a service level agreement might require that a system handle 1,000 transactions per second. Due to failures, the system could not meet the requirement for a total of 3 days of a year. Using the above definition of availability, the system achieved availability equal to (365−3)/365=99.18%.

Telecommunications, financial services, and other applications that serve a large number of users typically require availability on the order of 99.999 to 99.9999%, which translates to 5 minutes to 30 seconds of unavailability each year (a telecommunication systems is in general considered available if it provides at least 80% of its capacity). The system and method of the present invention allow applications to achieve this very high level of availability without putting undue burden on the application developer, while maintaining low system cost.

The invention takes advantage of two techniques to achieve very high availability. First, embodiments partition applications into small, independently failing execution modules. If one of these modules fails, other modules remain unaffected. Partitioning of applications into execution modules is described elsewhere in the specification. Also, embodiments replicate the state of each application execution module on multiple nodes. Each copy of the application execution module is called a replica. If one replica of an execution module fails, other replicas of the execution module remain available, thereby allowing the application to provide service to its users.

Although this disclosure explains a method for achieving high availability in the context of Java applications and the Java Application Controller described elsewhere in the specification, other embodiments of the invention could use the method for achieving high availability in a different context. For example, in some embodiments, they could use the method for non-Java applications. In other embodiments, they could use it with a different or no application controller.

Replication Constraints And Replication Groups

To achieve protection from failures, the system maintains multiple copies of an execution module. These copies are called replicas. In some embodiments of the invention, each replica of an execution module is kept on a different node so that the execution module's state is protected not only from the failure of an execution module, but also from a failure of the node or the process that includes the execution module.

In some embodiments of the invention, all replicas of an execution module include both the execution module's program instructions and the state. Any of these replicas can perform the execution module's normal functions. In other embodiments, some replicas include only the execution module's state, but not the normal program instructions. These replicas that do not include program instructions are capable of keeping an up-to-date copy of the replica state, but they cannot perform the normal execution module's functions.

Figure 32:
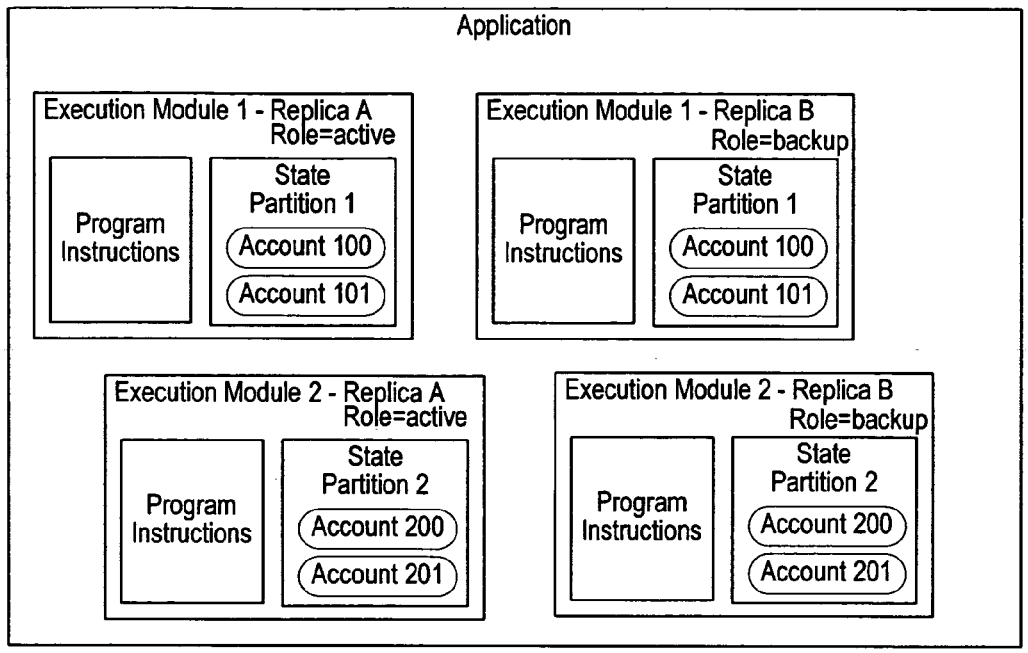
FIG. 32 depicts a system that includes active and backup replicas of an execution module using hot-standby replication.

FIG. 32 illustrates the concept of application partitioning and replication. FIG. 32 depicts an exemplary banking application that is partitioned into two execution modules. In the illustrative partitioning, the first execution module includes the accounts with account numbers between 100 and 199, and the second execution module includes accounts with account numbers between 200 and 299. Two replicas have been created for each execution module. Each replica includes the execution module's state (for example, the fields holding account balances) and the program instructions that read and update the state elements (for example, the program instructions that perform the debit and credit banking transactions). The active and backup roles assigned to the replicas depicted in FIG. 32 will be explained later in this disclosure.

Figure 33:
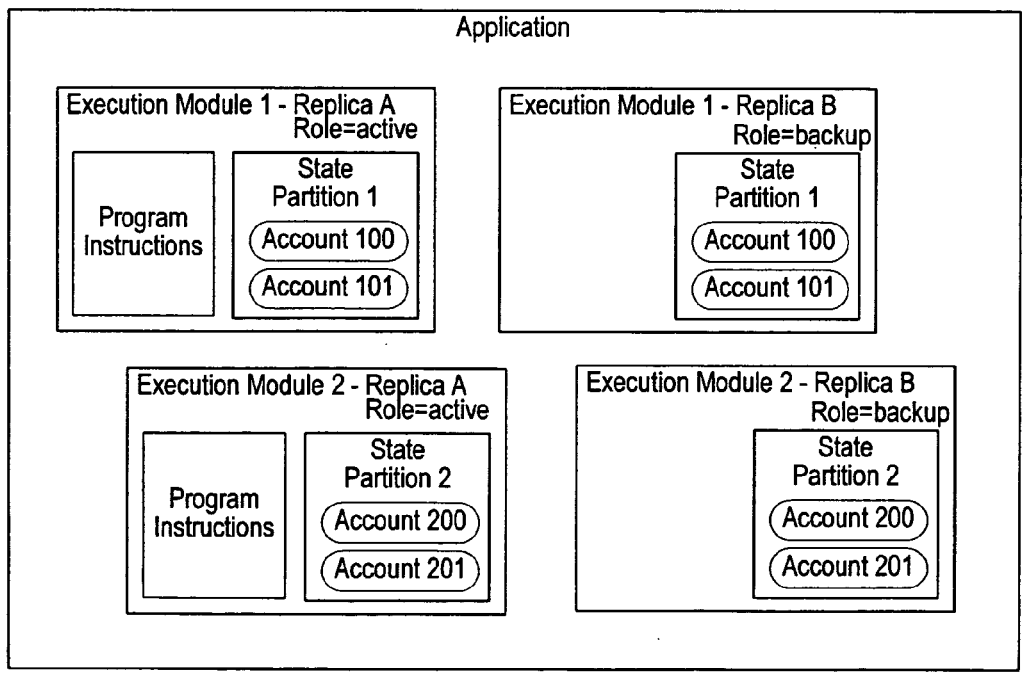
FIG. 33 depicts a system that includes active and backup replicas of an execution module using cold-standby replication.

FIG. 33 illustrates another embodiment of replicated execution modules. It is similar to the one depicted in FIG. 32, with a difference being that the replicas in the backup role do not include program instructions—they include only the execution module's state.

In some embodiments of the invention, a single execution module's replica is assigned the active role while other replicas of the same execution module are assigned the backup role. Only the active replica performs the normal computation that the execution module is intended to carry out (for example, if the execution module includes the program instructions for banking transactions, only the active replica is configured to receive and execute users' debit and credit transactions). The active replica sends checkpoint messages to the backup replicas so that the state included in the backup replicas is synchronized with the state of the active replica. Different embodiments of the invention send checkpoint messages at different times. For example, in some embodiments used in transaction processing systems, the active replica sends a checkpoint message at transaction completion. The checkpoint message includes a description of the changes that a transaction has made to the state elements in the active replica. In other embodiments, checkpoint messages could be sent periodically (for example, every 5 seconds).

Different embodiments of the invention may take different approaches to handling a failure of a replica. There are several causes of replica failures, including the following ones: a replica may fail due to a programming error in its program instructions; a replica may fail because the process that includes the replica has failed; or a replica may fail because the node that includes the replica has failed. We will describe several exemplary approaches to dealing with replica failures.

FIGS. 34-A and 34-B illustrate one possible approach to dealing with replica failures, which we call hot-standby replication. The basic idea behind hot-standby replication is that the backup replicas include the same program instructions as the active replica. If the active replica fails, one of the backup replicas is promoted to become the new active replica. In some embodiments, a new backup replica is created after a failure so that the execution module remains protected against future failures. The handling of a failure of an active replica is illustrated in FIG. 34-A, while the handling of a backup replica is illustrated in FIG. 34-B. In both failure examples, a replacement replica is created after the failure to protect the application from future failures. When a new backup replica is created, its state is initialized by copying the state from the active replica, as it is illustrated in the figures.

FIGS. 35-A and 35-B illustrate another possible approach to dealing with replica failures, which we call cold-standby replication. If cold-standby replication is used, the backup replicas do not necessarily (although in some embodiments they may) include the execution modules' program instructions. If the active replica fails, a new active replica is created and its state is re-constructed from one of the backup replicas as it is depicted FIG. 35-A by the "copy state" arrow. If one of the backup replicas fails, a replacement replica is created, as it is depicted in FIG. 35-B.

The advantages of hot-standby replication include very fast recovery from a failure. This is because when an active replica fails, the service provided by the execution module could be restored immediately by enabling one of the associated backup replicas (that's why the term "hot standby" is used). On the other hand, with cold-standby replication, when the active replica fails, the state of a newly created active replica is created from the state included in a backup replica. This usually requires network communication and results in a short period of time in which the execution module does not provide service. The main disadvantage of hot-standby replication, when compared to cold-standby replication, is in decreased flexibility in load-balancing the system after a failure.

The advantages of cold-standby replication include: not requiring the program instructions to be included on the node that include only backup replicas; enabling the possibility to use a different (for example more compact) representation of the state in the backup replicas from the representation used in the active replicas; permitting a more flexible selection of the node on which a replacement active replica will be created after a failure of a node with the active replica; and potentially using a smaller number of nodes to include the backup replicas than the number of nodes that hold the active replicas (because in many embodiments, the backup replicas have smaller CPU capacity than the active replicas). The main disadvantage, when compared to hot-standby replication, is the increased period of unavailability of an execution module after a failure due to the time to create a new active replica from a backup replica. In some embodiments of the invention, the creation of replicas and the assignment of the active and backup roles are managed by an application controller.

Figure 36:
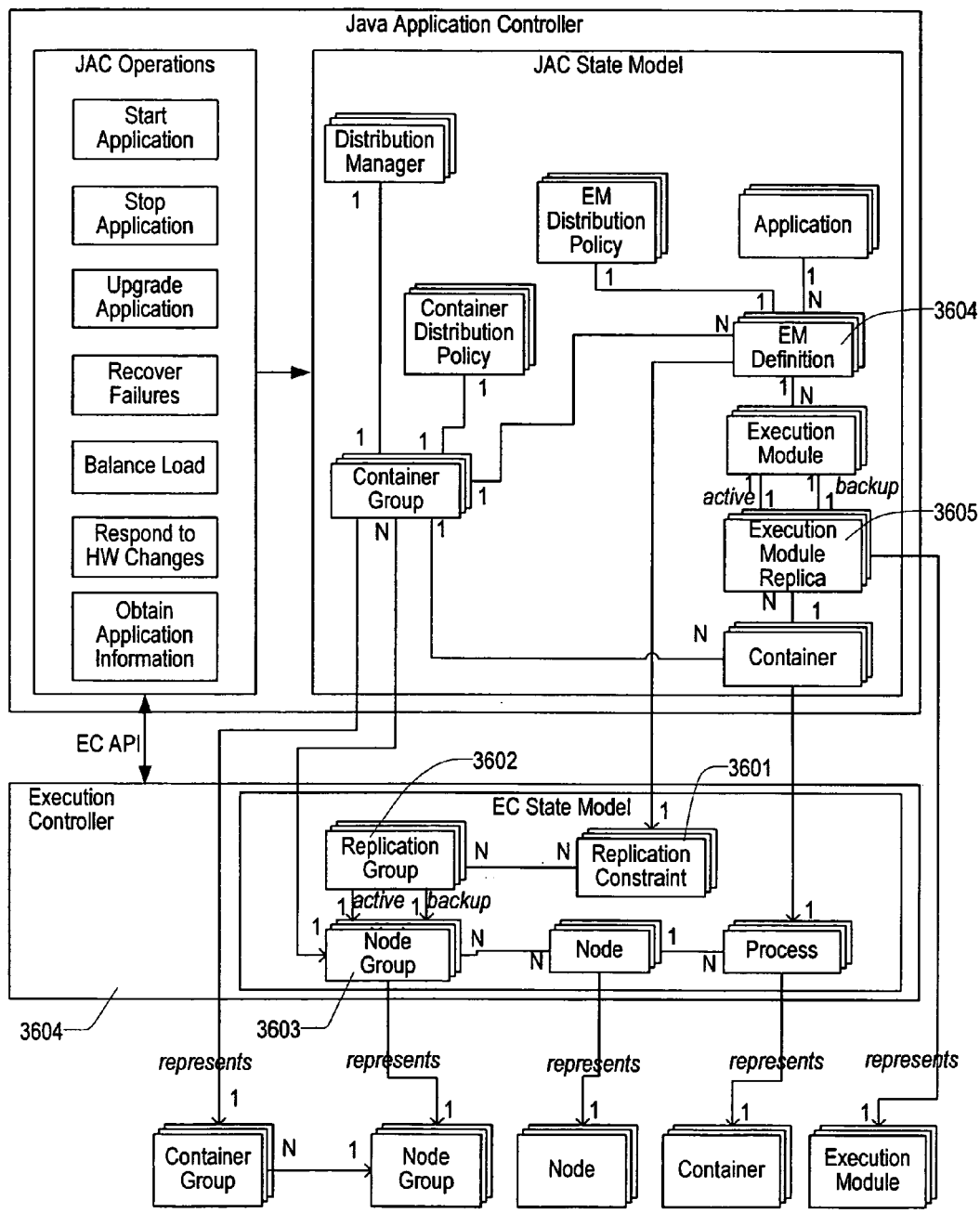
FIG. 36 is a diagram illustrating exemplary Execution Controller and Java Application Controller that that include Replication Constraint, Replication Group, and Execution Module Replica objects in their state models.

FIG. 36 depicts the Java Application Controller (JAC) and Execution Controller (EC), which include support for the management of replicas of execution modules. The EC and JAC depicted in FIG. 36 are similar to those depicted in FIGS. 9 and 24, with the following objects added to the EC state model. First, Replication Constraint objects 3601 that encapsulate the policies that application controllers (such as JAC) should observe when assigning replicas of application execution modules to the nodes of a distributed computer system. Using Replication Constraints objects 3601 maximizes the overall availability of the system when deciding on which nodes to create the replicas while maintaining a simple centralized administration model. A Replication Constraint 3601 is associated with one or more Replication Group objects 3602. Further, Replication Group objects 3602 are used by the Replication Constraints objects 3601 to express the policy for assigning replicas to nodes. A Replication Group object 3601 is associated with one or more Node Group objects 3603.

Although the Replication Constraint objects 3601 and Replication Group objects 3602 depicted in FIG. 36 are included in the Execution Controller (EC) 3604, they do not have to be included in the EC 3604 in other embodiments. One of the advantages of including them in the EC 3604 is that they become available to all application controllers, thereby improving a single system image of administration of the distributed computer system. For example, multiple applications running under the supervision of multiple application controllers can be associated with the same replication constraint, thereby following the same replication rules.

Although the Replication Group objects 3602 depicted in FIG. 36 illustrate a single "backup" association between Replication Group and Node Group, in some embodiments of the invention there might be more than one "backup" association between the Replication Group 3602 and the Node Group 3603.

The Java Application Controller (JAC) depicted in FIG. 36 illustrates how an application controller can take advantage of replication constraints. The JAC depicted in FIG. 36 is similar to the JAC depicted in FIG. 24, with the following differences. JAC associates EM Definition objects 3604 with a Replication Constraint objects 3601 included in EC. Also, JAC includes Execution Module Replica objects 3605 representing the individual replicas of an execution module. In this particular embodiment, an execution module is associated with two replicas. One replica is assigned the active role and the other replica is assigned the backup role. In some embodiments of the invention, there could be more than one backup replica associated with an execution module.

In the embodiment of the invention depicted in FIG. 36, JAC uses the Distribution Manager objects, Replication Constraint policy objects, the Container Distribution Policy objects, and EM Distribution Policy objects when making decisions to which nodes and to which containers to assign execution module replicas. The objective of this flexible, policy-based distribution of replicas is to ensure high-availability of applications while maintaining distribution of the application workload across the nodes of the system. An exemplary method of using these policy object will be given in FIGS. 38-A through 38-O.

Figure 37:
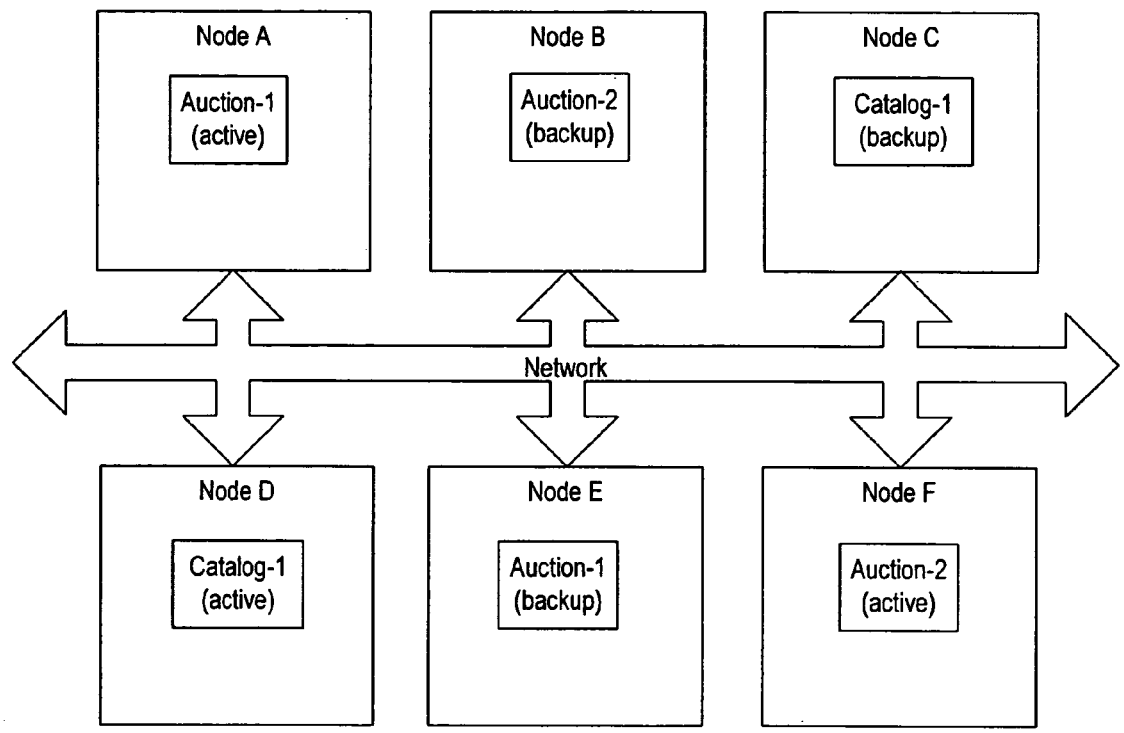
FIG. 37 is a block diagram of a representational distributed computer system that includes execution module replicas distributed according to an exemplary replication constraint object.

Replication constraints and replication groups could be used in systems consistent with the present inventions as follows. FIG. 37 illustrates an exemplary system that includes nodes, node groups, replication groups, and replication constraints. A node group is defined as a named set of nodes. Exemplary node groups in FIG. 37 are NG1=(Node A, Node B, Node C) and NG2=(Node D, node E, Node F).

A replication group is ordered set of node groups. The cardinality of the set (cardinality is the number of node groups in a replication group) is equal to the desired total number of replicas that should be created for an execution module. For example, the replication group RG1=(NG1, NG2) in FIG. 37 has cardinality equal to 2 because it includes two node groups. In some embodiments of the invention, the same node group could appear multiple times in the definition of a replication group, as in the replication group RG2=(NG1, NG1).

The specification of a replication constraint includes replication type, and one or more replication groups. A replication type specifies the type of replication that the execution control system should apply for the management of the replicas. The possible replication types include the Hot-Standby and Cold-Standby replication types. The system depicted in FIG. 37 includes one replication constraint RC=(HotStandby: RG1).

In some embodiments of the invention, the application programmer or system administrator defines the node groups, replication groups, and replication constraints. The distributed computer system then observes the above rules when assigning execution module replicas to the nodes of the distributed computer system. For example, the replication constraint depicted in FIG. 37 constrains the assignment of replicas such that if the first replica of an execution module is assigned to one of the nodes A, B, or C, then the second replica of the same execution module is assigned to one of the nodes D, E, or F. The replication constraint further specifies that there should be two replicas of the execution module and that the replication type is Hot-Standby. For example, since one replica of the execution module Auction-1 is on node A, the second replica can be only on one of the nodes D, E, or F (in the example, it is on Node E).

One embodiment of an execution control system consistent with the invention uses the replication groups and constraints to control the assignment of replicas to the nodes of a distributed system as follows. If:
(i) an execution module is associated with an EM Definition;
(ii) the EM Definition is associated with a replication constraint RC;
(iii) R1, R2, . . . , Rn are the replicas of the execution module; and
(iv) N1, N2, . . . , Nn are the nodes that respectively include the replicas, then
(i) RC includes a replication group RG={NG1, . . . , NGn} such that NG1 includes R1, NG2 includes R2, . . . , NGn includes Rn; and
(ii) N1, N2, . . . , Nn are mutually different nodes.

In some embodiments of the invention, including some of those that use the Cold-Standby replication type, the first replica (i.e. R1) is always the active replica. In other embodiments of the invention, including some of those that use the Hot-Standby replication type, the active replica could be any of the R1 through Rn replicas.

In some embodiments of the invention, the last requirement (the one stating that nodes N1 though Nn are mutually different nodes) might be relaxed and allow replicas to be located on the same node. Using the same node for more than one replica might be useful, for example, in testing environments, or in systems in which the nodes are very reliable.

The above generic description covers replication of any cardinality. Many embodiments of the invention use two replicas: one active and one backup replica (i.e. cardinality is equal to two). For these embodiments, the above rules for controlling replica assignment to nodes could be re-phrased in a simpler way as follows. If:
(i) If an execution module is associated with an EM Definition;
(ii) the EM Definition is associated with a replication constraint RC;
(iii) R1 and R2 are two replicas of the execution module; and
(iv) N1 is the node including R1 and N2 is the node including R2, then
(i) RC includes a replication group RG={NG1, NG2}, such that NG1 includes N1 and NG2 includes N2;
(ii) N1 and N2 are different nodes; and
(iii) if the replication type is Cold Standby, then R1 is the active replica.

We illustrate how the aforementioned rules are interpreted by using the exemplary system depicted in FIG. 37. The system includes six nodes. Two node groups, NG1 and NG2, are defined with three nodes included in each node group. A replication group RG1 is defined that includes the two node groups. A replication constraint RC is specified such that it includes the Hot-Standby replication type and the replication group RG1. A purpose of the replication constraint is to specify that if one replica of an execution module is assigned to a node that is included in the first node group, then the other replica of the same execution module should be assigned to a node included in the second node group. In other words, the replication constraint ensures that two replicas of the same execution module are not assigned to the nodes in the same node group.

The execution control system can assign the replica Auction-1 (active) to node A and replica Auction-1 (backup) to Node E because according to the aforementioned rules, if:
(i) Execution module Auction-1 is associated with Auction EM Definition;
(ii) Auction EM Definition is associated with replication constraint RC;
(iii) Auction-1 (active) is the active and Auction-1 (backup) is the backup replica of execution module Auction-1; and
(iv) Node A includes the Auction-1 (active) replica and Node E includes the Auction-1 (backup) replica, then
(i) RC includes a replication groups RG1={NG1, NG2} such that Node A is included in NG1 and Node B is included in NG2; and
(ii) Node A is different from Node E.

In contrast, in this embodiment replica Auction-1 (active) would not be assigned to node A and replica Auction-1 (backup) to node C, because there is no replication group that would satisfy the aforementioned rules.

A Method For Creating And Distributing Replicas

FIGS. 38-A through 38-O illustrate, using flow charts, the steps of a method that an exemplary embodiment of the invention uses to assign replicas to the nodes and containers. The steps should be considered as illustrative and other embodiments of the invention may use different steps.

The objects used in the description of the flow charts correspond to the objects depicted in FIG. 36. In this particular embodiment of the invention, the "distribute" method (by the term method we mean here, for example, a method of the Java programming language) of the Distribution Manager object associated with a container group is the entry point of the algorithm for creating containers and execution modules; and for assignment of execution module replicas to containers. The implementation of the method uses the Container Distribution policy objects associated with the container group, the EM Distribution policy objects associated with the EM Definition objects assigned to the container group, and the Replication Constraint objects associated with the EM Definitions objects.

The flow chart in FIG. 38-A illustrates, at a high level, steps of the "distribute" method of the Distribution Manager object. These steps include, if necessary, new containers are created on the nodes. Refer to the "distributeContainers" method in FIG. 38-B. The steps also include, if necessary creating new execution modules. Refer to "createExecutionModules" method in FIG. 38-E. Last, if necessary, new replicas of the execution modules are created and assigned to the nodes and container. Refer to the "distributeEMReplicas" method in FIG. 38-H.

FIG. 38-B depicts an exemplary implementation of the "distributeContainers" method. The exemplary implementation includes determining the set of currently "alive" nodes (a node is considered alive if it has not failed) included in the node group associated with the container group. If the "alive" set includes no nodes, then terminate the algorithm. Otherwise, if necessary create new containers according to the Container Distribution Policy object that is associated with the container group. For example, if the Container Distribution Policy object is of type NodeDistribution(N), invoke the "distributeContainersPerNode" method depicted in FIG. 38-C. Container Distribution Policy object is of type GroupDistribution(N), invoke the "distributeContainersPerGroup" method depicted in FIG. 38-D.

FIG. 38-C depicts an exemplary implementation of the "distributeContainersPerNode" method. The exemplary implementation includes obtaining the set of "alive" nodes included in the node group associated with the container group. For each node in the "alive" set perform the following steps two steps. First, determining the number of containers belonging to this container group that are currently on the node. Second, if the current number of containers is smaller than the number N indicated in the NodeDistribution (N) policy object, create additional containers such that the total number equals N.

FIG. 38-D depicts an exemplary implementation of the "distributeContainersPerGroup" method. The exemplary implementation includes obtaining the current total number of containers associated with the container group. If the current number of containers is smaller than the number N indicated in the GroupDistribution(N) policy object, create additional containers such that the total number equals N. In some embodiments of the invention, the Distribution Manager object attempts to distribute the containers equally across the nodes of the node group associated with the container group.

FIG. 38-E depicts an exemplary implementation of the "createExecutionModules" method. This method effectively accomplishes the logical partitioning of an application into execution modules. The exemplary implementation includes for each EM Definition object associated with the container group, performing the following two steps. First, obtaining the EM Distribution policy object associated with the EM Definition. The EM Distribution policy object indicates how many execution modules of this EM Definition should exist. Second, if it is necessary according to the EM Distribution policy object, to create new execution modules, then create them. For example, if the EM Distribution policy object is of type EmContainerDistribution(N), invoke the "distributeEMsPerContainer" method depicted in FIG. 38-F, or if the EM Distribution policy object is of type EMGroupDistribution(N), invoke the "distributeEMsPerGroup" method depicted in FIG. 38-G.

FIG. 38-F depicts an exemplary implementation of the "distributeEMsPerContainer" method. The exemplary implementation includes determining the current number of containers associated with the container group. If the current number of containers is zero, end the method. On the other hand, if the number of containers is non-zero, perform the following steps for each container. Obtain the current number of execution modules of this EM Definition that are included in the container and compare them to the number N indicated in the EmContainerDistribution(N) policy object. If the current number is smaller than N, create new Execution Module objects so that the total number equals N. The creation of an execution module is done by creating an Execution Module object in the JAC state model. The actual execution module's replicas will be created and assigned to containers in later steps (See FIG. 38-H).

FIG. 38-G depicts an exemplary implementation of the "distributeEMsPerGroup" method. The exemplary implementation includes determining the current number of execution modules of this EM Definition, and then comparing the current number of execution modules with the number N indicated in the EMGroupDistribution(N) policy object. If the current number is smaller than N, create new execution modules so that the total number equals N. The creation of an execution module is done by creating an Execution Module object in the JAC state model. The actual execution module's replicas will be created and assigned to containers in later steps (See FIG. 38-H).

FIG. 38-H depicts an exemplary implementation of the "distributeEMReplicas" method. The distribution manager invokes this method after the Execution Module state model objects have been created according to the EM Distribution policy objects. The objective of the "distributeEMReplicas" method is to create and distribute the replicas of the execution modules according to the Replication Constraint objects. The exemplary implementation includes, for each EM Definition associated with the container group, the following steps: obtaining the associated Replication Constraint object and examining the replication type and invoking the corresponding method. For example, if the replication type is HotStandby, invoke the "hotStandbyDistributeEMReplicas" method depicted in FIG. 38-I.

FIG. 38-I depicts an exemplary implementation of the "hotStandbyReplicationDistributeEMReplicas" method. The objective of the method is to create and distribute the replicas of execution modules associated with an EM Definition according to a Replication Constraint. The exemplary implementation includes the following steps. First, a set of nodes eligible for including active replicas (referred to as "active-eligible" set) is determined. In one embodiment of the invention, the active-eligible set is calculated as the union of the all nodes that are included in all the node groups included in the Replication Constraint associated with the EM Definition, discarding the nodes that are not currently "alive". Second, the "hotStandbyReplicationDistributeActiveReplicas" method depicted in 38-J is invoked. Third, the "hotStandbyReplicationDistributeBackupReplicas" method depicted in 38-M is invoked.

FIG. 38-J depicts an exemplary implementation of the "hotStandbyReplicationDistributeActiveReplicas" method. The objective of the method is to create and distribute the active replicas of execution modules associated with an EM Definition according to a Replication Constraint. The exemplary implementation includes for each Execution Module object associated with the EM Definition, performing the following steps. Testing if an active replica exists. If an active replica exists, going to the next Execution Module object. If an active replica does not exist, picking a node from the "active-eligible" set and picking a container on the node. Exemplary implementations of the pick node and pick container methods are illustrated in FIGS. 38-K and 38-L respectively. Creating the Execution Module Replica object in the state model and actual execution module replica in the picked container. In some embodiments of the invention, this step involves communication between the JAC and the container controller, as it is illustrated in the steps in the lower half of the flow chart in FIG. 25.

FIG. 38-K depicts an exemplary implementation of the "hotStandbyReplicationPickNodeForActive" method. The objective of the method is to equally distribute the active execution module replicas associated with an EM Definition while observing a Replication Constraint. The exemplary implementation includes for each node in the "active-eligible" set, the number of active replicas that are associated with the EM Definition object and included on that node is calculated. Then, the node with the lowest number of active replicas is picked. If several nodes include the lowest number of active replicas, one of them is picked randomly.

FIG. 38-L depicts an exemplary implementation of the "hotStandbyReplicationPickContainerForActive" method. The objective of the method is to equally distribute the active execution module replicas across multiple containers on a node. The exemplary implementation includes, for each container in the associated container group that is included on the picked node, determining the number of active execution modules included in the container. Then picking the container with the smallest number of active execution modules. If several containers include the lowest number of active execution modules, pick one of them randomly.

In some embodiments of the invention, factors other than (or in addition to) the number of active execution modules are taken into consideration when picking the node and container for the active replicas. These factors might include any or all of the following: the CPU capacity of a node, the current load of the node, the amount of available memory on the node, service-level agreement for the application, security requirements, etc.

FIG. 38-M depicts an exemplary implementation of the "hotStandbyReplicationDistributeBackupReplicas" method. The objective of the method is to create and distribute the backup replicas of execution modules associated with an EM Definition according to a Replication Constraint. The implementation includes, for each Execution Module object associated with the EM Definition, performing the following steps. Testing if a backup replica exists. If a backup replica exists, ending the method. If a backup replica does not exist, picking a node from the "active-eligible" set and picking a container on the node. Exemplary implementations of the pick node and pick container methods are illustrated in FIGS. 38-N and 38-O respectively. Creating the Execution Module Replica object in the state model and the actual execution module replica in the picked container. In some embodiments of the invention, this step involves communication between the JAC and the container controller, as it is illustrated in the steps in the lower half of the flow chart in FIG. 25.

In some embodiments of the invention that associate more than one backup replica with each active replica, the above steps are repeated as many times as the desired number of backup replicas.

FIG. 38-N depicts an exemplary implementation of the "hotStandbyReplicationPickNodeForBackup" method. The objective of the method is to equally distribute the backup execution module replicas associated with an EM Definition while observing a Replication Constraint. In this embodiment of the invention, one of the objectives of the distribution is to ensure that if any node that includes active replicas fails and backup replicas will be promoted to the "active" role, the distribution of the active replicas over the remaining nodes after the failure will be as even as possible. The exemplary implementation includes, for each node in the "active-eligible" set, determining the number of backup replicas that are associated with an active replica included on the node that includes the active replica of the execution module for which we try to create and distributed a backup replica. The node with the lowest number of backup replicas determined in the previous step is picked. If several nodes include the lowest number of backup replicas, one of them is picked randomly.

FIG. 38-O depicts an exemplary implementation of the "hotStandbyReplicationPickContainerForBackup" method. The objective of the method is to equally distribute the backup execution module replicas across multiple containers on a node. The exemplary implementation includes for each container in the associated container group that is included on the picked node, determining the number of backup execution modules included in the container. Then, the next step is picking the container with the smallest number of backup execution modules. If several containers include the lowest number of backup execution modules, picking one of them randomly.

In some embodiments of the invention, factors other than (or in addition to) the number of active and backup execution modules could be taken into consideration when picking the node and container for the backup replicas. These factors might include any or all of the following: the CPU capacity of a node, the current load of the node, the amount of available memory on the node, service-level agreement for the application, security requirements, etc.

The advantages of the above-described method for creating and distributing replicas include the fact that the distribution manager object could be designed and implemented as stateless. JAC can simply invoke the "distribute" method at application start and then later at any time that the distribution of replicas are to be changed in response to some external events, such as a failure or system overload. The simplicity of coding the "distribute" method is important because some applications may provide a custom distribution manager object that includes an implementation of the "distribute" method. Furthermore, the "statelessness" of the distribution manager's distribute method allow JAC to call it repeatedly in the case that one execution of the distribute method has been interrupted by another external event (for example, JAC can invoke the distribute method a second time in response to a second failure that occurred while handling the first failure).

A Method For Starting An Application

In some embodiments of the invention, an execution control system invokes the Distribution Manager's "distribute" method to perform the initial distribution of containers and execution module replicas at the application's startup time. One of the advantages of the present invention is that the "distribute" method can distribute the containers and replicas in a manner that best fits the application's availability requirements. This is possible because the distribute method could be application-specific (as it was described earlier in this disclosure, the distribution manager object that includes the distribute method could be included with the application or be a system-provided default distribution manager).

The flow chart in FIG. 39-A is a modification of the flow chart in FIG. 25 to take into account multiple replicas of execution modules. The exemplary method for starting a Java application includes the following steps. The application is started by a system-management tool's sending the "Start Application" request to JAC. In response to the request, JAC creates the Application, EM Definitions, Container Group, Distribution Manager, and EM Distribution policy objects in the JAC state model. In some embodiments of the invention, the "Start Application" request may include also the definition of the Replication Constraints and Replication Group objects; in other embodiments, these objects are system-wide and are created when the system starts up. After JAC has created the objects in its state model, it invokes the "distribute" method on the Distribution Manager objects associated with all the EM Definitions objects associated with the Application object. The "distribute" method creates containers and execution module replicas according to the flow chart in FIGS. 38-A through 38-O.

A Method For Increasing An Application's Processing Capacity

Advantages of the present invention include allowing the execution control system to dynamically grow and shrink the number of containers and execution modules and their distribution across the nodes in response to changing application workload.

The flow chart in FIG. 39-B includes steps of the algorithm used to increase an application's capacity by creating new containers and execution module replicas on an unused node. The algorithm includes the following steps. The execution control system determines that the application could use more resources to be able to service its clients. This could be determined, for example, by measuring the CPU utilization on the nodes that include the application's execution module replicas. JAC is informed of the condition. JAC marks the Container Group objects in its state model to indicate to the Distribution Manager objects that the container group could use more resources. JAC invokes the "distribute" method of the Distribution Manager objects associated with the marked EM Definitions. The Distribution Managers perform the steps in the flow charts in FIGS. 38-A through 38-O. When the Distribution Manager checks the container policy distribution (See FIG. 38-B), it discovers that the Container Group is associated with the LoadBasedDistribution(NodeLoad) policy object and that the Container Group object is marked as requiring more resources. It will check for an unused (or least loaded) node in the container group and it will create a new container on that node. The steps of the flow charts in FIGS. 38-E through 38-O will take advantage of the newly created container and will distribute some replicas of the execution modules to the container.

Methods For Recovering From Failures

In some embodiments of the invention, an execution control system invokes the Distribution Manager's "distribute" method to create replacement containers and execution module replicas in response to failures. One of the advantages of the present invention is that the "distribute" method can distribute the replacement containers and replicas in a manner that best fits the application's availability requirements. This is possible because the distribute method could be application-specific (as it was described earlier in this disclosure, the distribution manager object that includes the distribute method could be included with the application or be a system-provided default distribution manager).

The flow charts depicted in FIGS. 40-A, 40-B, and 40-C include exemplary algorithms for recovering an application from a failure of execution module replica, container process, and node, respectively.

The flow chart depicted in FIG. 40-A includes the steps of recovering an application from a failure of an execution module replica. The embodiment includes the following steps. An execution module replica fails. It could fail, for example, because of a software bug in the execution module's code. The container detects the failed replica. The container might detect the failed replica, for example by all or any of the following techniques: by monitoring the threads used by the replica; by monitoring software failures (for example uncaught programming language exceptions); by monitoring the amount of the memory used by the execution module; by monitor memory or object "leaks"; etc. The container sends "EM failed" message to JAC. JAC marks the replica as "failed" in the state model. In some embodiments, JAC removes the state object representing the failed replica. JAC checks if the failed execution module replica was in the "active" role. If it was, JAC attempts to promote one of the associated "backup" replicas to the "active" role by the following steps:

A test is made of whether a backup replica exists. In some embodiments of the invention, the status of the backup replica is checked to ensure that it is in the ready state (a replica is "ready" if its state has been synchronized with the state of the active replica);

if a backup replica does not exist (or the replica exists but it is not in the ready state), in some embodiments of the invention the entire application is marked as "failed". This is because the state of the execution module has been lost. In other embodiments of the invention, the state of the execution module could be recovered from some other external information, such as from information in a database or other systems; and if a backup replica exists, it is promoted to the "active" role.

In some embodiments of the invention, JAC reports the failure and recovery to a system-management tool. JAC invokes the "distribute" method on the Distribution Manager objects associated with the EM Definition of the failed execution module replica. The "distribute" method creates a replacement execution module replica according to the flow chart in FIGS. 38-A through 38-O.

The flow chart depicted in FIG. 40-B includes the steps of recovering an application from a failure of a container process (container). The embodiment includes the following steps. A container fails. The container could fail, for example, because of a software bug in the code implementing the container or in the code of a software library included in the container. The node controller (NC) included in the node that included the container detects the failure of the container. NC sends the "Process Failed" message to the Execution Controller (EC). EC marks the corresponding Process object as "failed" in its the state model. In some embodiments, EC removes the Process object from the state model. EC sends the "Process Failed" message to JAC. This is because JAC registered earlier with EC to receive events related to the container process. JAC marks the Container object as "failed" in its state model. JAC also marks as "failed" all the Execution Module replica objects associated with the Container object. In some embodiments of the invention, JAC removes the failed Container and Execution Module Replica objects from the state model. In some embodiments of the invention, JAC sends a failure notification to the system-management tool. If some of the failed execution module replicas were in the "active" role, JAC promotes their associated "backup" replicas to the "active" role. JAC uses the same EM promotion steps as it was described in FIG. 40-A. According to the description of FIG. 40-A, if no ready backup replica exists, the application is marked as "failed". In some embodiments of the invention, a failed application could be recovered from some external state. JAC invokes the "distribute" method on the Distribution Manager objects associated with the Container Group object associated with the failed container. The "distribute" method executes according to the steps of the flow chart in FIGS. 38-A through 38-O. It may create, if the Container Distribution policy object indicates so, a replacement container. It also creates replacement execution module replicas and distributes them according to the associated Replication Constraint object.

The flow chart depicted in FIG. 40-C includes the steps of recovering an application from a failure of a node that includes containers and execution module replicas. The embodiment includes the following steps. A node fails. The node could fail, for example, because of a CPU or memory failure, because of power failure, or because of a software bug in the operating system included in the node. The node controllers (NC) on the remaining nodes detect the node failure by missing heart-beat messages from the failed node. One of the NCs sends the "Node Failed" message to the Execution Controller (EC). EC marks the corresponding Node object as "failed" in its the state model. It also marks as "failed" the Process objects that were associated with the failed node. In some embodiments, EC removes the Node and Process object from the state model. EC sends the "Node Failed" message to JAC. This is because JAC registered earlier with EC to receive events related to the nodes. JAC marks the Container and Execution Module Replica objects associated with the failed node as "failed" in the JAC state model. In some embodiments of the invention, JAC removes the failed Container and Execution Module Replica objects from the state model. In some embodiments of the invention, JAC sends a failure notification to the system-management tool (this step is not illustrated in FIG. 40-C). If some of the failed execution module replicas were in the "active" role, JAC promotes some of their associated "backup" replicas to the "active" role. JAC uses the same EM promotion steps is described in FIG. 40-A. According to the description of FIG. 40-A, if no ready backup replica exists, the application is marked as "failed" and could be, in some embodiments of the invention, recovered from external state. JAC invokes the "distribute" method on the Distribution Manager objects associated with the Container Group objects affected by the failure. A Container Group object has been affected if any of its containers has been included on the failed node. The "distribute" method executes according to the steps of the flow chart in FIGS. 38-A through 38-O. It may create, if the Container Distribution policy object indicates so, replacement containers for those that were included on the failed node. It also creates replacement execution module replicas (for those that were included on the failed node) and distributes them across nodes and containers according to the associated Replication Constraint object.

Other sections describe several example embodiments of the invention to illustrate some of the advantages of using Replication Constraints for managing how applications' execution module are replicated across nodes of a distributed computer system.

Configuring A System With Many Nodes To Improve Availability

One of the advantages (over the methods of prior art) of using replication constraints for achieving high availability is in their ability to provide better protection of an application from multiple simultaneous node failures at a low system cost.

In the following description, the term mean time between failures (MTBF) is defined as the mean time between failures of a single component in the system (for example, the mean time between two subsequent failures of the same node).

The probability that a component of a system will fail at any given time grows proportionally with the number of components. For example, if the MTBF of a node is 1 year (i.e. a node fails about once a year) and the system includes 100 nodes, it could be expected that the system will experience about 100 node failures each year.

A method of replication described in this disclosure protects an application not only from the failure of any single node, but also from many scenarios that include the failures of multiple nodes. If the execution module replicas that were on a failed node are replaced quickly enough so that replacement replicas exist before another node fails, the system remains available despite multiple node failures.

However, when a system includes a large number of nodes, there might be a non-trivial probability that after one node has failed, a second node will fail before replacement replicas have been created. If the first and second failed node both include the replicas of the same execution module, such a scenario would result in an unrecoverable failure. The mean time to unrecoverable failure in a system with N nodes that uses replication with cardinality equal to 2 is approximately (the result of the approximate is very close to actual number if SYNCT is much smaller than MTBF) equal to:

$$Total\_MTBF = MTBF*MTBF/(SYNCT*N*(N-1)*RFCF),$$

where SYNCT is the mean time that it takes to create and synchronize replacement replicas for failed replicas and RFCF is a factor indicating the probability that the first and second failed nodes both include replicas of the same execution module, thereby leading to an unrecoverable failure. The approximate formula also assumes that a failed node will be repaired quickly (on the order of hours or days). As an example, if MTBF=1 year, SYNCT=25 minutes, RFCF=1, and N=100, the Total_MTBF would be about 2 years. In other words, the system would experience an unrecoverable failure approximately every 2 years despite the replication mechanism.

Some prior art systems improve the availability of the system by using twice as many nodes as would be required if failures weren't considered and configuring the replicas such that Node(N/2+i) includes the backup replicas for active replicas located on Node(i). While this configuration provides good availability, it requires twice as many hardware resources (it is called 2N availability (or 2N redundancy)). In the above formula, RFCF is equal to 1/N.

Other prior art systems reduce the system capacity requirements by distributing the backup replicas of the active execution modules located on a given node across all other nodes (the configuration is called N+1 availability (or N+1 redundancy) because it requires only the extra capacity of a single node to protect N nodes). The main problem with this configuration is that RFCF is equal to 1, and therefore the Total_MTBF might be too low for systems with many nodes.

One of the advantages of the replication constraints and replication groups of the present invention is that they allow configuring the system such that it is possible to choose the desired tradeoff between the system cost (measured by the number of nodes) and achieved availability (measured by Total_MTBF).

By using replication constraints it is possible to limit the number of nodes that include the backup replicas associated with the active replicas included on any given node. The reduction of nodes including the backup replicas for any given node reduces the risk of exposure to double node failure.

Figure 41:
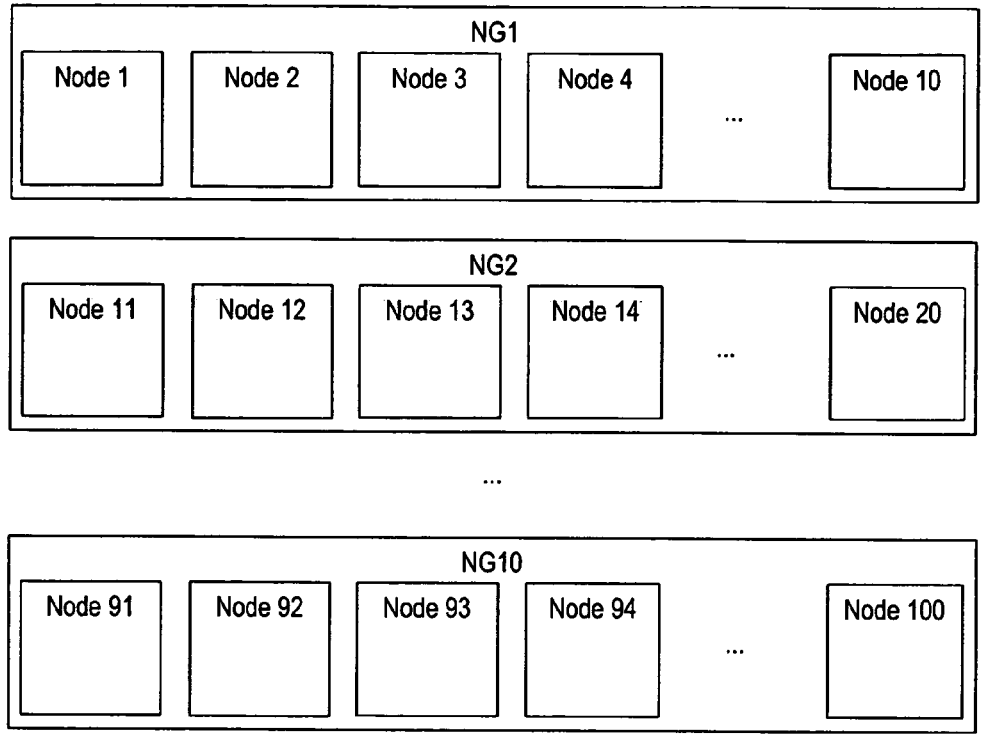
FIG. 41 is a block diagram of a system using illustrates the use of a replication constraint to protect a distributed computer systems with many nodes from a dual node failure.

The system depicted in FIG. 41 includes 100 nodes. The node groups, replication groups, and replication constraint illustrated in the figure effectively divide the nodes into 10 regions. If an active replica is included in a node in a region, then the backup replica is included in another node in the same region. The computer system configuration achieves both low cost and high availability. Low cost is achieved by requiring only 11% more nodes (100 instead of 90) to protect the system from node failures. Total_MTBF for the computer system is 20 years, assuming MTBF=1 year and SYNCT=25 minutes. The configuration results in RFCF being equal to 10%.

Configuring a System for Applications with Different Availability Requirements

Advantages of using replication constraints include the capabilities to configure a system for applications with different. availability requirements. Some applications can achieve higher performance while running with lower protection from failures, whereas other applications running on the same system can achieve higher protection from failures at the cost of achieving lower performance. In some embodiments, different availability requirements might exist for different execution modules of the same application.

Figure 42:
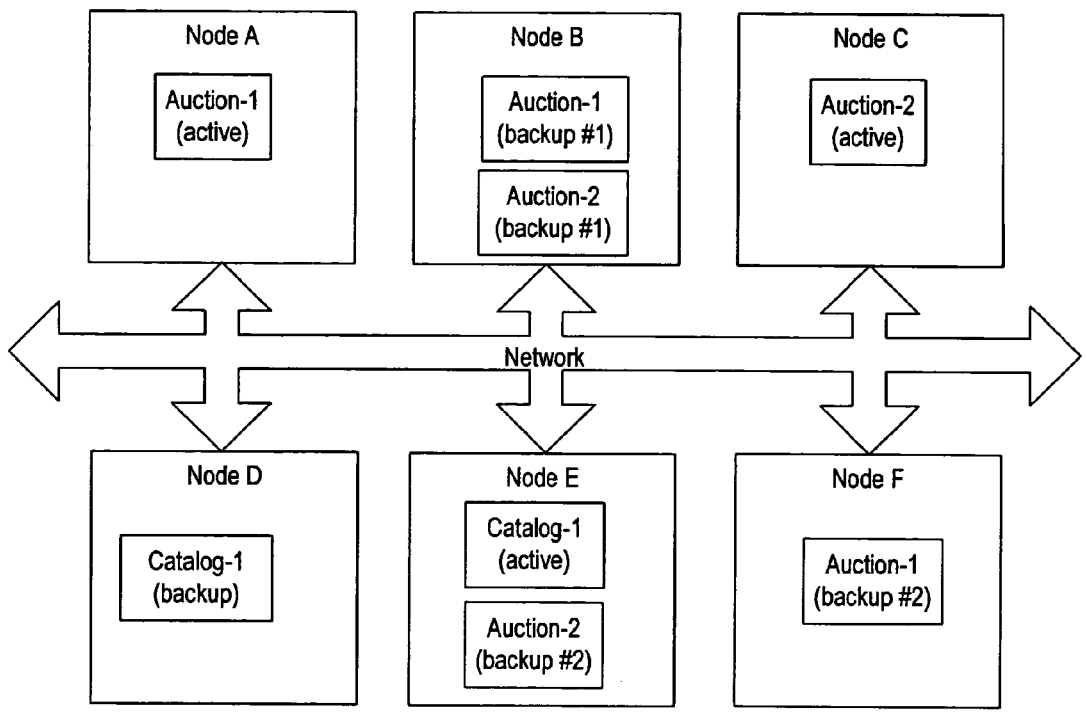
FIG. 42 is a block diagram of a system illustrates how using replication constraints to allow configuring applications with different availability requirements.

FIG. 42 depicts how replication constraints could be used to configure a system for an application that includes execution modules with different requirements on availability and performance.

In the example, the Catalog EM Definition has lower availability requirements and is configured to use one active replica and one backup replica. This is accomplished by associating the Catalog EM Definition with the RC1 replication constraint that includes the RG1 replication group with cardinality equal to two.

In contrast, the Auction EM Definition has higher requirements on availability. Therefore it is configured to use one active replica and two backup replicas. This is accomplished by associating the Auction EM Definition with the RC2 replication constraint that includes the RG2 replication group with cardinality equal to three.

As depicted in FIG. 42, the replication constraints instructs the system to create 3 replicas of each Auction execution module (there are two Auction execution modules in the figure: Auction-1 and Auction-2, each with three replicas) and 2 replicas of each Catalog execution module (there is a single execution module Catalog-1 with two replicas).

The replication requirements for Catalog EM Def could be informally described as "create two replicas of each Auction execution module and assign them to two different nodes". The replication constraint for Auction could be informally described as "create three replicas of each Auction execution module and assign them to three mutually different nodes".

Configuring A System That Includes Nodes With Different Reliability

Advantages of using replication constraints include the capability to control precisely how applications are replicated across the nodes of varying reliability (nodes with different MTBF). This fine-grained control over replication is necessary in some embodiments of the invention to ensure application availability.

Figure 43:
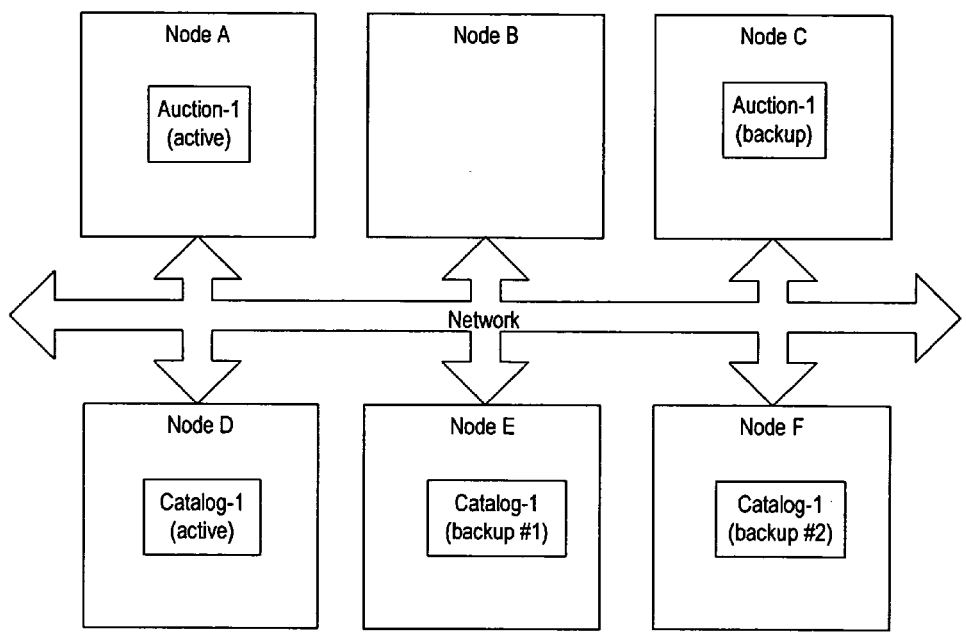
FIG. 43 is a block diagram of a system using replication constraints to configure applications on distributed systems that include nodes with different reliability.

In the exemplary system depicted in FIG. 43, nodes A and B are more reliable than nodes C, D, E, and F. The objective of the replication constraint RC1 associated with the Auction EM Definition is to ensure that one replica of each Auction execution module is assigned to one of the reliable nodes while the other replica is assigned to one of the less reliable nodes. This is accomplished by defining the replication group RG1 that includes the group of reliable nodes and the group of unreliable nodes. RC1 includes RG1.

The objective of the replication constraint RC2 associated with the Catalog EM Definition is to ensure that there are three replicas of each Catalog execution module and that these replicas are assigned to three different nodes in the unreliable node group. This is accomplished by defining the replication group RG2 that includes three times the UnreliableNG node group.

Informally speaking, replication constraint RC1 achieves protection of the Auction execution module replicas by ensuring that at least one replica of each execution module is included on one of the reliable nodes, and RC2 achieves protection of the Catalog execution modules by using three replicas of each execution module.

Configuring A System with A Shared Single Point of Failure

Advantages of using replication constraints include the capability to achieve high availability of applications on distributed computer systems that include a single point of failure whose failure could bring down more than one node in the system. Using an appropriate replication constraint ensures that the replicas of an execution module are not placed on nodes that shared a common single point of failure.

Figure 44:
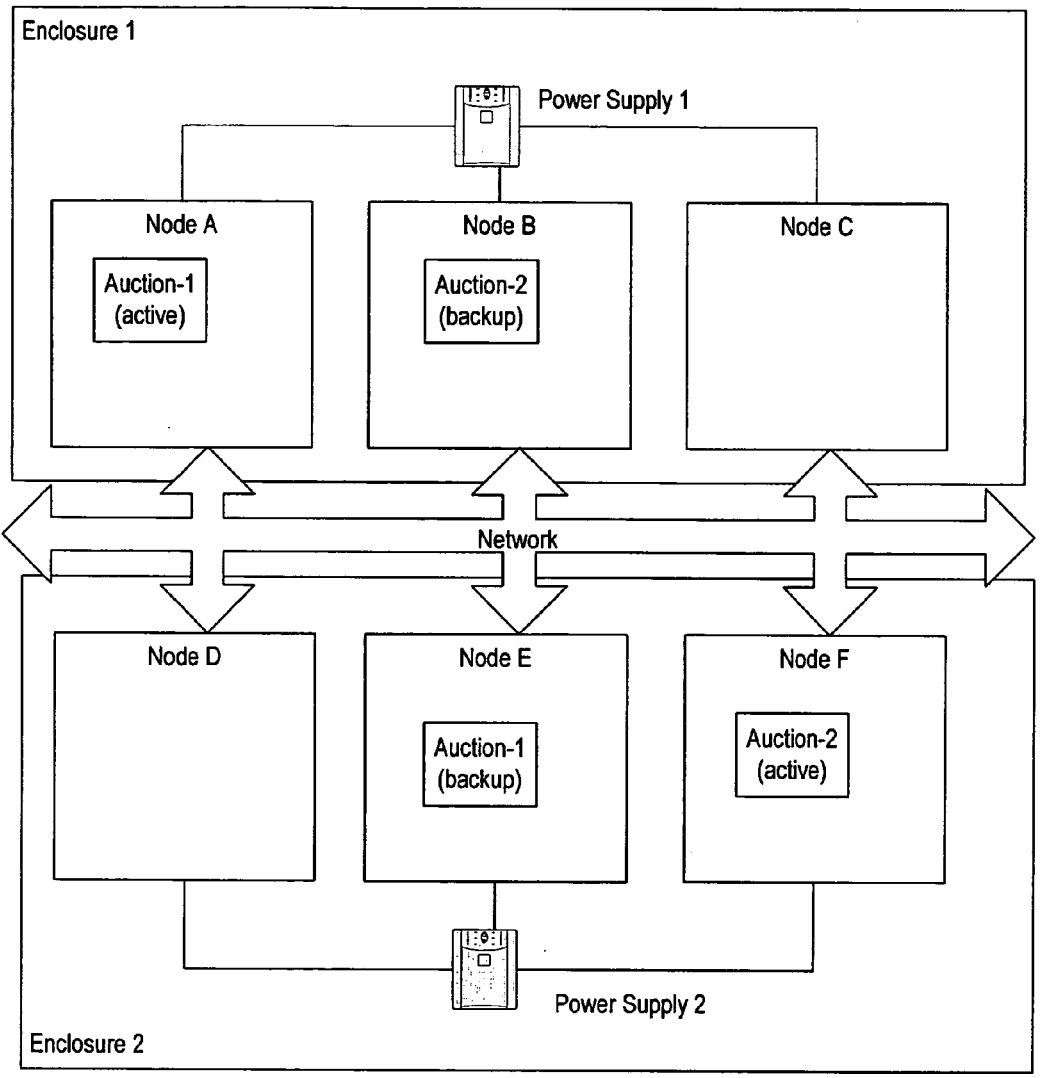
FIG. 44 is a block diagram of a system using replication constraints could be used to protect applications from the failure of a component shared by multiple nodes.

The exemplary distributed computer system depicted in FIG. 44 includes six nodes that are physically grouped into two enclosures. The nodes in the same enclosure share a common power supply. If the power supply fails, all the nodes in the enclosure will fail. Therefore, it is desirable that the replicas of an execution module are assigned to the nodes such that one replica is on a node included in Enclosure 1 while another replica is assigned to a node that is included in Enclosure 2.

The replication constraint and replication group depicted in FIG. 44 achieve this objective. According to the rules for replication constraints, the active replica of Auction-1 execution module is assigned to node A in Enclosure 1 while the backup replica is assigned to node E in Enclosure 2. Similarly, the active replica of execution module Auction-2 is assigned to node F in Enclosure 2 while the backup replica is assigned to node B in Enclosure 1. Both execution modules Auction-1 and Auction-2 are protected from a failure of either power supply.

Configuring A System with Non-uniform Network Connectivity

Advantages of using replication constraints include the capability to assign replicas to nodes of a distributed computer system in which the communication bandwidth or latency between a pair of nodes is different than the bandwidth between another pair of nodes.

In some embodiment of the invention, some execution modules may heavily communicate with each other. Therefore, it is desirable that the execution module replicas are assigned to the nodes in such a way that the execution modules communicating with each other can use the higher bandwidth and/or shorter latency for communication.

Figure 45:
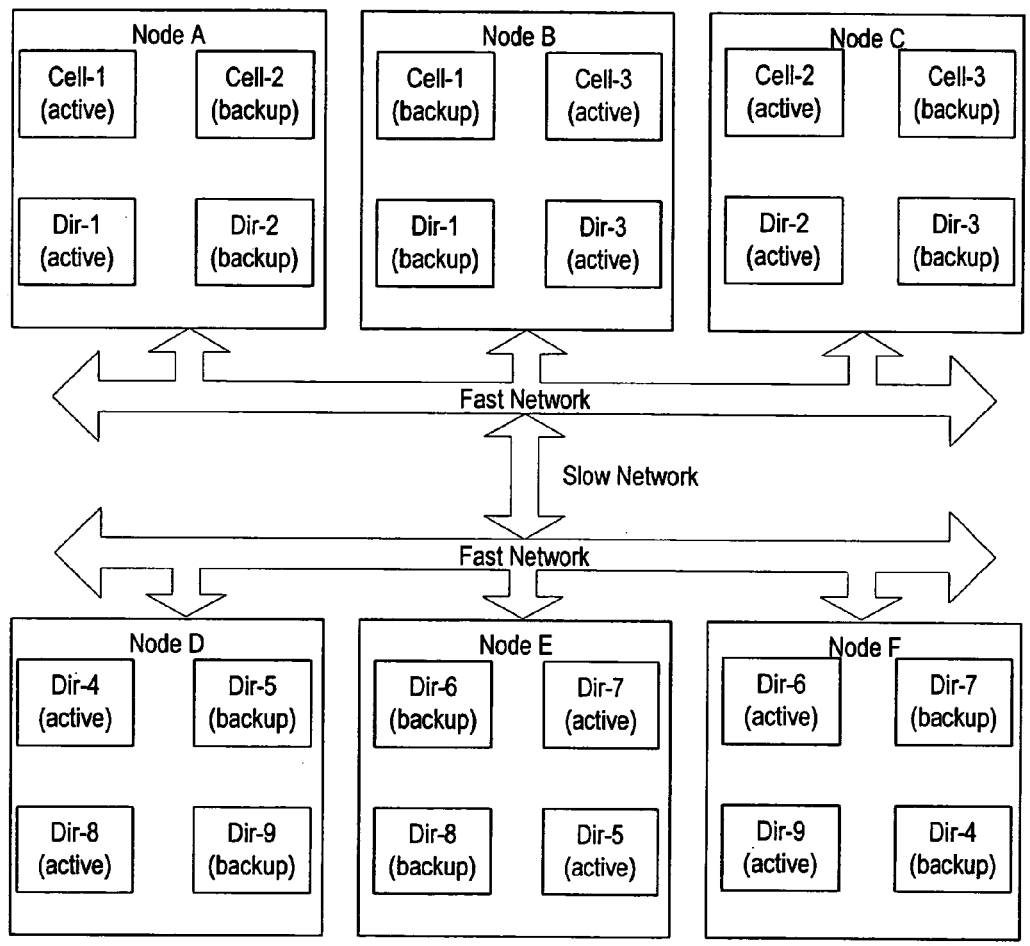
FIG. 45 is a block diagram of a system using replication constraints enable applications to exploit distributed system with non-uniform network connectivity.

The exemplary distributed computer system depicted in FIG. 45 includes six nodes that are physically connected using two fast networks. The fast networks are connected with each other using a slower network connection (e.g. via Wide Area Network). As a result, for example, node A can communicate with high bandwidth with nodes B and C, but only with slow bandwidth with nodes D, E, and F.

The distributed computer system in FIG. 45 also includes the execution modules associated with two EM Definitions: Cell and Dir. The Cell execution module implements the functionality of a cell controller (it is called usually a base station controller) in a mobile network, and the Dir execution module includes directory entries of telephone subscribers. The Cell execution modules communicate heavily with each other and therefore should use the fast network only. The Dir execution modules do not communicate with each other and therefore could be located on any node. However, because the number of checkpoint messages from the Dir active replica to its corresponding backup replica is high, in some embodiments the active and backup replicas of each Dir execution module are connected with a fast network.

The replication constraints and replication groups depicted in FIG. 45 achieve these objectives. They ensure that the Cell execution modules are included only in nodes A, B, and C which are connected with a fast network, while they permit placing the Dir execution modules on any node. The definition of the RC2 replication constraint ensures that the active and backup replica of each Dir execution module can communicate using the fast network.

Configuring a System in Which Some Nodes Lack Resources

Advantages of using replication constraints include the capability to configure applications on distributed computer systems in which only some of the nodes have access to a resource required by some execution modules. Example of such resources might be an external database or specialized hardware board.

Figure 46:
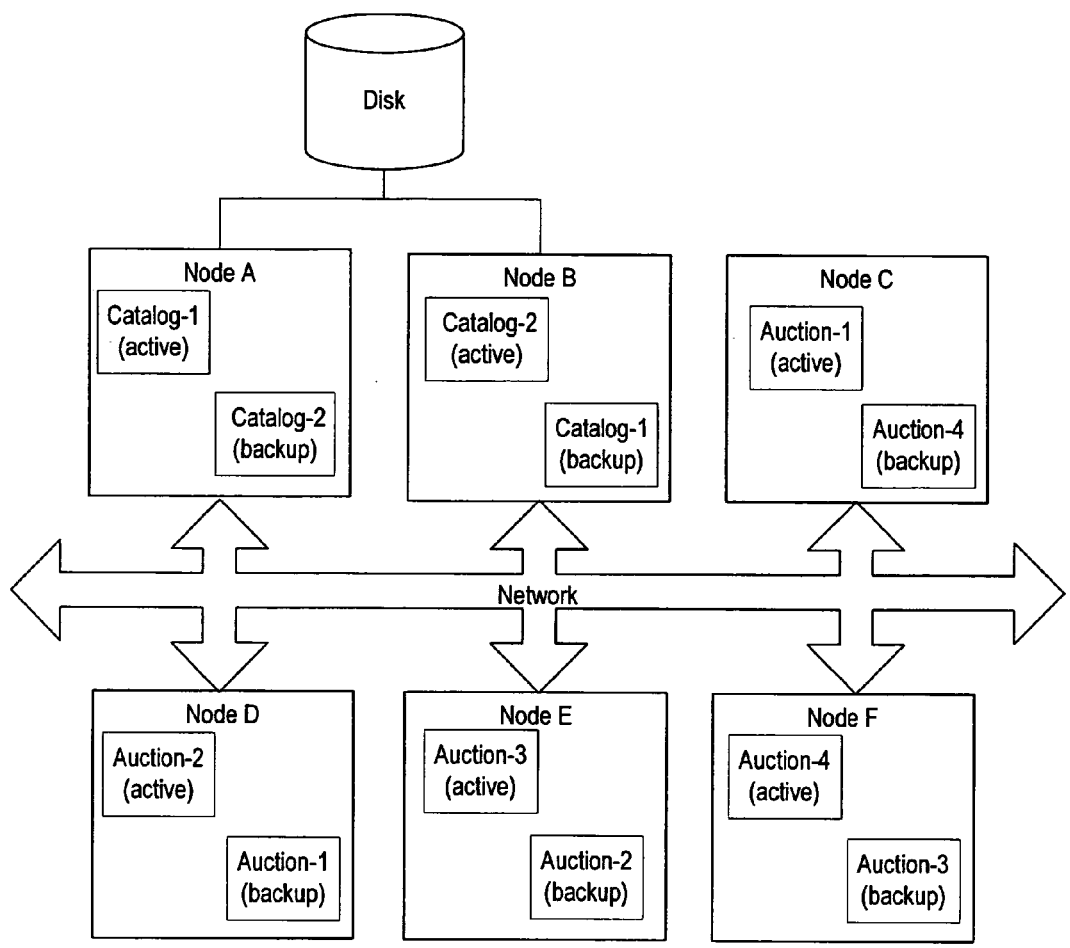
FIG. 46 is a block diagram of a system using replication constraints could be used to ensure that execution modules are included only on the nodes that have a resource used by the execution modules.

The exemplary distributed computer system depicted in FIG. 46 includes six nodes where only nodes A and B have access to a database located on a dual-ported disk. The Catalog execution modules require access to the database on the disk whereas the Auction execution modules do not.

The replication constraints and replication groups depicted in FIG. 46 ensure that the Auction execution modules will be assigned only to nodes A and B, which have access to the disk, while the Auction execution modules will be assigned only to nodes C, D, E, and F, which do not have access to the disk.

Configuring a System to Use Separate Nodes for Active and Backup Execution Modules One of the advantages of using replication constraints is that a distributed computer system can execute applications comprising execution modules such that the active replicas of the execution modules are located on one set of nodes while the backup replicas are located on another (possibly much smaller) subset of nodes. If a node that includes active replicas fails, the system can re-create new active replicas on the remaining nodes of the active subset in a way that optimizes the current workload.

In some embodiments of the invention, the cold standby replication type is used to accomplish this objective. The distributed computer system depicted in FIG. 47 includes six nodes. In this embodiment, the active replicas of the Auction execution modules be assigned to nodes A, B, C, and D, whereas their backup replicas be assigned to nodes E and F.

Figure 47:
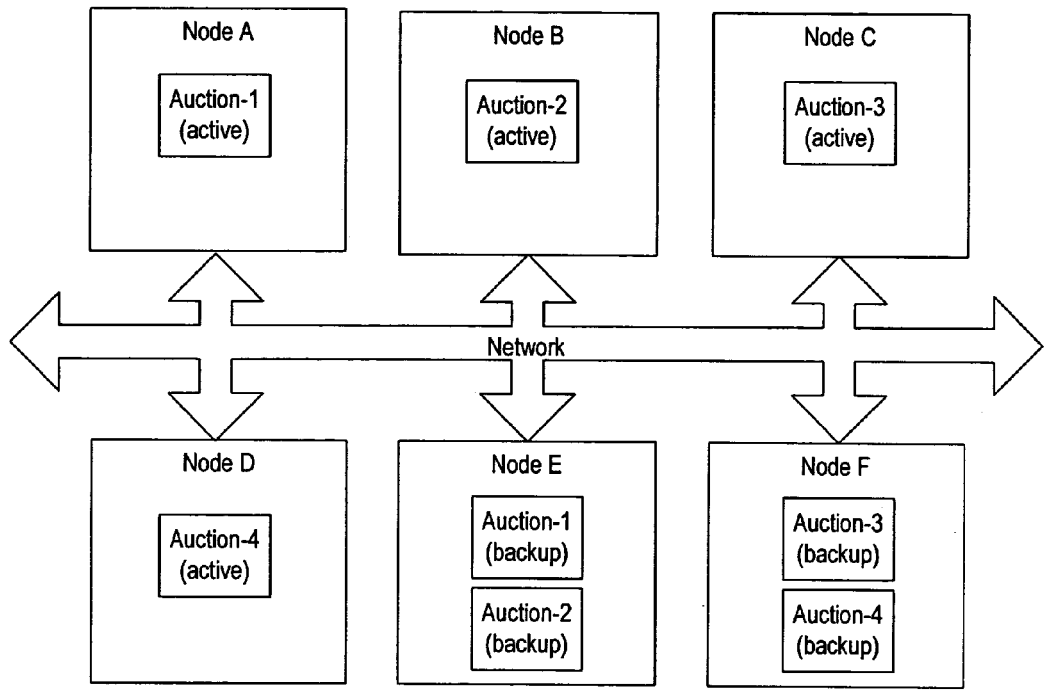
FIG. 47 is a block diagram of a system using cold-standby replication to allow placing backup execution module replicas on different nodes than the active replicas.

The replication constraint and replication group depicted in FIG. 47 achieves this objective. The replication constraint uses the ColdStandby replication type, which ensures that the active replicas are assigned only to node in node group NG1 (which is the first node group included in the definition of replication group RG1).

If one of the nodes that include the active replicas failed, replacement active replicas would be created on another node in node group NG1. For example, if node A failed, the replacement of replica Auction-1 (active) would be created on one of the nodes B, C, or D. The Auction-1 (backup) backup replica could not be promoted to the active role because it is not a node permitted to include active Auction replicas. Instead, the state of the Auction-1 (backup) replica would be used to reconstruct the state of the replacement Auction-1 (active) replica.

Configuring a System with Multiple Replication Types

One of the advantages of using replication constraints is that a distributed computer system can include applications associated with different replication types, each providing an optimal replication and distribution policy for different execution modules.

Figure 48:
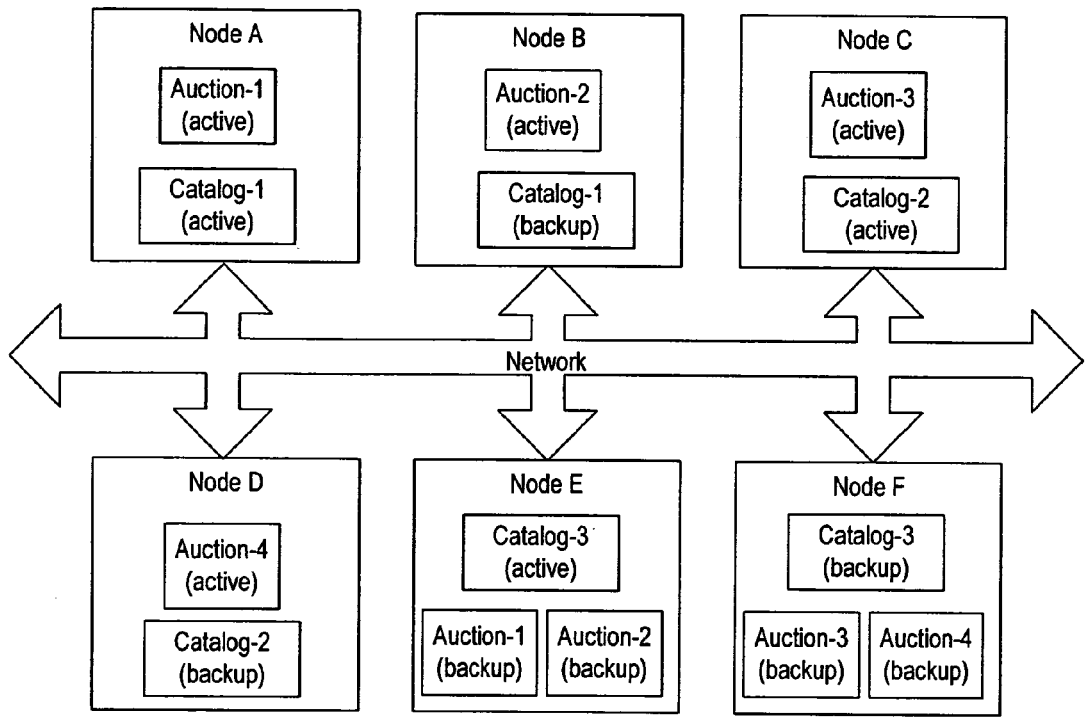
FIG. 48 is a block diagram of a system that includes two applications, each using a different replication type.

The exemplary system in FIG. 48 depicts the Auction EM Definition associated with the replication constraint RC1 and the Catalog EM Definition associated with the replication constraint RC2. RC1 specifies the Cold-Standby replication type while RC2 specified the Hot-Standby replication type.

The RC1 replication constraint ensures that the active replicas of the Auction execution modules are assigned to nodes A, B, C, and D while their backup replicas are assigned to nodes E and F.

The RC2 replication constraint allows assigning the Catalog execution modules to any node in the system, while ensuring that the active and backup replicas of the same execution module are on different nodes.

Configuring a System to Take Advantage of Application-specific Knowledge to Improve Availability One of the advantages of the present invention is its flexibility in taking advantage of application-specific criteria when distributing the execution module replicas. This capability is enabled by allowing the distribution manager object to be supplied by the application rather than by the execution control system.

An example application that could take advantage of this capability is a base station controller (BSC) used in cellular telephone networks. A BSC is an application that controls multiple cells in a network. The BSC application is partitioned into execution modules such that an execution module corresponds to a cell (we will call these execution modules "Cell execution modules").

Highly populated areas are typically divided into many cells such that each location is covered by more than one cell. A BSC can improve the availability of mobile telephone service by taking advantage of overlapping cells. If an execution module corresponding to one cell fails, the telephony service could still be provided by the execution modules corresponding to other cells that overlap the area of the failed cell. In order to maximize availability, a "clever" BSC implementation could distribute the Cell execution module replicas in a way that minimizes the impact of any node failure. For example, it is desirable that the active replicas of two overlapping cells be included in two different nodes of the distributed system. In this way, a clever BSC would achieve two levels of protection from failures: one level is by usual replication of each execution module and the second level is by taking advantage of overlapping cells.

In systems using prior art, the distribution of the execution module is performed by the system and cannot take advantage of application-specific knowledge (such as the knowledge of overlapping cells). In contrast, a system that uses the present invention could configure an application-specific Distribution Manager object that could be aware of overlapping cells and could distribute the Cell execution module replicas accordingly. In one embodiment of the invention, the algorithm depicted in FIG. 38-J would take the distribution of overlapping cells into consideration and would assign active replicas to nodes to minimize the impact of a node failure on overlapping cells.

FIG. 50 illustrates a system consistent with the present invention that uses the combination of replication and an application-specific distribution manager to assign Cell execution module replicas to nodes with the objective to minimize the impact of multiple failures. For example, because the Cells A, D, and G overlap, the distribution manager assigns the active replicas of the corresponding Cell execution modules to different nodes, preferably located in different enclosures. This assignment improves, for example, the availability of mobile telephone service in the area of Cell A in the event of multiple failures. For example, if Node 1 fails while its backup replica Cell-A (backup) is not available (for example, because of a failure of Node 2), the Cell-D (active) and Cell-G (active) execution module replicas located on nodes 4 and 7 respectively would still provide service to the mobile stations located in the parts of area of Cell A that overlap with Cells D and G.

Method of Starting Execution Control System

Figure 29:
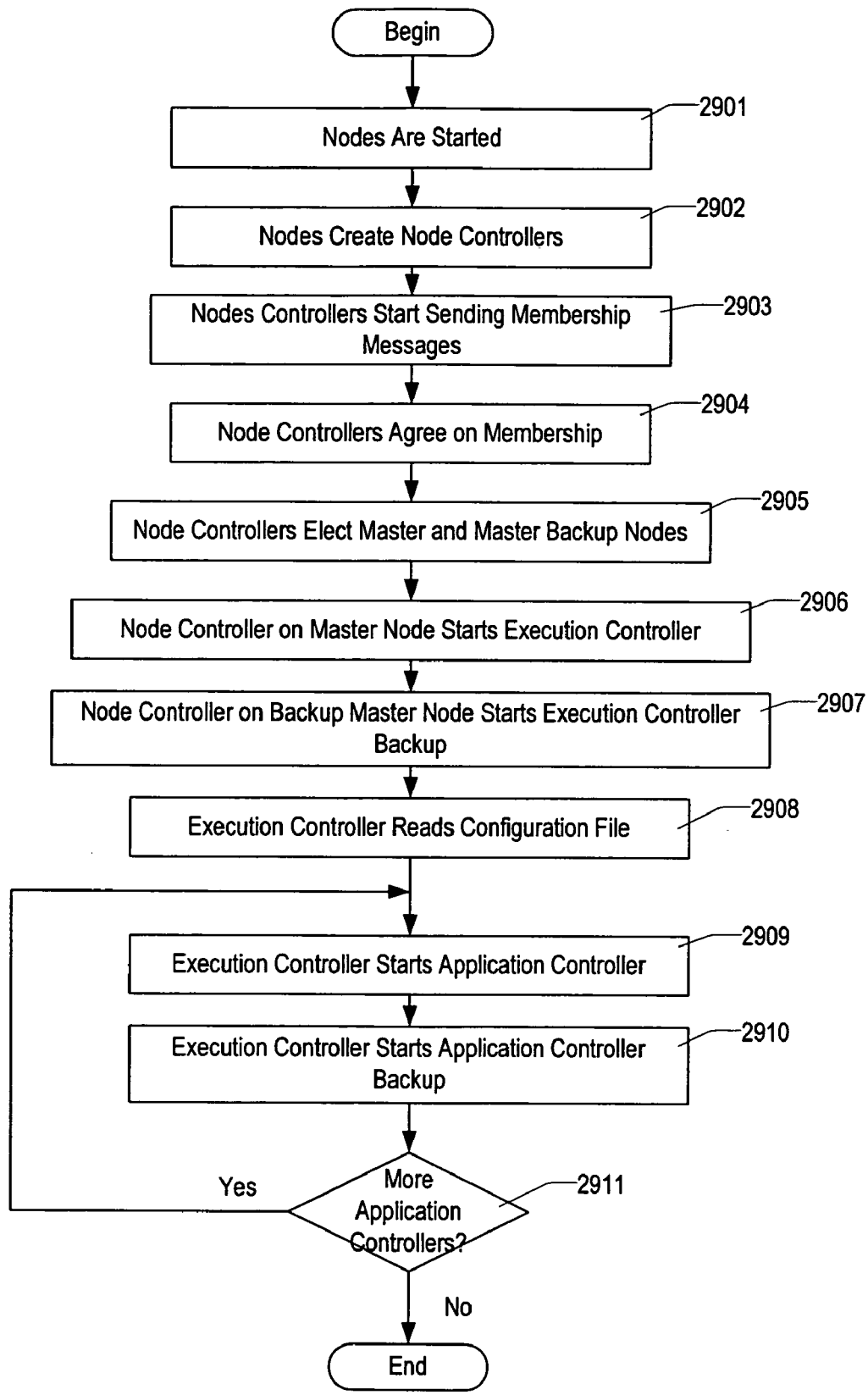
FIG. 29 illustrates a flow chart that includes the steps used in starting the execution control system consistent with a method of the invention.

FIG. 29 illustrates a flow chart that includes the steps performed when the execution control system consistent with the present invention is started. First the nodes of the distributed computer system are started. A node boots its operating system which then creates the node controller for the node. The node controllers start exchanging membership protocol messages. The membership protocol messages allow the node controllers to learn of the other nodes of the distributed computer system. Eventually, all the node controllers will agree on the set of nodes that are included by the distributed computer system. The node controllers will elect the master and backup master nodes. In some embodiments of the invention, both the membership and master election functionality is performed in the same step by using the same protocol. The node controller on the master node creates the execution controller. The node controller on the master backup node creates the execution controller backup that includes a backup copy of the execution controller's state model. The execution controller reads its configuration file. The configuration file includes the definition of the various default values used by the execution controller and a list of application controllers that should be created at startup time. For each application controller listed in the configuration file, the execution controller creates a process that includes the application controller. If it is specified in the configuration file, the execution controller creates a process that includes the application controller's backup. The application's controller backup process is located on a different node than the application controller and includes a backup copy of the application controller's state model. The execution controller repeats these two steps for all the application controllers listed in the configuration file. The execution control system is considered started when all application controllers have been started.

Support for Server Object Invocation and Creation

In some embodiments of the invention, execution modules include server objects that could be invoked remotely by client programs. In some embodiments, client programs are written in the Java language, but many other embodiments of client programs exist.

The client programs performing server object invocations could be, but are not limited to, programs included in other execution modules within the same or other distributed computer system, and programs running outside of any execution module. Some examples of server objects are: Enterprise JavaBean objects, CORBA objects, Java Remote Method Invocation (RMI) remote objects, and server object accessible by the Simple Object Access Protocol (SOAP).

In some embodiments, a client program is included in a client module. A client module includes communication libraries that allow the client program to communicate with a server object. A client module may also include a stub for the remote server object. A stub (stub is also called remote proxy or remote object reference) is a programming language object that a client program uses to invoke operations on a server object as if the server object were a local object located in the client module. In some embodiments, a remote operation supported by the server object corresponds to a programming language method defined in the stub object. In many embodiments, the programming language class that implements a stub is generated automatically by software tools. In some embodiments, a client module is a process that includes the client program, Java Runtime Environment (JRE), a communication library for communicating with the server objects located in the execution modules, and stubs. Many other possible embodiments of a client module exist.

The method of the present invention for applications that include server objects includes four advantages. First, the location of a server object is transparent to the client programs. A client program does not necessarily know the location of the server object. In some embodiments, when a client program invokes a programming language method on a server object's stub located in the client module, the stub obtains the location of the execution module in which the server object is located from the application controller. The stub in the client module might cache the execution module location to avoid request to the application controller on future invocations of the server object. A server object could be relocated transparently to the client program. In some embodiments, an application controller can move the location of an execution module from one container to another container, possibly located on another node. The communication protocol between the client module and the application controller ensures that the stub finds the up-to-date location of the execution module that includes the server object. Second, server object failover could be provided transparently to the client program. If the execution module that includes the server object is replicated in an active and backup execution modules, the application controller sends the client module the location of the active execution module. If the active execution module fails and the backup execution module is promoted to become the active execution module, the communication protocol between the client module and the application controller ensures that the stub finds the location of the currently active execution module with the server object. Third, server objects could be partitioned transparently to the client program. In some embodiments, server objects might be partitioned across multiple execution modules according to some partitioning information. In some embodiments, a client program requests the creation of a server object by invoking a programming language method ("create method") on a factory stub. The create method might have parameters. A factory stub is a programming-language object located in the client module and is used for sending server object creation requests to an execution module. If server objects are partitioned, the factory stub determines in which execution module to create a server object. The application controller provides to the factory stub partitioning information. The factory stub uses the partitioning information and the create method parameters to determine the execution module in which to create the server object. The factory stub might store the partitioning information received from the application controller in a partitioning information cache located in the client module and use it for subsequent invocations of create methods on the factory stub. Fourth, a client program can cause the creation of a new execution module by creating a new server object. Some applications require that each server object of a specified type be created in a new execution module (for example, a Base Station Controller application might require that each Cell object be located in its own execution module). When a client program invokes a create method on a factory stub, the stub sends a request to application controller to determine in which execution module to create the server object. The request includes the server object type and the create method parameters. In some embodiments, the application controller creates a new execution module (or an active and backup execution modules if replication is desired) and sends the location of the execution module to the factory stub.

The following paragraphs describe in detail the application controller's support for server object invocation and creation.

Figure 51:
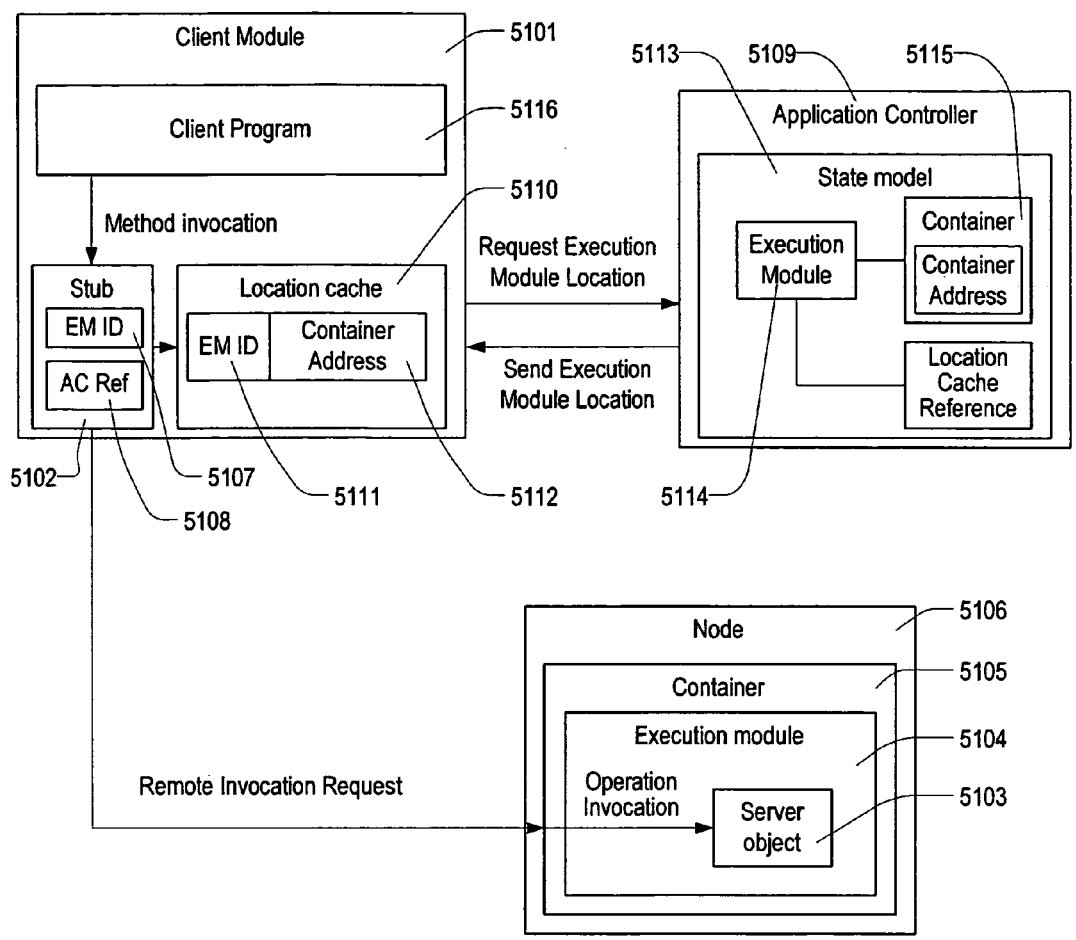
FIG. 51 is a block diagram illustrating the invocation of a server object located in an execution module.

FIG. 51 is a block diagram depicting the components of a distributed computer system that are relevant to achieving location transparency of a server object and the ability to relocate a server object to another container by relocating the execution module that includes the server object.

A client program 5116 is included in a client module 5101. The client module 5101 includes a stub 5102 that is used by the client program 5116 to perform remote operations on a server object 5103 included in an execution module 5104. The execution module 5104 is included in a container process 5105 running on a node 5106. The stub 5102 includes execution module identifier ("EM ID") 5107 that uniquely identifies the execution module that includes the server object and a reference to the application controller ("AC Ref") 5108 that controls the execution of the application that includes the server object 5103. The AC Ref 5108 allows the stub 5102 to communicate with the application controller 5109. To improve performance, the client module 5101 also includes a location cache 5110 that stores entries that map an EM ID 5111 to a network address of the container ("Container Address") 5112 that currently includes the execution module identified by EM ID 5111. The client module 5101 can use the Container Address 5112 to open a connection to the container 5105 and send messages to it, including remote invocation request messages that cause the container to invoke operations on the server object.

The state model 5113 included in the application controller 5109 includes the Execution Module object 5114 that contains the information about the corresponding execution module. This information includes the container in which the execution module is located. In some embodiments, this information is represented in the state model by an association between the Execution Module object 5114 and the Container object 5115. The Container object 5115 includes the Container Address that allows client modules to communicate with the container.

In some embodiments of the invention, the application controller 5109 keeps track of the client modules that might cache the location information of an execution module. In some embodiments, the application controller 5109 stores this information in the state model as remote object references of the location cache ("Location Cache Reference"). If the application controller 5109 moves the execution module to another container, the application controller 5109 can use the Location Cache Reference to update the location information in a client module's location cache by sending a message to the location cache.

Figure 52:
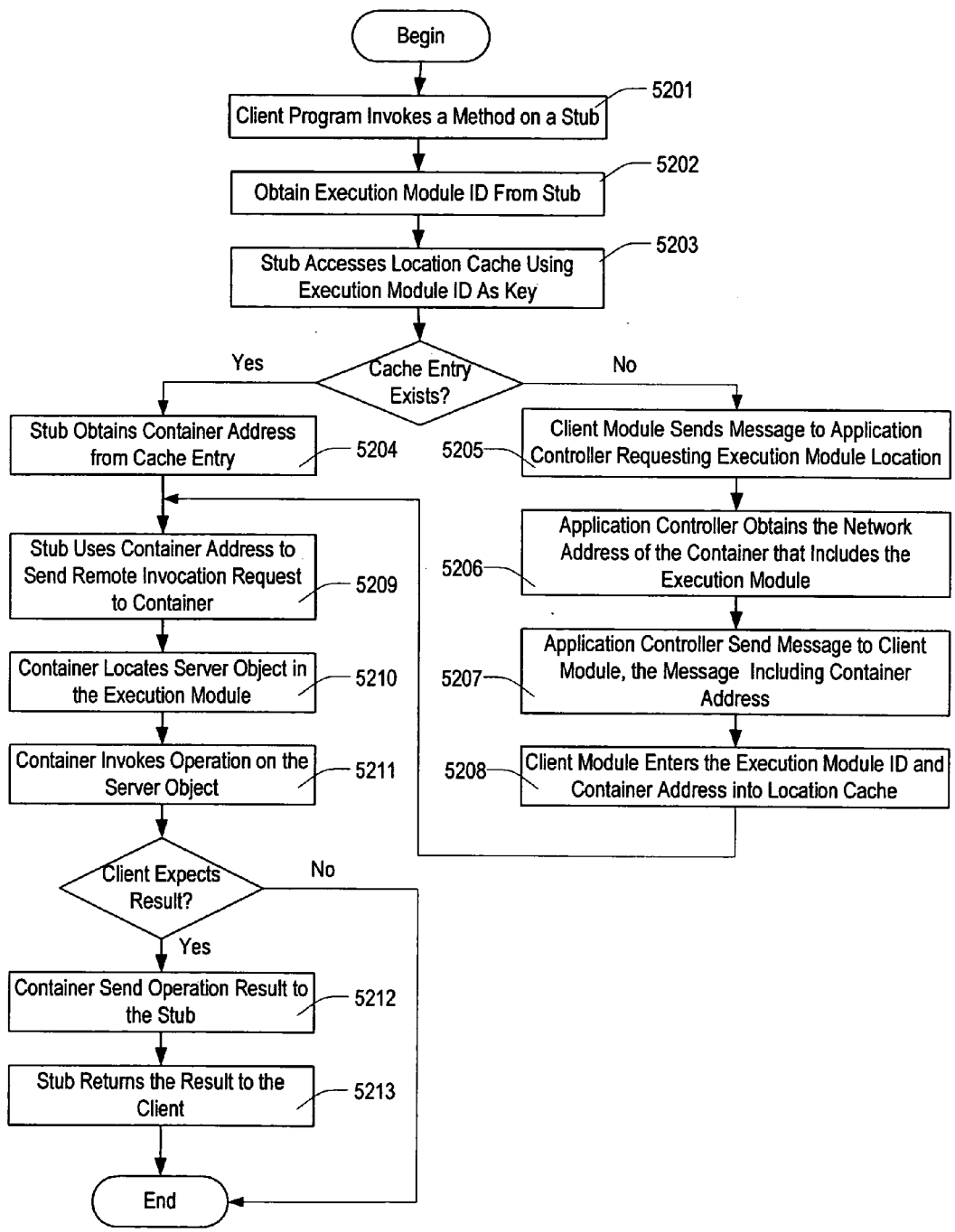
FIG. 52 is flow chart depicted the steps of invoking a server object located in an execution module.

FIG. 52 is a flow chart with the steps illustrating how a client module can locate a server object and perform a remote operation on it. The remote invocation of a server object is initiated by the client program 5116 invoking a programming language method on the stub representing the server object in the client module 5201. The stub obtains the execution module identifier that is included in the stub 5202. The execution module identifier is used as a key to the location cache to obtain an entry 5203. If the entry for the execution module identifier exists in the cache, the stub obtains the container address from the entry 5204. If the entry for the execution module identifier does not exist in the cache, the following steps are performed.

The client module sends a message to the application controller (the AC Ref included in the stub allows the client module to communicate with the application controller) 5205. The message includes the execution module identifier. The application controller finds the Execution Module object corresponding to the execution module identifier in the state model 5206. The information in the state model includes the Container object representing the container that currently includes the execution module. The Container object includes the network address of the container ("Container Address"). The application controller sends a message to the client module 5207. The message includes the Container Address. The stub enters the execution module identifier and the container address into the location cache 5208. In either case, the following steps are included. The stub uses the Container Address to obtain a network connection to the container (the stub may use an existing cached connection or open a new connection). The stub uses the connection to send a remote invocation request to the container 5209. The container locates the server object in the execution module 5210. The container invokes the operation requested by the client program on the server object 5211. If the client program expects to receive the result of the remote operation on the server object, the following steps are executed. The container sends the results to the stub, using the network connection 5212. The stub returns the result to the client program that invoked the programming language method 5213.

Some embodiments of the invention that use active/backup replication of execution modules take advantage of the communication protocol between the stub located in the client module and the application controller to perform failover of a server object. FIG. 53-A is a block diagram that depicts the relevant components of a system for remote invocation of a replicated server object before a failure.

EM Replica 1 5301 is the active execution module replica that contains a server object. The execution module is included in Container 1, which is a process running on Node 1. EM Replica 2 5302 is the corresponding backup execution module replica that contains a backup copy of the server object. The execution module is included in Container 2, which is a process running on Node 2.

The application controller's state model 5303 includes the information about execution modules, their replicas, and the containers that contain the replicas. The Execution Module object is associated with the Replica 1 object 5304 representing the active replica and the Replica 2 object 5305 representing the backup replica. Replica 1 object 5304 is associated in the state model with the Container 1 object to represent that EM Replica 1 5301 is included in Container 1. Similarly, Replica 2 object 5305 is associated with the Container 2 object to represent that EM Replica 2 5302 is included in Container 1. The information included in the Container 1 object includes the network address of Container 1, depicted as Container 1 Address. Similarly, the information included in the Container 2 object includes the network address of Container 2, depicted as Container 2 Address.

In some embodiments, the Execution Module object is associated with one or more Location Cache Reference information that allows the application controller to communicate with the location caches that have cached information about the location of the currently active execution module replica.

A client module includes a stub that is used by the client program to perform remote operations on the server object. The stub includes execution module identifier ("EM ID") that uniquely identifies the execution module. The AC Ref included in the stub allows the stub to communicate with the application controller. The location cache included in the client module stores entries that map an EM ID to a network address of the container ("Container Address") that includes the currently active replica of the execution module identified by EM ID. The stub sends the remote invocation requests to the container that includes the active replica using the steps of the flow chart depicted in FIG. 52.

FIG. 53-B is a block diagram depicting the components of a system for remote invocation of a replicated server object after the failure of the active replica. The reasons for the active replica failure include the failure of the replica itself; the failure of Container 1; and the failure of Node 1 5306.

When the application controller is notified of the failure, it marks the state model objects representing the failed components as "failed". Replica 2 5302, represented in the state model by the Replica 2 state object 5305, which was previously a backup replica, is promoted to become the active replica. When the application controller promotes the backup replica to active, it sends a message to the associated location caches represented by the Location Cache Reference information in the state model. The message includes the execution module identifier ("EM ID") and the new location of the active replica, which in this example would be represented by Container Address 2. A location cache that receives this message updates the entry for EM ID.

When the client program subsequently performs a remote object invocation on the server object by invoking a programming language method on the stub, the stub will use the updated entry and will send the remote invocation request to the server object located in EM Replica 2 5302.

If the client program invokes a server object after the active execution module has failed but before the application controller updates the location cache, the remote invocation request sent to container 1 will fail with an error indicating that the execution module, container, or node has failed. If this happens, the client module will request the current execution module location from the application controller by sending a message to the application controller. When the current location is received, the stub located in the client module will retry the remote invocation request by sending it to container 2 which includes the replica promoted from backup to active status. The client module might also enter the new location into the location cache.

In some embodiments, when an execution module replica fails, the application controller creates a replacement backup replica, EM Replica 3 5307, to protect against future failures. The state model includes the information about the replacement replica.

Figure 54:
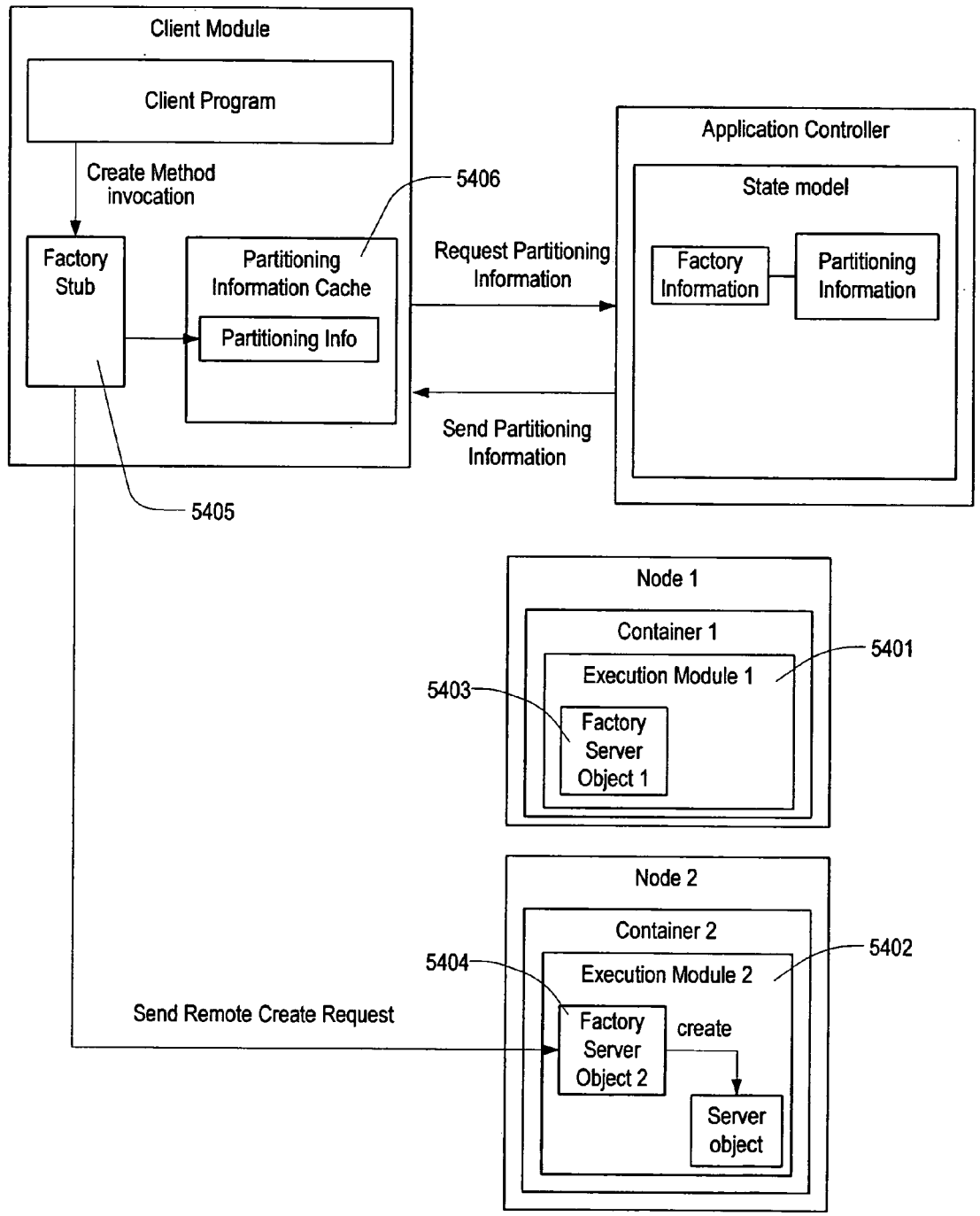
FIG. 54 is a block diagram illustrating the creation of an object in a system in which objects are partitioned across multiple execution modules by using partition information cache in the client module.

FIG. 54 is a block diagram depicting an exemplary distributed system that uses partitioning of server objects across multiple execution modules. In the example system, server objects are partitioned across two execution modules, execution module 1 5401 located in Container 1 on Node 1, and execution module 2 5402 located in Container 2 on Node 2. Each execution modules includes a factory object that is used for creating new server objects in the execution module. Factory Server Object 1 5403 is used for creating server objects in execution module 1, and Factory Server Object 2 5404 is used for creating server objects in execution module 2.

The state model in the application controller includes factory information for each type of server objects that could be created by a remote create request from a client program. The factory information is associated with partitioning information. The partitioning information defines the criteria for how the server objects should be partitioned across execution modules, based on the parameters to a create operation.

A client module includes a factory stub 5405 and partitioning information cache 5406. The factory stub 5405 is a programming language object that defines one or more create methods. Each create method is associated with a create operation on the factory server objects located in the execution modules. The create method takes zero or more parameters. The partitioning information cache stores partitioning information objects received from the application controller.

In some embodiments, a remote creation of a server object in a partitioned system includes the following steps. A client program invokes a create method on the factory stub, passing zero or more parameters to the method. The factory stub attempts to retrieve the corresponding partitioning information from the partitioning cache. If the partitioning information is not in the cache, the following steps are performed.

The factory stub sends a message to the application controller to request the partitioning information. The application controller locates the partitioning information from the state model and sends it to the factory stub in the client module. The factory stub enters the partitioning information in the cache.

Regardless of whether the partitioning information is in the cache, the following steps are performed. The factory stub uses the partitioning information and the create method parameters to determines in which execution module to create the server object. The factory stub sends a remote create request to the factory server object located in the execution module determined in the previous step. In some embodiments, the factory stub performs the invocation of the remote create operation by using the steps of the flow chart depicted in FIG. 52. The factory server object creates a new server object. In some embodiments, a remote object reference of the server object is passed back to the factory stub as the result of the create operation.

While the block diagram in FIG. 54 illustrates the factory stub and partitioning information cache as separate modules, in different embodiments, some functionality of the partitioning information cache might be included directly in the stub, or vice versa.

There are many possible embodiments of the factory server objects and factory stubs. In some embodiments, the Enterprise JavaBeans (EJB) home interfaces are used as factory stubs and the EJB container provides the corresponding factory server objects. In other embodiments, one server object may function as a factory server object for another server object. In some embodiments, the partition information is implemented as Java objects.

Figure 55:
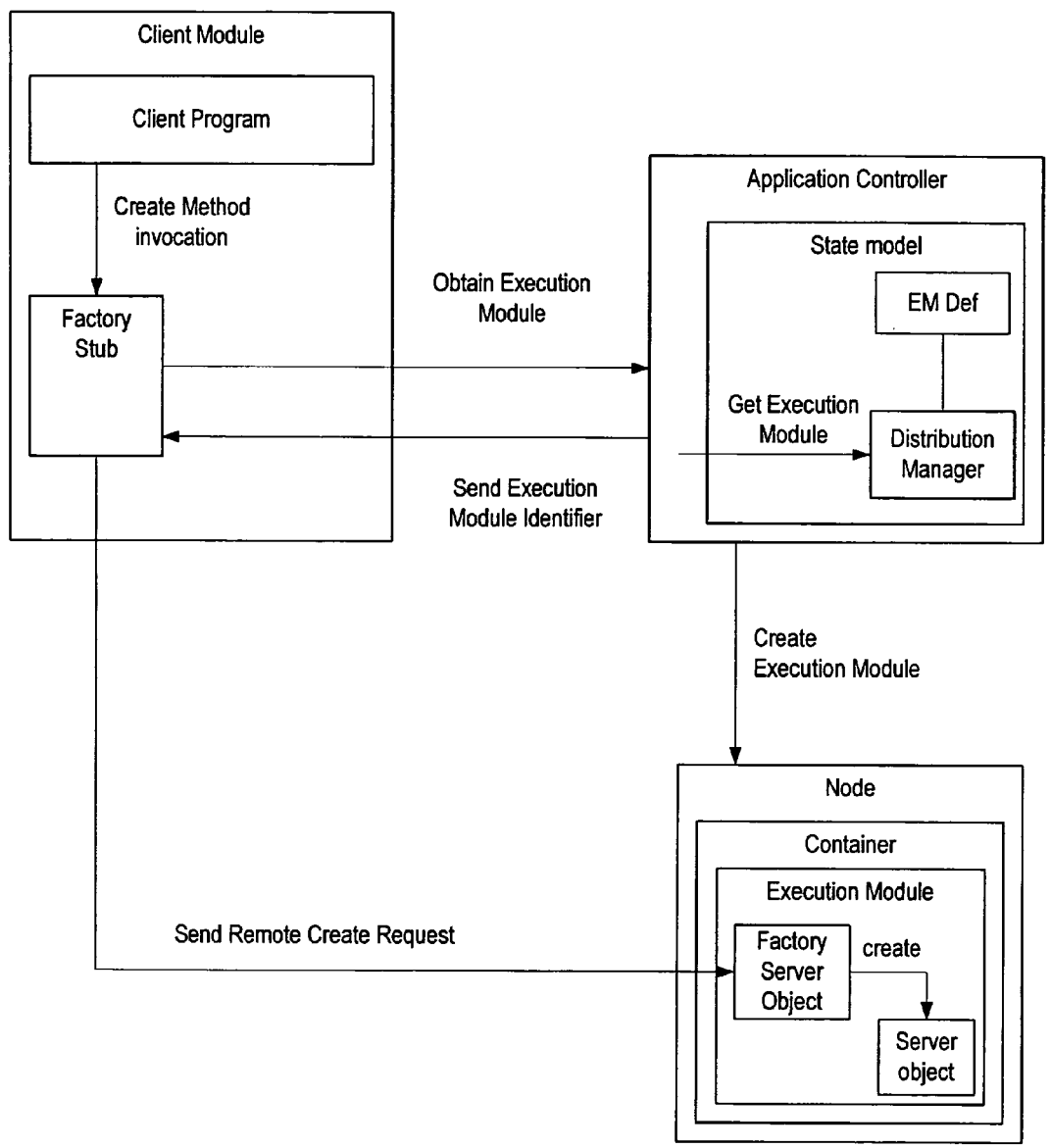
FIG. 55 is a block diagram illustrating the creation of an object in a system in which objects are partitioned across multiple execution modules by invoking a distribution manager in the application controller to determine the execution module in which to create the object.

FIG. 55 is a block diagram illustrating a distributed system in which a factory stub causes a distribution manager object located in the application controller to determine the execution module in which to create a new server object. One of the advantages of this mechanism is that the distribution manager has a fine control over how the server objects are distributed across execution modules. In some embodiments, the distribution manager can cause the creation of a new execution module for the new server object. This is particularly useful in the embodiments in which the distribution manager object is tailored for the application (and is typically included in the application definition). In these embodiments, the distribution manager can take advantage of application-specific information in its decision when to create new execution modules and how to distribute them. For example, if a new Cell object representing a cell in a wireless network is created by a Base Station Controller application, the application controller may create a new execution module that will include the Cell object, and distribute the execution module such that the Cell objects representing neighboring cells will be assigned to different nodes in a distributed computer system. Such distribution increases the overall availability of the wireless service. In some embodiments, the distribution manager object might store application-specific information in the state model objects. For example, the distribution manager for the Base Station Controller application might store information about previously created cells in the state model objects and use this information when creating and distributing an execution module that will included a new Cell object.

The protocol for creating a server object includes the following steps. A client program invokes a create method on the factory stub, passing zero or more parameters to the method. The factory stub sends a message to the application controller to obtain the identifier of the execution module in which to create the new server object. The message includes the create method parameters. When the application controller receives the message, it invokes the Get Execution Module operation on the distribution manager associated with the execution module definition, passing it the create method parameters. The distribution manager determines the execution module in which to create the new server object. The information that the distribution manager uses in its decision may include the create method parameters and the information in the entire state model. The distribution manager can choose an existing execution module, or cause a creation of a new execution module in which the server object will be created. The application controller sends a message to the factory stub. The message includes the identifier of the selected execution module. The factory stub sends a remote create request to the factory server object located in the selected execution module. In some embodiments, the factory stub performs the invocation of the remote create operation by using the steps of the flow chart depicted in FIG. 52. The factory server object creates a new server object. In some embodiments, a remote object reference of the server object is passed back to the factory stub as the result of the create operation.

DESCRIPTION OF EMBODIMENTS OF THE INVENTION

The present invention has broad applications and therefore may have many different embodiments. The embodiments described here should be considered illustrative, not prescriptive.

Figure 49:
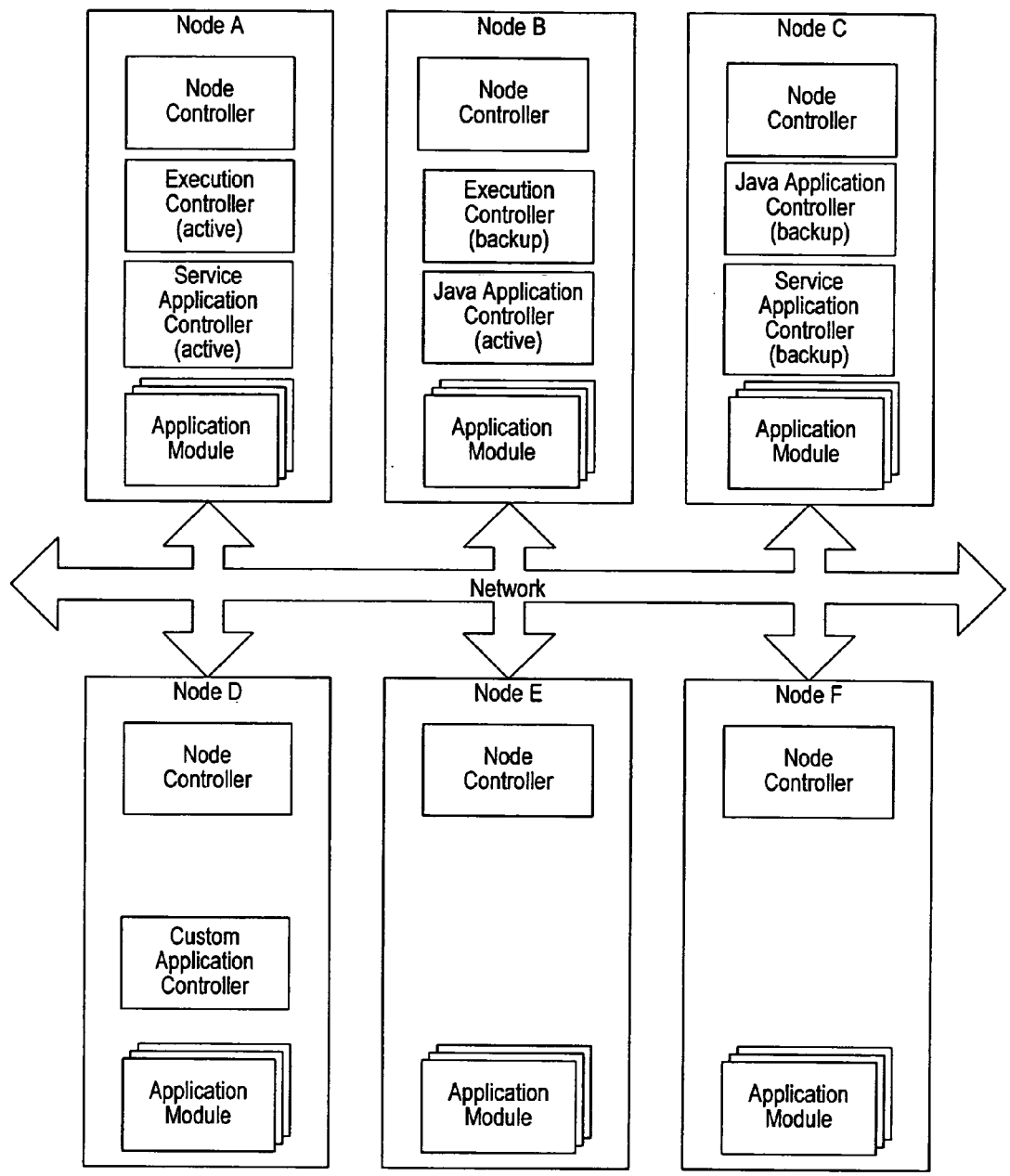
FIG. 49 is a block diagram of a representational distributed computer system in which the Execution Controller, Java Application Controller, and Service Application Controller are replicated to protect them from failures.

In one embodiment of the invention, nodes are realized as general-purpose server computers or server blades. Each node includes an image of a general-purpose operating system (e.g. Linux, Solaris, or Windows). Node controllers are realized as a Java 2 Platform, Standard Edition ("J2SE") applications. The membership and master election protocol is based on the Paxos algorithm described in Lamport Leslie's Paxos Made Simple. The execution controller, service application controller, and Java application controller are realized as Enterprise JavaBeans ("EJB") modules. Their state models include multiple Enterprise JavaBeans and their operations are realized as EJB business methods. The controllers are made highly available by checkpointing their state to backup modules. The checkpointing mechanism is realized according to a method described in U.S. Provisional Patent Application Ser. No. 60/445,639 entitled Method and Apparatus for Online Transaction Processing and U.S. Provisional Patent Application Ser. No. 60/508,150 entitled Method and Apparatus for Efficient Online Transaction Processing. It is also described in U.S. patent application Ser. No. 10/774,207 entitled Method and System for Efficient Online Transaction Processing. The communication between nodes is realized by a specialized implementation of the Java Remote Method Invocation (RMI) API that includes the capabilities suitable for use with the invention. Processes are realized as operating-system level processes. Java containers are realized as operating-system level processes that include the Java Virtual Machine (JVM) and application server classes. Application server classes are Java classes that include the functionality of the J2EE platform. Execution modules include the Java classes from J2EE and J2SE applications and tools-generated Java classes representing the J2EE runtime artifacts. The Java platform's class-loader mechanism is used to isolate the execution modules from each other. The Distribution Manager object in the Java application controller implements the support for active and backup execution modules as described in above and in U.S. Provisional Patent Application Ser. No. 60/445, 639 entitled Method and Apparatus for Online Transaction Processing and U.S. Provisional Patent Application Ser. No. 60/508,150 entitled Method and Apparatus for Efficient Online Transaction Processing. It is also described in U.S.

patent application Ser. No. 10/774,207 entitled Method and System for Efficient Online Transaction Processing. The Distribution Manager object is realized as a Java class. The Execution Controller, Java Application Controller, and Service Application Controllers are replicated using the "active" and "backup" replication model described in this disclosure. FIG. 49 depicts their exemplary distribution across the nodes of a distributed computer system.

Alternative Embodiments

The following is the description of some alternative embodiments of the invention. It would be impossible to list of possible embodiments and therefore the listed embodiment should be considered as illustrative. In some embodiments, the node controllers, execution controller, or application controllers could be implemented in C, C++, C#, or any other system programming language suitable for the operating system and hardware of the node. In some embodiments of the invention, the elected master nodes use the concept of a lease to prevent interference with each other after failures such as in Cary G. Gray's and David R. Cheriton's Leases: An Efficient Fault-Tolerant Mechanism for Distributed File Cache Consistency. In some embodiments, the nodes may communicate with each other via shared memory. In some embodiments, some components of the execution control system that are described in this disclosure as distinct components could be integrated with each other. For example, the execution controller and one or more application controllers could be combined into a single component in some embodiments.

In other embodiments, some of the components of the execution control system might be divided into parts and distributed across several nodes. For example, in a system with a large number of applications the Java application controller could be divided into multiple identical parts, each controlling a subset of the Java applications. Some embodiments may include an application controller that provides the support for the Microsoft .Net application execution model. In some embodiments, a custom application controller may emulate the functionality of an HA framework, such as of the Sun Cluster framework. This would be typically done to make it possible to execute pre-existing applications that conform to the HA framework's application execution model. In some embodiments, the execution modules managed by the Java application controller correspond to the modules of a J2EE application. J2EE applications and its modules are described in a Method and Apparatus for Execution Applications on a Distributed Computer System, U.S. Provisional Patent Application Ser. No. 60/454,510, filed Mar. 12, 2003.

In some embodiments, the execution modules managed by the Java application controller correspond to transactional state partitions as described in U.S. Provisional Patent Application Ser. No. 60/445,639 entitled Method and Apparatus for Online Transaction Processing and U.S. Provisional Patent Application Ser. No. 60/508,150 entitled Method and Apparatus for Efficient Online Transaction Processing. It is also described in U.S. patent application Ser. No. 10/774,207 entitled Method and System for Efficient Online Transaction Processing. In some embodiments, the operating-system level "services" are used instead of "processes". In some embodiments of the invention, the nodes of the distributed computer system could be geographically distributed to provide protection from catastrophic events, such as fire or flood. The method and system of the present invention allows placing the replicas of an execution such that they are assigned to nodes in different locations.

In some embodiments, different terminology might be used to refer to some concepts of the present invention. For example, the terms "primary" and "secondary" could be used instead of "active" and "back" when referring to the execution module replica roles, or the terms "logical execution module" and "physical execution module" could be used instead of the terms "execution module" and "execution module replica" respectively. Other embodiments of the present invention may exist, in addition to those described above.

A typical embodiment of a distributed computer system includes multiple conventional hardware servers (these are the nodes) connected with each other by a Local Area Network (LAN) such as Ethernet or System Area Network (SAN) such as Fibrechannel. In some embodiments, the nodes might be geographically distributed and connected with each other via Wide Area Network (WAN). The connections between the nodes may also be by wireless networks such as radio, wireless WAN, or satellite communication. Further, some nodes of the distributed computers systems may be connected together through physical connections (as described above) and others nodes may be connected through wireless connections (as described above). Also, groups of nodes may be connected together through physical connections and others groups of nodes may be connected through wireless connections. The network technology that interconnects the nodes also might include switches, bridges, firewalls and network of various types.

Many alternative embodiments of the distributed computer system exist. For example, in some embodiments, some of the nodes might be special-purpose computer boards (such as real-time boards used in systems for telecommunications), base stations for wireless networks, RFID stations, mobile stations in wireless networks or any other type of computing devices. In some alternative embodiments, the network that connects the nodes might be a radio network.

A distributed computer system might include nodes of multiple types (e.g. some nodes are conventional hardware servers while other nodes are special-purpose telecommunication boards) and the network might include multiple network types, such as LAN and radio network.

Exemplary Applications

Methods and systems of the present invention could be used with many different applications running on a distributed computer system. The purpose of the exemplary system and applications depicted in FIGS. 30 and 31 is to illustrate the advantages of using multiple application controllers in the execution control system.

Figure 30:
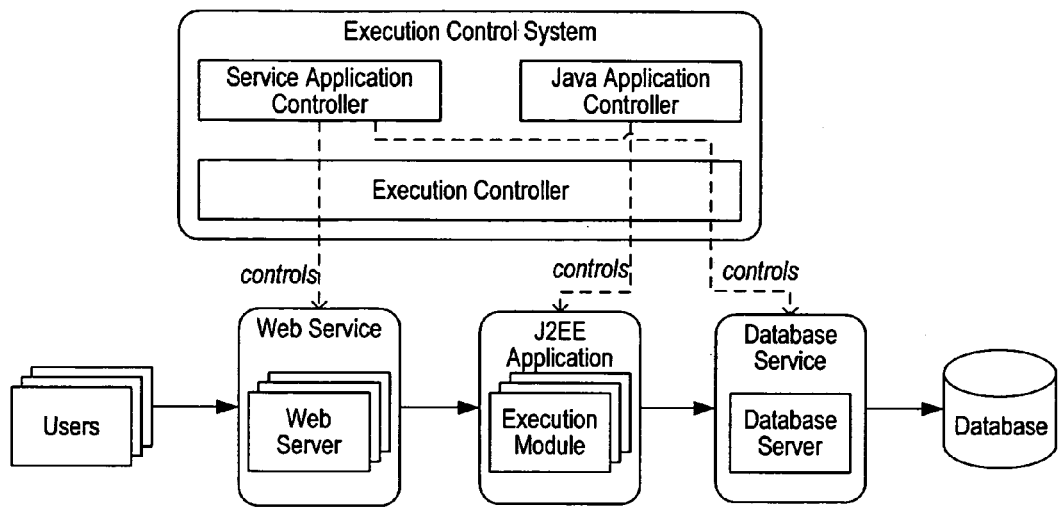
FIG. 30 depicts a representational execution control system controlling the execution of three exemplary applications.
Figure 31:
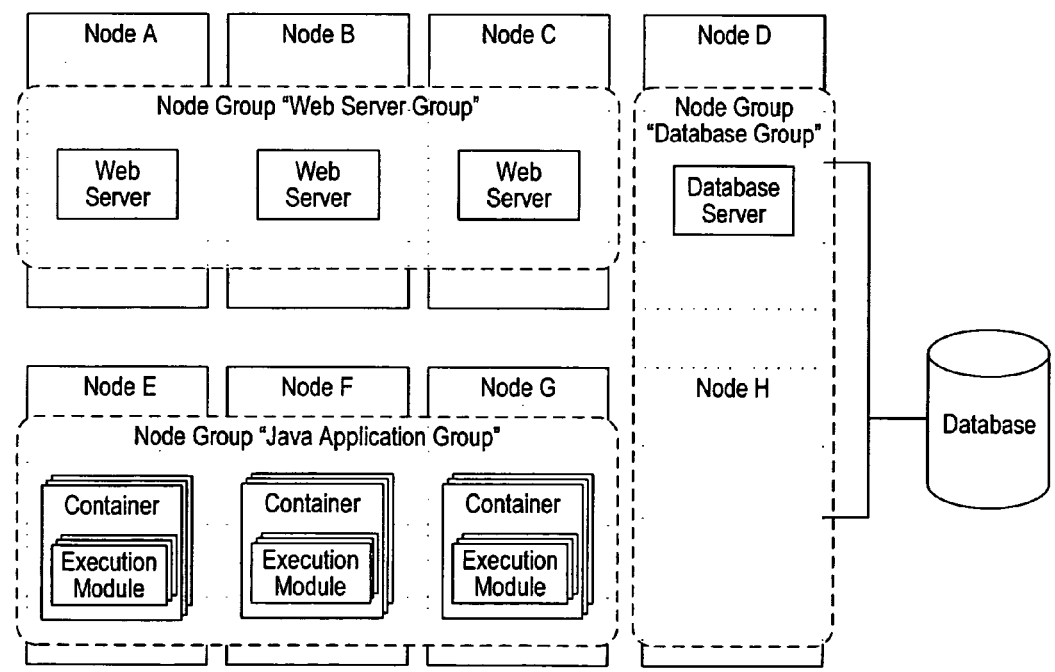
FIG. 31 illustrates an exemplary distribution of application modules of three exemplary applications.

FIG. 30 illustrates a system for processing user transactions on the Web. The system includes a Web service including multiple Web Server processes, a J2EE application including execution modules, database service including a database server process, and a database.

The Web service and database service use similar application execution model based on processes. The J2EE application uses a different application execution model based on two-level containment hierarchy: the application includes execution modules contained in containers and container processes ("containers") running on nodes.

The system also includes an execution control system consistent with the present invention. The execution control system includes an execution controller and two application controllers: the service application controller and the Java application controller. The service application controller controls the execution of the Web service and database service. The Java application controller controls the execution of the J2EE application. The execution controller includes the state of the nodes in the distributed computer system, the definition of node groups, and the state of the processes running on the nodes.

FIG. 31 illustrates exemplary distribution of the processes and execution modules over the nodes of a representational distributed computer system including eight nodes.

The node group "Web Server Group", which includes nodes A, B, and C, has been associated with the Web service application. The distribution policy for the service instructs the service application controller to create a Web server process on each node of the node group.

The node group "Database Group", which includes nodes D and H, has been associated with the database service. The distribution policy for the service instructs the service application controller to create a single database server on of the nodes of the node group (for example on node D). Should the node fail, the service application controller restarts the database server process on the other node of the node group (for example, on node H).

The node group "Java Application Group", which includes nodes E, F, and G, is used by the Java application controller for the execution of the J2EE application. The node group is associated with a container group (not illustrated in the figure) and the container group is associated with the EM Definition of the J2EE application. The Java application controller distributes the execution modules over containers and of containers over the nodes of the container group according to distribution policies associated with the container group and the EM Definitions.

The execution control system starts the applications and responds to failures according to methods of the invention. The execution control system also allows expanding the distributed computer system by adding nodes, according to a method of the invention. If nodes are added to the system, the execution control system will automatically allow the applications to take advantage of the new nodes according to their distribution policies.

The invention claimed is:

1. An application control system for a distributed computer system, including:
   at least one node, each node including node controller means for starting, stopping and detecting a failure of a process on the node;
   a plurality of application controllers wherein:
      each application controller includes control means for managing and determining distribution at least one application according to an execution model;
      a first application controller including management means for managing a different type of software from a second application controller; and
   at least one application controller includes application controller means for initiating creation of a container process; and
   an execution controller, the execution controller including execution control means for maintaining status information of processes started by the node controller executing on the at least one node and maintaining status and availability information of the at least one node.

2. An application control system for a distributed computer system, including:
   a plurality of nodes, each node including a node controller configured to start, stop and detect a failure of a process on the node;
   a plurality of application controllers wherein:
      each application controller is configured to manage at least one application according to an execution model; and
      a first application controller configured to manage applications according to an execution model that is different from the execution model of the applications managed by a second application controller; and
   an execution controller, the execution controller configured to:
      maintain status information of processes started by the node controller executing on at least one node; and
      maintain status and availability information of the plurality of nodes;
   wherein the execution controller is on a node separate from any application controller.

3. An application control system for a distributed computer system, including:
   a plurality of nodes, each node including a node controller configured to start, stop and detect a failure of a process on the node;
   a plurality of application controllers wherein:
      each application controller is configured to manage at least one application according to an execution model; and
      a first application controller configured to manage applications according to an execution model that is different from the execution model of the applications managed by a second application controller; and
   an execution controller, the execution controller configured to:
      maintain status information of processes started by the node controller executing on at least one node; and
      maintain status and availability information of the plurality of nodes;
   wherein the execution controller is replicated on a subset of the plurality of nodes.

4. An application control system for a distributed computer system, including:
   a plurality of nodes, each node including a node controller configured to start, stop and detect a failure of a process on the node;
   a plurality of application controllers wherein:
      each application controller is configured to manage at least one application according to an execution model; and
      a first application controller configured to manage applications according to an execution model that is different from the execution model of the applications managed by a second application controller; and
   an execution controller, the execution controller configured to:
      maintain status information of processes started by the node controller executing on at least one node; and
      maintain status and availability information of the plurality of nodes;
   wherein at least one application controller is replicated on a subset of the plurality of nodes.

5. An application control system for a distributed computer system, including:
- a plurality of nodes, each node including a node controller configured to start, stop and detect a failure of a process on the node;
- a plurality of application controllers wherein:
    - each application controller is configured to manage at least one application according to an execution model; and
    - a first application controller configured to manage applications according to an execution model that is different from the execution model of the applications managed by a second application controller; and
- an execution controller, the execution controller configured to:
    - maintain status information of processes started by the node controller executing on at least one node; and
    - maintain status and availability information of the plurality of nodes;
- wherein at least one application controller includes logic configured to request the execution controller to start a process.

6. The system of claim 5, wherein the execution controller includes logic configured to request the node controller to start a process.

7. An application control system for a distributed computer system, including:
- a plurality of nodes, each node including a node controller configured to start, stop and detect a failure of a process on the node;
- a plurality of application controllers wherein:
    - each application controller is configured to manage at least one application according to an execution model; and
    - a first application controller configured to manage applications according to an execution model that is different from the execution model of the applications managed by a second application controller; and
- an execution controller, the execution controller configured to:
    - maintain status information of processes started by the node controller executing on at least one node; and
    - maintain status and availability information of the plurality of nodes;
- wherein the execution controller includes logic configured to request the node controller to start a process.

8. An application control system for a distributed computer system, including:
- at least one node, each node including a node controller configured to start, stop and detect a failure of a process on the node;
- a plurality of application controllers wherein:
    - each application controller is configured to manage and determine distribution of at least one application according to an execution model;
    - a first application controller configured to manage applications according to an execution model that is different from the execution model of the applications managed by a second application controller; and
    - at least one application controller includes logic configured to initiate creation of a container process; and
- an execution controller, the execution controller configured to:
    - maintain status information of processes started by the node controller executing on the at least one node; and
    - maintain status and availability information of the at least one node.

9. The system of claim 8, wherein the container process initiated by the application controller includes container controller logic configured to create at least one execution module.

10. The system of claim 9, wherein the logic to initiate the creation of a container process includes logic configured to send a message to the execution controller to cause the execution controller to inform the node controller to start the container process.

11. The system of claim 9, wherein the container process includes a first execution module from a first application and a second execution module from a second application.

12. The system of claim 9, wherein the container processes include a Java Virtual Machine and the at least one execution module includes Java classes.

13. The system of claim 9, wherein the container processes include an Enterprise JavaBeans Container class and the at least one execution module includes Enterprise JavaBeans.

14. An application control system for a distributed computer system, including:
- a plurality of nodes, each node including a node controller configured to start, stop and detect a failure of a process on the node;
- a plurality of application controllers wherein:
    - each application controller is configured to manage at least one application according to an execution model; and
    - a first application controller configured to manage applications according to an execution model that is different from the execution model of the applications managed by a second application controller; and
- an execution controller, the execution controller configured to:
    - maintain status information of processes started by the node controller executing on at least one node; and
    - maintain status and availability information of the plurality of nodes;
- wherein the logic used by the execution controller to maintain status information of processes and maintain status and availability information of the nodes includes Enterprise JavaBeans.

15. An application control system for a distributed computer system, including:
- a plurality of nodes, each node including a node controller configured to start, stop and detect a failure of a process on the node;
- a plurality of application controllers wherein:
    - each application controller is configured to manage and determine distribution of at least one application according to an execution model;
    - at least one application controller includes Enterprise JavaBeans; and
    - a first application controller configured to manage applications according to an execution model that is different from the execution model of the applications managed by a second application controller; and an execution controller, the execution controller configured to:
maintain status information of processes started by the node controller executing on at least one node; and
maintain status and availability information of the plurality of nodes.

16. An application control system for a distributed computer system, including:
a plurality of nodes, each node including a node controller configured to start, stop and detect a failure of a process on the node;
a plurality of application controllers wherein:
each application controller is configured to manage at least one application according to an execution model;
a first application controller configured to manage applications according to an execution model that is different from the execution model of the applications managed by a second application controller; and
at least one application controller includes distribution management logic to use distribution policy information as input and to output distribution information based on the distribution policy information; and
an execution controller, the execution controller configured to:
maintain status information of processes started by the node controller executing on at least one node; and
maintain status and availability information of the plurality of nodes.

17. The system of claim 16, wherein the application controller includes logic configured to invoke the distribution management logic upon at least one of a start of an application, a node failure, a process failure, a application failure, a node overload, and an addition of a node.

18. The system of claim 16, wherein the distribution information of the distribution management logic includes at least one of: the number of container processes for an application, the nodes on which each container process is located, the number of execution modules to create; the assignment of execution modules to container processes; and the replication of execution modules.

19. The system of claim 18, wherein the application controllers include logic configured to retrieve distribution policy information for an application from an application definition.

20. The system of claim 18, wherein the application controllers include logic configured to receive distribution policy information for an application from a system administrator.

21. The system of claim 18, wherein the application controllers include logic configured to receive distribution policy information for an application from a configuration file.

22. The system of claim 16, wherein the distribution management logic is loaded from an application definition.

23. The system of claim 16, wherein the distribution management logic is loaded from a file separate from the application controller.

24. An application control system for a distributed computer system, including:
a plurality of nodes, each node including a node controller configured to start, stop and detect a failure of a process on the node;
a plurality of application controllers wherein:
each application controller is configured to manage at least one application according to an execution model; and
a first application controller configured to manage applications according to an execution model that is different from the execution model of the applications managed by a second application controller; and
an execution controller, the execution controller configured to:
maintain status information of processes started by the node controller executing on at least one node; and
maintain status and availability information of the plurality of nodes;
wherein a first application controller is configured to create container processes only on a first node group.

25. The system of claim 16, wherein the execution controller includes logic configured to send a node failure notification message to each application controller with an application executing on a node upon a failure of the node.

26. The system of claim 16, wherein logic in a first node is configured to determine if the node including the execution module failed and upon such a determination the logic is configured to initiate an execution controller in the first node.

27. The system of claim 16, wherein the execution controller includes logic configured to send a process failure notification message to the application controller which initiated the creation of the failed process upon a failure of the process.

28. The system of claim 16, wherein the execution controller includes logic configured to send a process failure notification message to the application controller which initiated the creation of the failed process upon receipt of a process failure notification message from the node controller.

29. An application control system for a distributed computer system, including:
a plurality of nodes, each node including a node controller configured to start, stop and detect a failure of a process on the node;
a plurality of application controllers wherein:
each application controller is configured to manage at least one application according to an execution model;
a first application controller configured to manage applications according to an execution model that is different from the execution model of the applications managed by a second application controller; and
at least one application controller manages a plurality of application; and
an execution controller, the execution controller configured to:
maintain status information of processes started by the node controller executing on at least one node; and
maintain status and availability information of the plurality of nodes.

30. A computer-readable medium including instructions for performing a method when executed by a processor, for controlling the execution of applications according to different models on a distributed computer system, the method including the steps of:
configuring a node controller module at least one node including a node to start, stop and detect a failure of a process on the node;

starting an execution controller module configured to maintain status information of processes started by the node controller module executing on the at least one node and maintain status and availability information of the at least one node; and starting a plurality of application controllers module wherein each application controller module manages at least one application according to an execution model, and a first application controller module manages applications according to an execution model that is different from the execution model of the applications managed by a second application controller module.

31. An application control system for a distributed computer system, including:

a plurality of nodes, each node including a node controller configured to start, stop and detect a failure of a process on a node;

a plurality of application controllers wherein:

each application controller includes logic configured to manage at least one application according to an execution model, to initiate the creation of a container process and to use distribution policy information as input in order to generate distribution information output;

and a first application controller configured to manage applications according to an execution model that is different from the execution model of the applications managed by a second application controller, and wherein a first application controller is on a first node and a second application controller is on a second node; and at least one application controller is replicated on a subset of the plurality of nodes; and an execution controller, the execution controller configured to:

maintain status information of processes started by the node controller executing on at least one node;

request the node controller to start a process; and maintain status and availability information of the plurality of nodes;

wherein the execution controller is on a node separate from any application controller and is replicated on a subset of the plurality of nodes.

* * * * *